United States Patent
Janecek et al.

(10) Patent No.: US 9,006,951 B2
(45) Date of Patent: Apr. 14, 2015

(54) COGGING TORQUE REDUCTION DEVICE FOR ELECTRICAL MACHINES

(75) Inventors: Thomas F. Janecek, Flagstaff, AZ (US); John M Dyer, Flagstaff, AZ (US); Tyler K. Williams, Flagstaff, AZ (US)

(73) Assignee: Electric Torque Machines Inc, Flagstaff, AZ (US)

( * ) Notice: Subject to any disclaimer, the term of this patent is extended or adjusted under 35 U.S.C. 154(b) by 338 days.

(21) Appl. No.: 13/536,820

(22) Filed: Jun. 28, 2012

(65) Prior Publication Data

US 2013/0002061 A1  Jan. 3, 2013

Related U.S. Application Data

(60) Provisional application No. 61/502,094, filed on Jun. 28, 2011.

(51) Int. Cl.
  *H02K 21/12* (2006.01)
  *H02K 1/06* (2006.01)
  *H02K 29/03* (2006.01)
  *H02K 19/06* (2006.01)
  *H02K 19/10* (2006.01)

(52) U.S. Cl.
  CPC .............. *H02K 29/03* (2013.01); *H02K 19/06* (2013.01); *H02K 19/103* (2013.01); *H02K 2201/12* (2013.01); *H02K 2213/03* (2013.01)

(58) Field of Classification Search
  CPC .......................... H02K 1/145; H02K 2201/12
  USPC ................................. 310/257, 51, 46, 156.02
  See application file for complete search history.

(56) References Cited

U.S. PATENT DOCUMENTS

| | | | |
|---|---|---|---|
| 4,638,197 A * | 1/1987 | Kalagidis | 310/67 R |
| 7,851,965 B2 | 12/2010 | Calley et al. | |
| 7,868,508 B2 | 1/2011 | Calley et al. | |
| 7,923,886 B2 | 4/2011 | Calley et al. | |
| 8,053,944 B2 | 11/2011 | Calley et al. | |
| 8,222,786 B2 | 7/2012 | Calley et al. | |
| 8,395,291 B2 | 3/2013 | Calley et al. | |
| 2003/0071530 A1 | 4/2003 | Takahashi | |

(Continued)

FOREIGN PATENT DOCUMENTS

| | | | | |
|---|---|---|---|---|
| GB | 2059175 A * | 4/1981 | | H02K 21/24 |
| KR | 10-2010-0046154 A | 5/2010 | | |
| WO | 2009/003195 A1 | 12/2008 | | |

OTHER PUBLICATIONS

"Contiguous, adj." OED Online. Oxford University Press, Jun. 2014. Web. Jul. 18, 2014.*

(Continued)

*Primary Examiner* — Quyen Leung
*Assistant Examiner* — Thomas Truong
(74) *Attorney, Agent, or Firm* — Invention To Patent Services; Alex Hobson

(57) ABSTRACT

Electrical machines, for example transverse flux machines and/or commutated flux machines, may be "balanced" to achieve reduced overall cogging torque via utilization of one or more cogging torque reduction devices. Cogging torque reduction devices may be configured and/or otherwise customized in order to reduce and/or minimize cogging torque in an electrical machine, by generating a counteracting cogging torque waveform that at least partially counteracts and/or cancels the initial cogging torque waveform of the electrical machine.

19 Claims, 43 Drawing Sheets

(56) References Cited

U.S. PATENT DOCUMENTS

2007/0145834 A1* 6/2007 Usui .......................... 310/49 R
2008/0174189 A1* 7/2008 Boucher et al. ................ 310/51

OTHER PUBLICATIONS

Intl Search Report dated Jan. 21, 2013 of PCT/US2012/044727 filed Jun. 28, 2012 (3 pages).

* cited by examiner

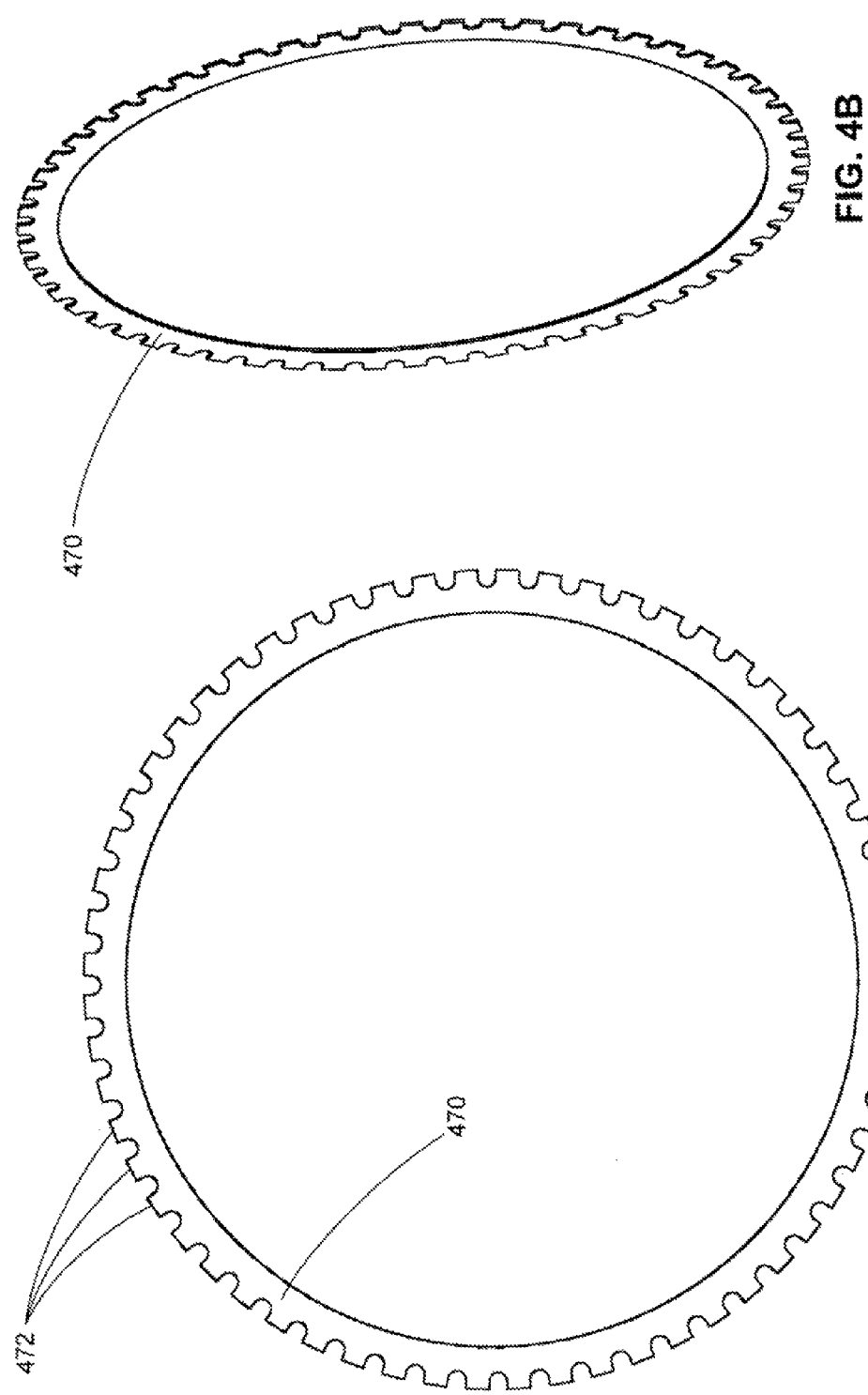

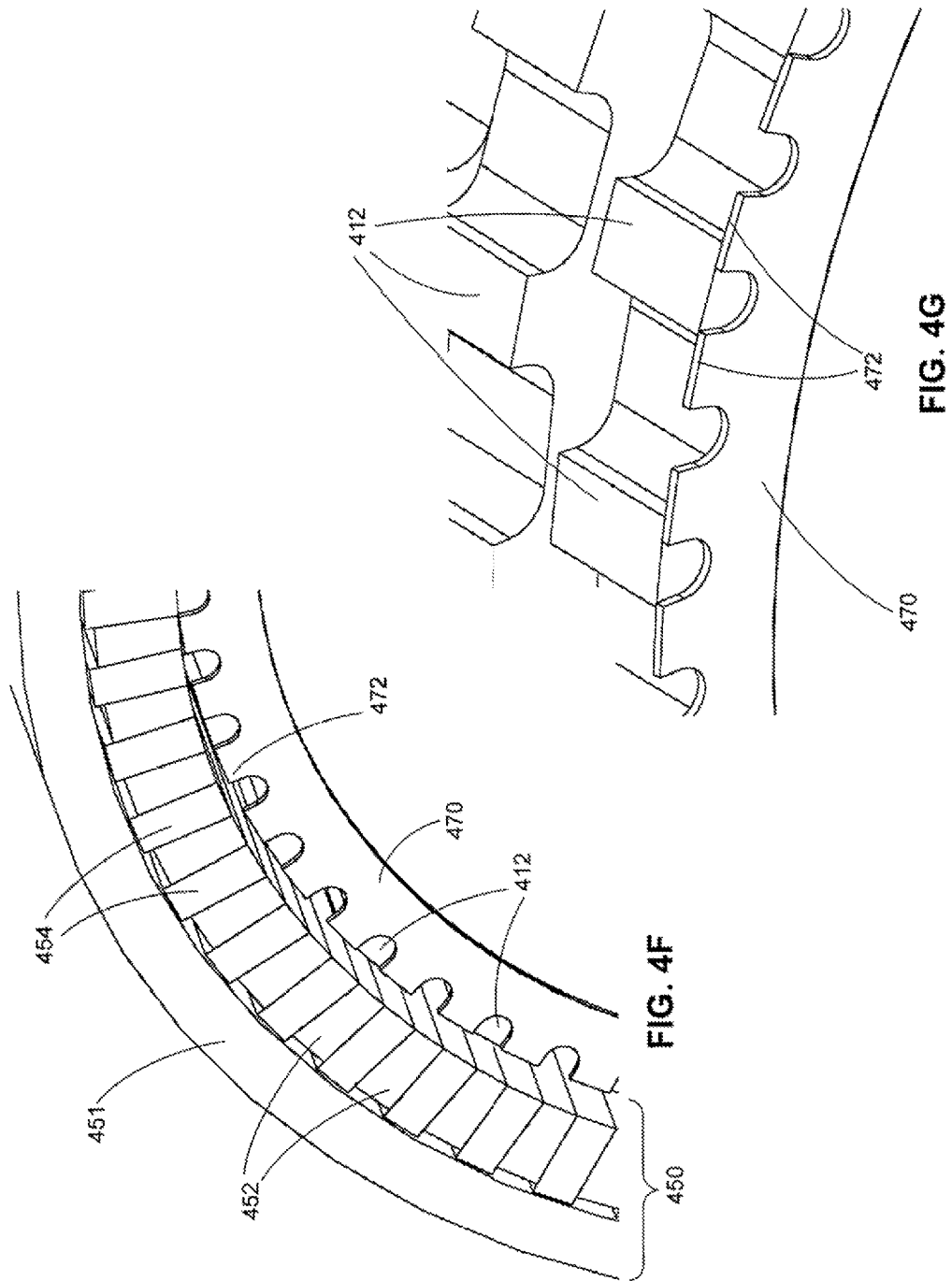

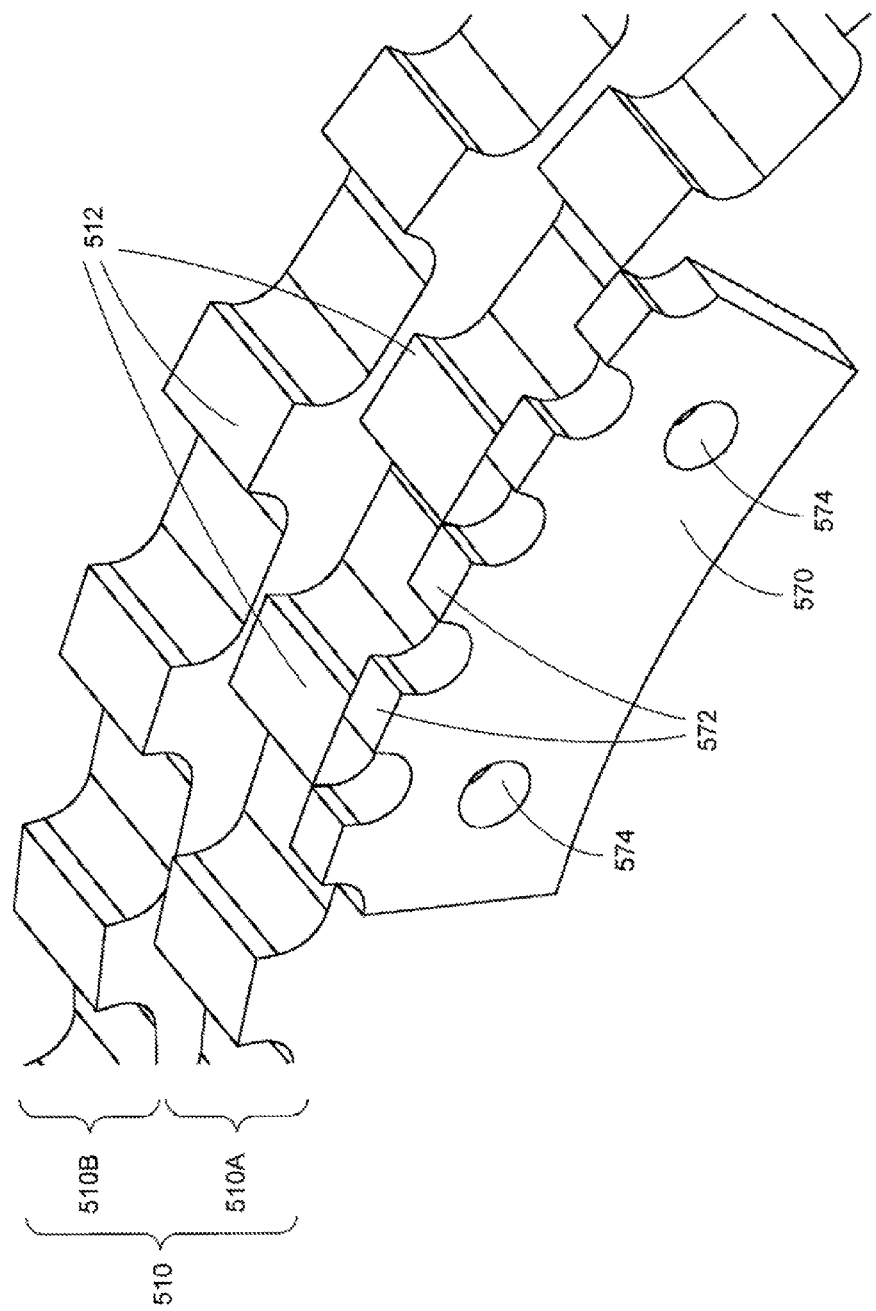

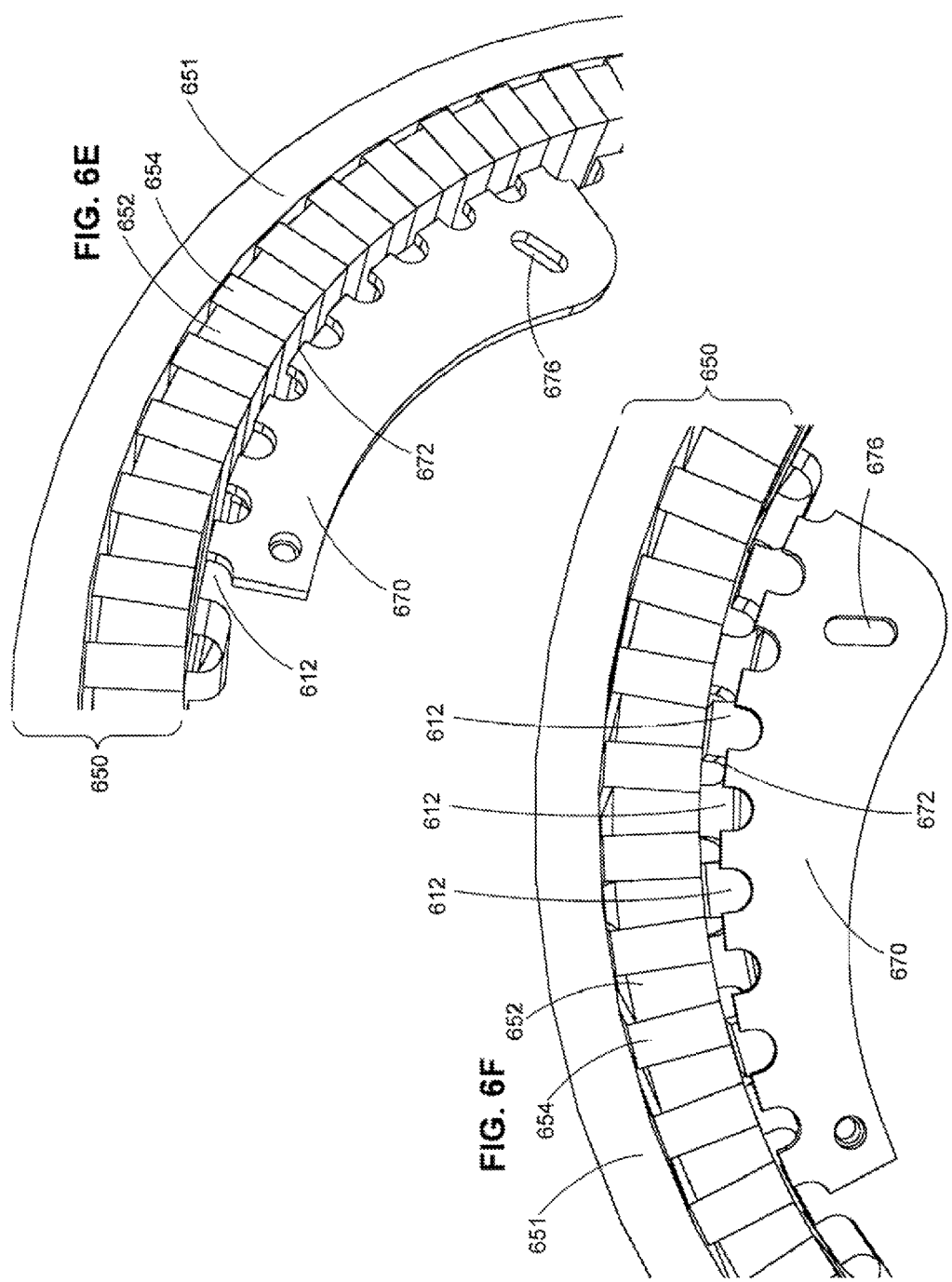

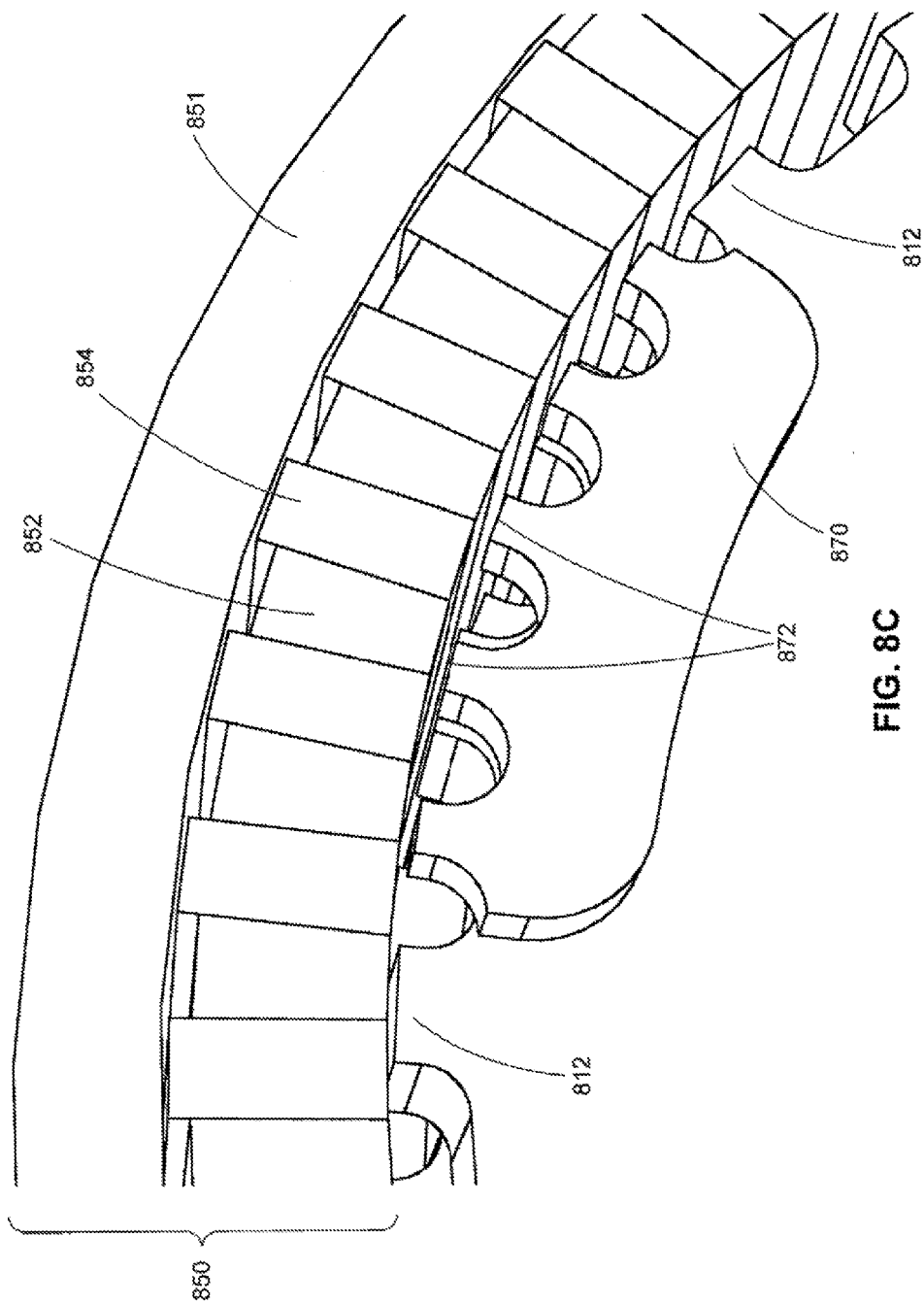

COGGING TORQUE REDUCTION DEVICE FOR ELECTRICAL MACHINES

CROSS REFERENCE TO RELATED APPLICATIONS

The present invention claims the benefit of U.S. Provisional Patent Application No. 61/502,094, filed on Jun. 28, 2011, which is incorporated by reference herein. Where there are discrepancies between the present non-provisional application and the U.S. provisional patent application No. 61/502,094 incorporated herein, the present non-provisional patent application shall dominate.

TECHNICAL FIELD

The present disclosure relates to electrical systems and in particular to reduction of cogging torque in electrical machines, for example transverse flux machines and commutated flux machine.

BACKGROUND

Cogging torque is a condition present in most permanent magnet electric machines, for example electrical motors and generators. When unenergized, the electrical machine seeks a rotational position that results in the lowest magnetic circuit reluctance (or the highest permeance). This condition may be perceived as intermittent resistance to rotation of the electrical machine. The net cogging torque as the electrical machine rotates is approximately zero, as the cogging torque alternately "resists" and "encourages" rotation of the electrical machine. However, because the momentary cogging torque at most rotational positions of the electrical machine is non-zero, the cogging torque causes noise and vibration within the electrical machine. This can potentially lead to wear on and/or premature failure of electrical and/or mechanical components. Additionally, it can cause vibration within systems driven by and/or driving the electrical machine, resulting in additional noise, wear, and/or failure.

Because of these and other undesirable consequences of cogging torque, many prior approaches for reducing and/or minimizing cogging torque have been attempted. However, many prior approaches for reducing cogging torque, for example via skewing, negatively impact the performance and/or manufacturability of the electrical machine. Accordingly, it remains desirable to provide improved systems and methods for reducing and/or minimizing cogging torque in electrical machines, particularly in transverse flux machines and/or commutated flux machines.

SUMMARY

A cogging torque reduction device comprising a flux conducting device couple to a stator and configured to reduce cogging torque in an electrical machine by having opposite magnetic saliency to the electrical machine is described herein. The flux conducting device conducts flux from a first pole to a second pole to create a flux path through said flux conducting device, whereby the said flux path does not link flux around a coil of the said electrical machine. The flux conducting device may be coupled to any suitable type of electrical machine and in an exemplary embodiment is coupled to an electric motor. In an exemplary embodiment, the cogging torque reduction device is coupled to a transverse or commutated electric motor.

A cogging torque reduction device, as described herein, comprises a flux conducting device coupled to a stator and configured to reduce inherent cogging torque in an electrical machine by producing anti-cogging torque when the electric machine is in operation, whereby the flux conducting device conducts flux from a first rotor pole to a second rotor pole to create a flux path through said flux conducting device, whereby the said flux path does not link flux around a coil of the said electrical machine. Anti-cogging torque, as used herein, means torque that opposes and/or reduces inherent cogging torque of an electric machine. In an exemplary embodiment, anti-cogging torque comprises a cogging torque waveform that opposes and/or reduces the inherent cogging torque waveform of the electric machine.

The cogging torque reduction device, as described herein, comprises a first pole conducting portion and a second pole conducting portion whereby the flux conducting device conducts flux from a first pole on a rotor to a second pole on said rotor creating a flux path, wherein the flux path does not link flux around a coil of the electrical machine. The first pole conducting portion and second pole conducting portion may have any suitable shape and may comprise two or more separate portions that are coupled, or may be contiguous, consisting of a single portion. In an exemplary embodiment, the first pole portion comprises a first tooth. In another exemplary embodiment, the first and second pole conducting portions comprise a tooth, as described herein. A tooth may have any suitable shape including, but not limited to, a tapered shape, a fin shape. A tooth, as used herein, is an exemplary embodiment of a pole conducting portion. Pole conducting portions may be configured to conduct flux from adjacent poles or from a first pole to any other pole on the electric motor.

The cogging torque reduction device, as described herein, may comprise any suitably shaped flux conducting device including, but not limited to, arc shaped, ring shaped, and the like. A flux conducting device may have any suitable number of flux conducting portions that conduct flux from any suitable number or poles. A flux conducting device may comprise one, two, three or more, five or more, ten or more, or twenty or more flux conducting portions. In an exemplary embodiment, the flux conducting device is arc shaped and comprises two or more portions extending radially towards the air-gap therefrom. The cogging torque reduction device or a component thereof, may be crown shaped having two or more teeth extending therefrom. In another exemplary embodiment, a flux conducting device is ring shaped and comprises a plurality of flux conducting portions extending outwardly from said ring shaped conducting device. Furthermore, a ring shaped cogging torque reduction device, or component thereof, may comprise one or more gaps, as described herein.

The cogging torqued reduction device, as described herein, may comprise a flux conducting portion or portions with any suitable configuration. In an exemplary embodiment, two adjacent flux conducting portions comprises a space therebetween, and in one embodiment the space is uniform. In another embodiment a plurality of flux conducting portions are coupled to an electrical device or motor.

The cogging torque reduction device, as described herein, may be configured to produce waveform in response to a rotation of a rotor that at least partially cancels a cogging torque waveform. The anti-cogging waveform created by the cogging torque reduction device may significantly improve the performance of an electrical device, such as a transverse and/or commutated electric motor.

The cogging torque reduction device, as described herein, may comprise at least one position adjustment feature, whereby one or more pole conducting portions may be adjusted. A position adjustment feature may comprise any suitable number, configuration or combination of position adjustment features including, but not limited to, a slot, a cam, and the like.

In an exemplary embodiment, a coming torque reduction device comprising an arc shaped flux conducting device coupled to a stator and configured to produce an anti-cogging torque waveform. The arc shaped conducting device comprises a first toothed shaped pole conducting portion and a second toothed shaped pole conducting portion, wherein the first pole conducting portion and second pole conducting portion are contiguous and whereby the flux conducting article conducts flux from a first pole on a rotor to a second pole on said rotor creating a flux path, and wherein the flux path does not link flux around a coil of the electrical machine. In an alternative embodiment, an arc shaped conducting device comprises a first pole conducting portion, a second pole conducting portion and a flux conducting coupling portion that couples the first pole conducting portion and second pole conducting portion, whereby magnetic flux passes from the first pole conducting portion through said flux coupling portion to said second pole conducting portion. A flux conducting coupling portion may be any suitable shape and configuration or material for conducting flux from a first and second pole conducting portion. For example, a flux conducting coupling portion may be a wire. In an exemplary embodiment, a flux conducting coupling portion is contiguous with the pole conducting portions, whereby the flux conducting coupling portion and pole conducting portions are formed from a single piece of material.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention. With reference to the following description, appended claims, and accompanying drawings:

FIGS. 4A and 4B illustrate an exemplary ring-shaped cogging torque reduction device in accordance with an exemplary embodiment;

FIGS. 4F and 4G illustrate close-up views of an exemplary cogging torque reduction device coupled to an electrical machine in accordance with an exemplary embodiment;

FIG. 5C illustrates an exemplary cogging torque reduction device coupled to a stator in accordance with an exemplary embodiment;

FIGS. 6E and 6F illustrate close-up views of an exemplary adjustable cogging torque reduction device coupled to an electrical machine in accordance with an exemplary embodiment;

FIG. 8C illustrates a close-up view of an exemplary cogging torque reduction device coupled to an electrical machine in accordance with an exemplary embodiment;

Figure 1B:
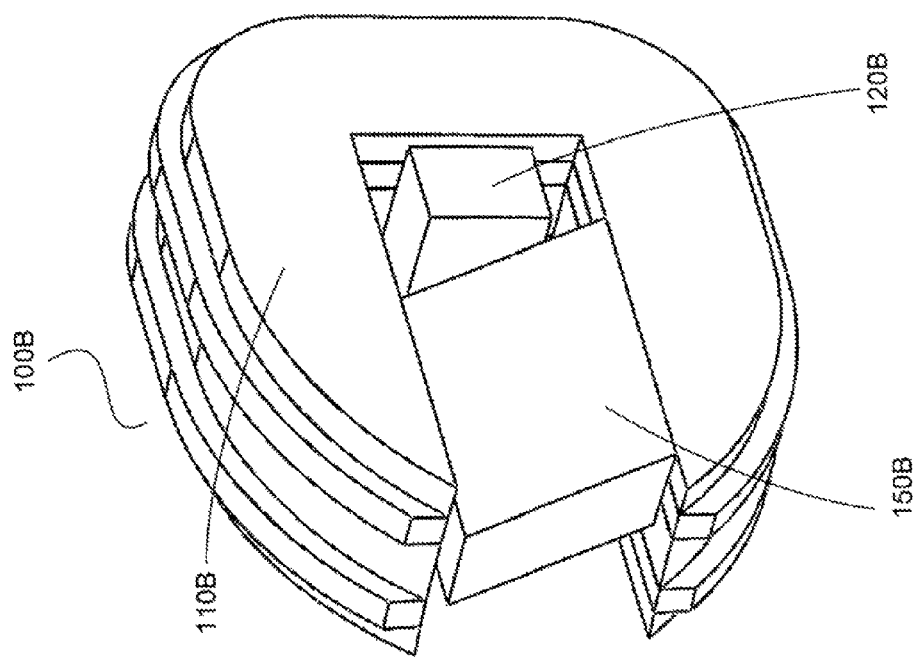
FIG. 1B illustrates an exemplary commutated flux machine in accordance with an exemplary embodiment.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of present disclosure and/or the appended claims.

For the sake of brevity, conventional techniques for electrical machine construction, management, operation, measurement, optimization, and/or control, as well as conventional techniques for cogging torque reduction and magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical machine, for example an AC synchronous electric motor.

Prior electric motors, for example conventional AC synchronous motors, suffer from various deficiencies. For example, many prior electric motors have high peak cogging torque, for example peak cogging torque in excess of five percent (5%) of the output torque of the motor, and thus are prone to excessive vibration and/or noise, particularly at high RPM operation.

Even certain prior transverse flux machines and/or commutated flux machines have been unable to overcome these difficulties. For example, certain prior transverse flux machines have suffered from comparatively high cogging torque. Additionally, prior approaches for reducing cogging torque in electrical machines have often resulted in significantly increased complexity, size, and/or expense of the resulting electrical machine. Moreover, prior approaches for reducing cogging torque have often negatively impacted the performance of the electrical machine.

In contrast, various of these issues with cogging torque in an electrical machine can be reduced and/or minimized by utilizing an electrical machine, for example a transverse flux machine and/or commutated flux machine, configured with one or more cogging torque reduction devices in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the machine operates, the electrical machine may be a pure "transverse" flux machine. In another exemplary embodiment, when a magnet and/or flux concentrating components are on a stator and/or are held stationary as the machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

Additionally, there is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Moreover, various principles of the present disclosure suitable for reducing cogging torque in transverse flux machines and/or commutated flux machines may also be desirably employed in certain conventional radial flux electrical machines, for example brushless DC motors. Additionally, various principles of the present disclosure may be applied in certain non-rotating electrical machines, for example linear motors.

Figure 1A:
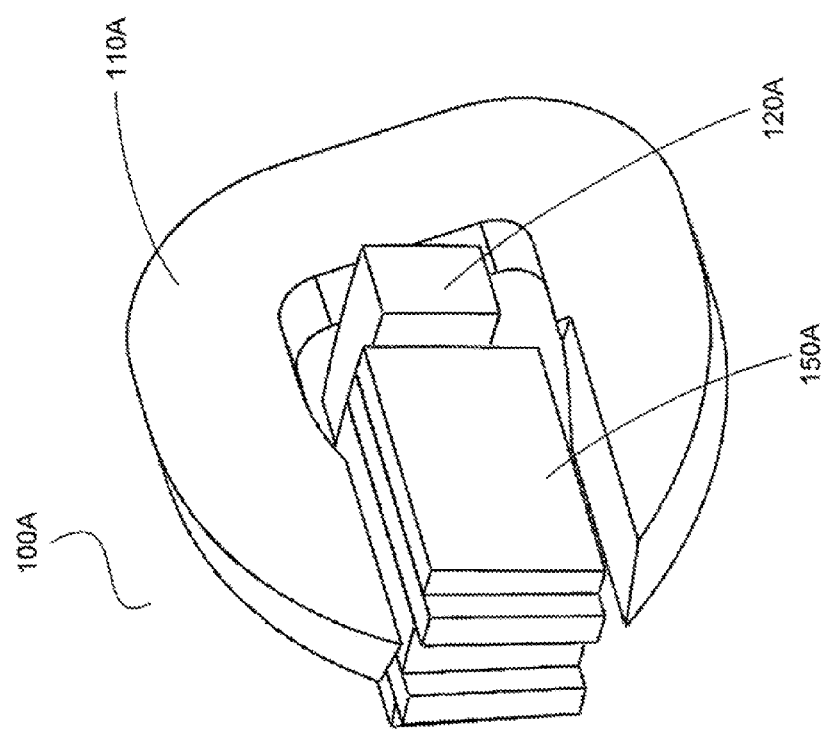
FIG. 1A illustrates an exemplary transverse flux machine in accordance with an exemplary embodiment.

In accordance with an exemplary embodiment, and with reference now to FIG. 1A, an electrical machine, for example transverse flux machine (TFM) 100A, generally comprises a rotor 150A, a stator 110A, and a coil 120A. Rotor 150A comprises a plurality of interleaved magnets 154 and flux concentrators 152. Rotor 150A is configured to interact with stator 110A in order to facilitate switching of magnetic flux. Stator 110A is configured to be magnetically coupled to rotor 150A, and is configured to facilitate flow of magnetic flux via interaction with rotor 150A. Stator 110A at least partially encloses coil 120A. Coil 120A is configured to generate a current output responsive to flux switching and/or accept a current input configured to drive rotor 150A. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 100A and/or components thereof.

In accordance with an exemplary embodiment, and with reference to FIG. 1B, an electrical machine, for example commutated flux machine (CFM) 100B, generally comprises a stator 110B, a rotor 150B, and a coil 120B. Stator 110B comprises a plurality of interleaved magnets 114 and flux concentrators 112. Stator 110B at least partially encloses coil 120B. Stator 110B is configured to interact with rotor 150B in order to facilitate switching of magnetic flux. Stator 110B is configured to be magnetically coupled to rotor 150B, and is configured to facilitate flow of magnetic flux via interaction with rotor 150B. Coil 120B is configured to generate a current output responsive to flux switching and/or accept a current input configured to drive rotor 15013. Commutated flux machine 100B may also comprise various structural components, for example components configured to facilitate operation of commutated flux machine 1008. Moreover, commutated flux machine 100B may comprise any suitable components configured to support, guide, modify, and/or otherwise manage and/or control operation of commutated flux machine 100B and/or components thereof.

Figure 2A:
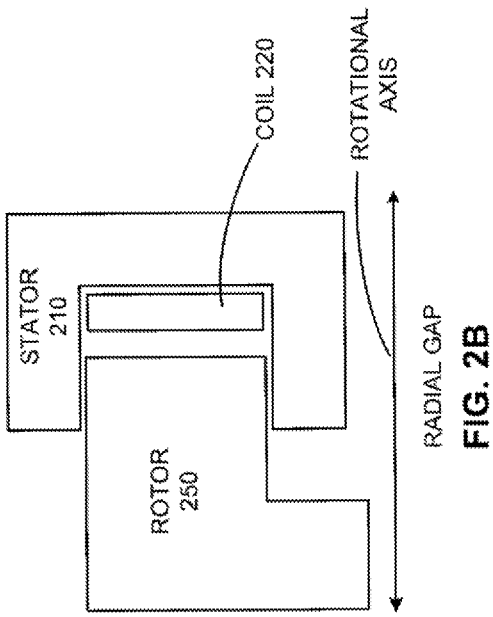
FIG. 2A illustrates an exemplary axial gap configuration in accordance with an exemplary embodiment.
Figure 2B:
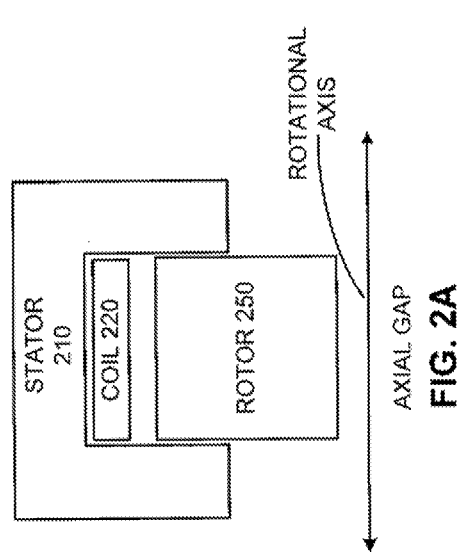
FIG. 2B illustrates an exemplary radial gap configuration in accordance with an exemplary embodiment.

Moreover, transverse flux machines and/or commutated flux machines may be configured in multiple ways. For example, with reference to FIG. 2A, a commutated flux machine may be configured with a stator 210 at least partially surrounding a coil 220 and generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap."

Figure 3A:
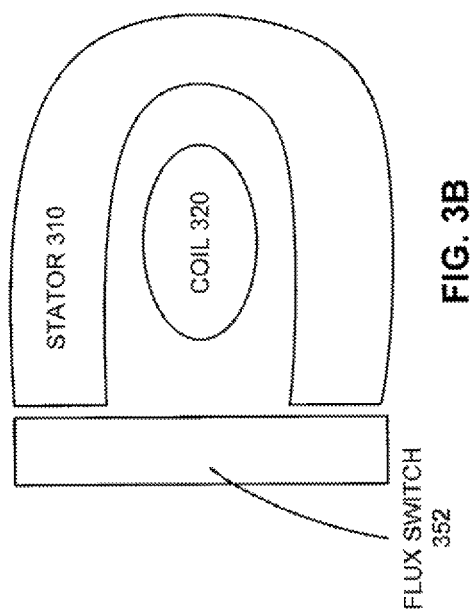
FIG. 3A illustrates an exemplary cavity engaged configuration in accordance with an exemplary embodiment.
Figure 3B:
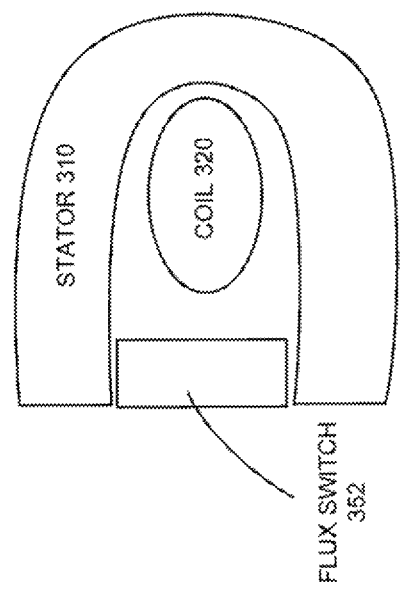
FIG. 3B illustrates an exemplary face engaged configuration in accordance with an exemplary embodiment.
Figure 3C:
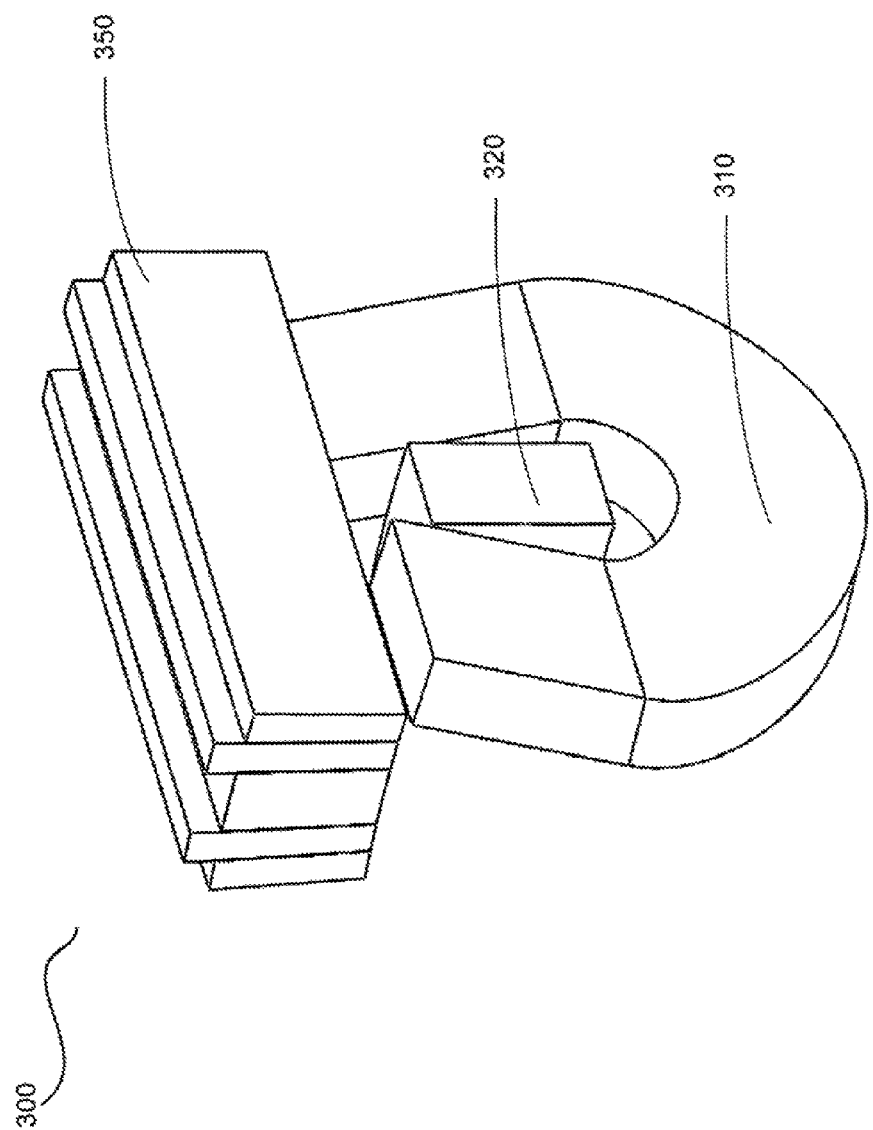
FIG. 3C illustrates an exemplary face engaged transverse flux configuration in accordance with an exemplary embodiment.

With reference now to FIG. 3A, a flux switch 352 in a commutated flux machine may engage a stator 310 at least partially surrounding a coil 320 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. For example, in an exemplary embodiment, with reference to FIG. 3C, a transverse flux machine 300 comprises a coil 320 at least partially surrounded by stator 310. Stator 320 is face engaged with rotor 350 in an axial gap configuration.

Due to manufacturing tolerance stack-up, variations in magnet strength, accuracy variations during a build, flux leakage, imbalances inherent in a particular electrical machine design, and other similar factors, most electrical machines operate with some degree of instantaneous cogging torque. Electrical machines may be designed to have low cogging torque, just as by analogy, vehicle tires may be designed to be rotationally balanced. When constructed, however, most electrical machines have a measurable amount of cogging torque. Similarly, by analogy, vehicle tires often have some degree of actual rotational imbalance when manufactured, and post-manufacturing balancing is often desirable. Vehicle tires are traditionally balanced via the addition of one or more tire weights as is known in the art, resulting in an improved degree of balance, reduced tire vibration, etc.

Similarly, an electrical machine may be "balanced" (i.e., may be configured to operate with a reduced amount of cogging torque) via the utilization of one or more cogging torque reduction devices. Stated generally, a cogging torque reduction device may be any component or combination of components configured to beneficially affect the cogging torque of an electrical machine. The cogging torque reduction device may be configured to generate a cogging torque waveform that at least partially counteracts the inherent cogging torque waveform that exists in an electrical motor that does not have the added cogging torque reduction device. In various exemplary embodiments, the cogging torque waveform arising from the cogging torque reduction device(s) is sized, aligned, and/or otherwise shaped and/or "matched" to at least partially counteract, cancel, and/or otherwise "balance" the cogging torque waveform arising from operation of the electrical machine.

The cogging torque reduction device may generate an at least partially counteracting cogging torque waveform by, for example, (1) conducting at least a portion of magnetic flux through the cogging torque reduction device (for example, via a cogging torque reduction device formed from a material configured to conduct magnetic flux), and/or (2) by causing at least a portion of magnetic flux to be affected by some other component in an electrical machine (for example, via a cogging torque reduction device formed from permanent magnet materials).

A cogging torque reduction device may be coupled to and/or positioned in any suitable location in an electrical machine. For example, it may be positioned on the outside of a rotor, on the inside of a rotor, on the outside of a stator, on the inside of a stator, between a rotor and a stator, alongside the rotor and/or stator, in the middle of a stator, and/or the like. Moreover, it may be positioned between a rotor and the rotational axis of an electrical machine; alternatively, the rotor may be positioned between the rotational axis of the electrical machine and the cogging torque reduction device. A cogging torque reduction device may be coupled to a rotor; a cogging torque reduction device may be coupled to a stator. Moreover, multiple cogging torque reduction devices may be utilized in an electrical machine, similar to how, by analogy, multiple tire weights may be utilized to rotationally balance a tire.

In various exemplary embodiments, a cogging torque reduction device configured in accordance with principles of the present disclosure interacts with existing permanent magnets in an electrical machine to reduce the overall cogging torque of the electrical machine. In certain exemplary embodiments, a cogging torque reduction device is configured to interact with a regularly spaced series of magnets and/or flux concentrators in an electrical machine. Moreover, in some exemplary embodiments, a cogging torque reduction device is configured to interact with magnets and/or flux concentrators in an electrical machine having irregular and/or otherwise variable timing and/or spacing.

Moreover, utilization of a cogging torque reduction device configured in accordance with principles of the present disclosure can create strongly preferred positions in an electrical machine. Such strongly preferred positions may arise because, for example, flux between opposite poles in the electrical machine is linked via the cogging torque reduction device and via the air-gap in the electrical machine, without linking a coil in the electrical machine.

With reference now to FIGS. 4A, 5A, 6A, 7A, 8A, and 9A, in accordance with various exemplary embodiments, a cogging torque reduction device (e.g., 470, 570, 670, 770, 870, 970, and/or the like) is configured with one or more pole conducting portions, or "teeth" configured to act as flux switches. While a cogging torque reduction device may be configured with various shapes, angles, geometries, layers, and/or the like, in various exemplary embodiments a cogging torque reduction device may at least partially resemble a "crown", for example an at least partially arc shape with one or more pole conducting portions, or teeth protruding therefrom. Accordingly, for brevity herein, various cogging torque reduction devices are generally referred to as a "crown", though it will be appreciated that principles of the present disclosure contemplate cogging torque reduction devices having a wide variety of shapes, geometries, thicknesses, widths, lengths, angles, and/or the like, many of which may not necessarily resemble a "crown", may not have an at least partially arctuate shape, and so forth.

Figure 4C:
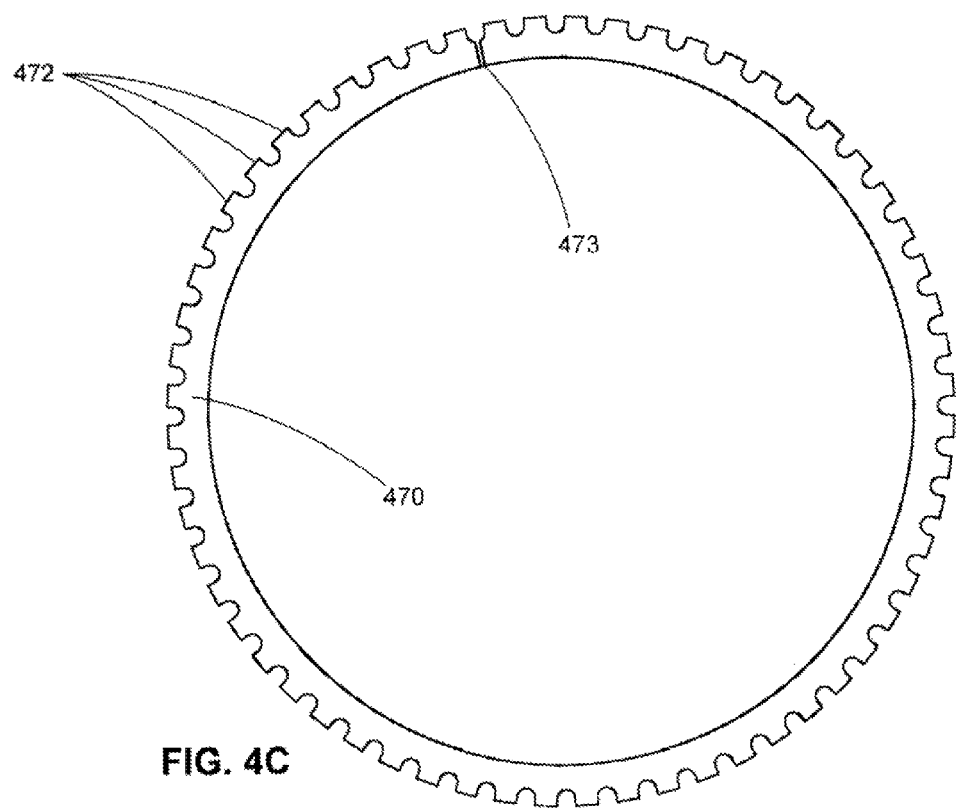
FIG. 4C illustrates an exemplary ring-shaped cogging torque reduction device having a gap therethrough in accordance with an exemplary embodiment.

Turning now to FIGS. 4A and 4B, in accordance with an exemplary embodiment a ring shaped cogging torque reduction device, for example crown 470, is configured with multiple teeth 472 thereon. The areas between teeth 472 may be considered to be, "spaces" or "slots" and may comprise various shapes. For example, a slot may comprise a cylindrical shape, an elliptical shape, a triangular shape, a rectangular shape, a trapezoidal shape, and/or any suitable shape(s) or portion(s) thereof. Similarly, teeth 472 may comprise various shapes. For example, a tooth 472 may comprise a rectangular shape, a triangular shape, a square shape, a parabolic shape, a tapered shape, a "fin" shape, and/or any other suitable shape or geometries (whether symmetrical, asymmetrical, irregular, and/or combinations thereof) configured to allow tooth 472 to act as a flux switch. As shown in FIG. 4A-4H the teeth extend outwardly from the contiguous flux conducting coupling portion.

Crown 470 may comprise any suitable materials configured to conduct (or effect) magnetic flux. For example, in various exemplary embodiments wherein crown 470 comprises "soft" magnetic materials, crown 470 may comprise silicon steel, powdered metals, plated powdered metals, soft magnetic composites, amorphous metals, nanocrystalline composites, iron-cobalt alloys, and/or the like and/or combinations of the same. In an exemplary embodiment, crown 470 comprises M19 silicon steel. Crown 470 may also comprise cold rolled grain oriented ("CRGO") silicon steel, nickel-based alloys (e.g., Carpenter brand high-permeability "49" alloy and/or the like), cobalt-based alloys (e.g., "Hiperco" Trademark cobalt-based materials and/or the like), nickel-cobalt alloys, and/or the like. Moreover, crown 470 may comprise any suitable material having a desired electrical resistivity and/or magnetic permeability. Crown 470 may be monolithic; alternatively, crown 470 may comprise layers and/or segments of dissimilar materials. In an exemplary embodiment, crown 470 comprises layers of planar material bonded together.

Moreover, in various exemplary embodiments wherein crown 470 comprises "hard" magnetic materials, crown 470 may comprise aluminum-nickel-cobalt alloys, rare earth alloys (e.g., samarium-cobalt, neodymium-iron-boron, and the like), ceramics (e.g. ferrites), and/or any other suitable materials configured to operate as a permanent magnet.

Crown 470 may be formed via any suitable process and/or method. In an exemplary embodiment, crown 470 is formed by molding a desired shape from powdered metal or other suitable material. In another exemplary embodiment, crown 470 is formed by removing material from a generally ring-shaped piece of monolithic material (e.g., silicon steel), for example by machining. In another exemplary embodiment, crown 470 is formed by stamping a sheet of planar material. Moreover, crown 470 may be cast, pressed, sintered, die-cut, machined, stamped, bonded, laminated, polished, smoothed, bent, molded, plated, coated, and/or otherwise shaped and/or formed via any suitable method and/or apparatus.

In various exemplary embodiments, crown 470 is configured with an electrically insulating coating and/or finish on the exterior of crown 470. The insulating coating may comprise any suitable coating configured to provide a desired level of electrical insulation. For example, in one exemplary embodiment crown 470 is coated with an oxide finish. In another exemplary embodiment, crown 470 is coated with an organic-based varnish. In various exemplary embodiments, crown 470 is coated with one or more of oxidized silicon, a "C-5" coating, and/or a polyimide film (e.g., Kapton® brand film and/or the like). Moreover, crown 470 may be coated, covered, finished, and/or otherwise at least partially electrically insulated via any suitable method or process, and with any suitable material or combination of materials.

Turning now to FIG. 4C, in various exemplary embodiments electrical currents induced in crown 470 (for example, responsive to rotation of a rotor in an electrical machine) may be reduced by modifying crown 470 to interrupt a continuous electrical circuit therein. In an exemplary embodiment, crown 470 is configured with a narrow cut completely therethrough creating a "gap" 473, breaking the electrical circuit. In one exemplary embodiment, gap 473 is about 0.02" thick. In another exemplary embodiment, gap 473 is about 0.04" thick. Moreover, gap 473 may be any suitable width, as desired. The cogging torque reduction devices shown in FIG. 4A-4C are all contiguous, consisting of a single piece of material.

Additionally, multiple gaps 473 may be configured in crown 470, thus dividing crown 470 into multiple "segments". This may be done in order to reduce losses due to voltages induced in crown 470. Moreover, it will be appreciated that the "segments" may be independently timed from one another to allow for shaping of a cogging torque waveform. Additionally, segmentation of crown 470 can prevent crown 470 and/or portions thereof from making undesirable electrical connections within an electrical machine. Additional details regarding segmenting, consequent reductions in motor losses, materials for laminations, and/or the like may be found in U.S. Provisional Patent Application Ser. No. 61/414,769 filed on Nov. 17, 2010 and entitled "TRANSVERSE AND/OR COMMUTATED FLUX SYSTEMS HAVING SEGMENTED STATOR LAMINATIONS", the contents of which are hereby incorporated by reference in their entirety.

Figure 4D:
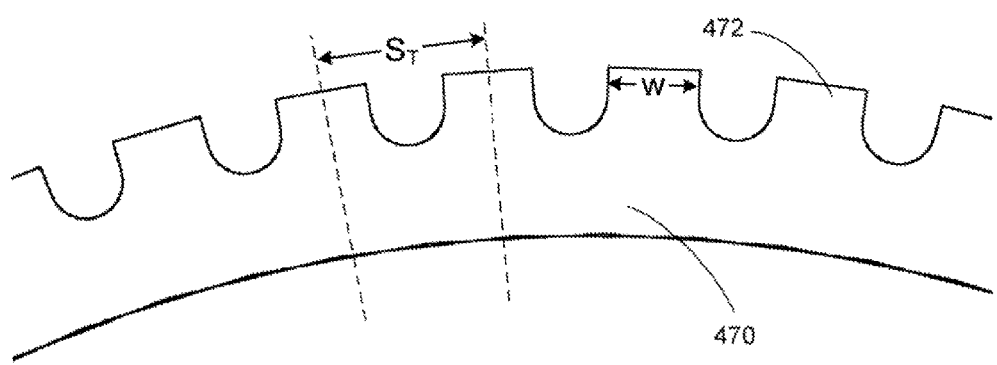
FIG. 4D illustrates configuration of teeth on an exemplary cogging torque reduction device in accordance with an exemplary embodiment.

With reference now to FIG. 4D, in various exemplary embodiments, teeth 472 on crown 470 are configured with a width W. In an exemplary embodiment, all teeth 472 on crown 470 have a common width W; in other exemplary embodiments various teeth 472 on crown 470 differ from one another in width W. In various exemplary embodiments, a tooth 472 is configured with a width W which may be as small as about one-tenth the width of a stator tooth 412 in electrical machine 400. In certain exemplary embodiments, a tooth 472 is configured with a width W which may be as large as the center-to-center distance between successive, opposite pole flux concentrators 452 in rotor 450. The frequency, harmonic content, amplitude, and/or other aspects of the cogging torque waveform arising from crown 470 vary as W varies. Therefore, W may be varied to achieve a desired cogging torque frequency, waveform shape, and/or the like.

Additionally, crown 470 is configured with a center-to-center spacing $S_T$ between adjacent teeth 472. Spacing $S_T$ may be consistent across crown 470; alternatively, spacing $S_T$ may vary between teeth 472 of crown 470. In various exemplary embodiments, spacing $S_T$ is selected in order to provide a flux path between portions of an electrical machine having opposite magnetic polarities. Stated another way, teeth 472 on crown 470 may be spaced via spacing $S_T$ such that consecutive teeth 472 are configured to align with successive flux concentrating components (and/or successive magnets) in a rotor, where the successive components have an opposite polarity from one another. Phrased differently, crown 470 acts to create a partial magnetic "short" between portions of an electrical machine having opposite polarities, for example portions of a rotor. Via teeth 472, crown 470 completes a magnetic circuit from a first portion of a rotor to a second portion of a rotor. The resulting magnetic circuit does not extend around a coil of the electrical machine. By linking adjacent north and south poles in a rotor of an electrical machine, crown 470 generates a cogging torque waveform responsive to rotation of the rotor and consequent movement of flux through crown 470.

Flux flow through crown 470 responsive to movement of a rotor generates a cogging torque waveform in an electrical machine. Stated generally, the cogging torque waveform arising from crown 470 may be utilized to at least partially counteract, cancel out, and/or otherwise "balance" a cogging torque waveform arising from one or more other components of the electrical machine. By varying the spacing $S_T$ between teeth 472, the width W of teeth 472, the number of teeth 472, the shape of teeth 472, the thickness of crown 470, the material(s) comprising crown 470, the air-gap between teeth 472 and the rotor, the angular position of crown 470 with respect to a stator of the electrical machine, and/or the like, the cogging torque waveform arising from crown 470 may be varied and/or modified. In this manner, crown 470 may be customized to more effectively cancel out a cogging torque waveform in the electrical machine, resulting in an electrical machine with a reduced overall cogging torque.

It will be appreciated that the flux path afforded by crown 470 is more "direct" as compared to flux paths through stator 410, which typically link a coil. The more direct flux paths through crown 470 can create a higher amplitude of cogging torque per unit mass in crown 470 as compared to the amplitude of cogging torque per unit mass generated in stator 410. Generally speaking, this can arise because of the direct north-south coupling, as well as because of the lower reluctance of the magnetic pathway passing through crown 470. Because crown 470 (and other cogging torque reduction devices disclosed herein) typically generates a higher amount of cogging torque per unit mass than does stator 410, a relatively small crown 470 can partially and/or fully counteract, counter, and/or otherwise "balance" cogging torque arising in a much larger electrical machine 400.

For example, in an exemplary embodiment, the cogging torque waveform of an electrical machine comprising approximately three kilograms of active magnetic and/or electrical materials was reduced by more than 80% by use of a cogging torque reduction device having a mass of less than twenty (20) grams. Moreover, a cogging torque reduction device, for example crown 470, may be configured with any suitable mass, density, and/or other physical characteristics, and the examples herein are provided by way of illustration and not of limitation.

Figure 4E:
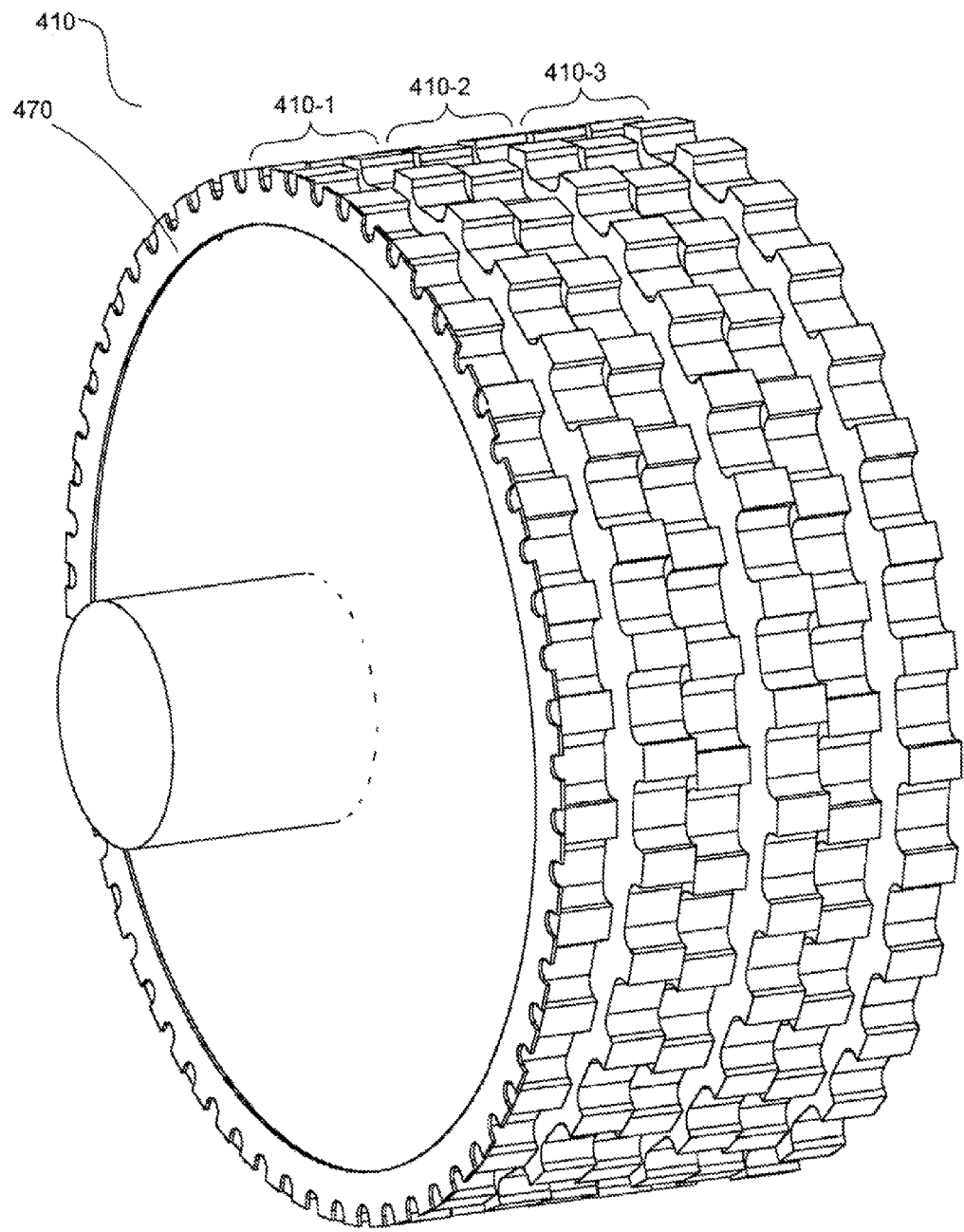
FIG. 4E illustrates an exemplary cogging torque reduction device coupled to a stator in accordance with an exemplary embodiment.
Figure 4H:
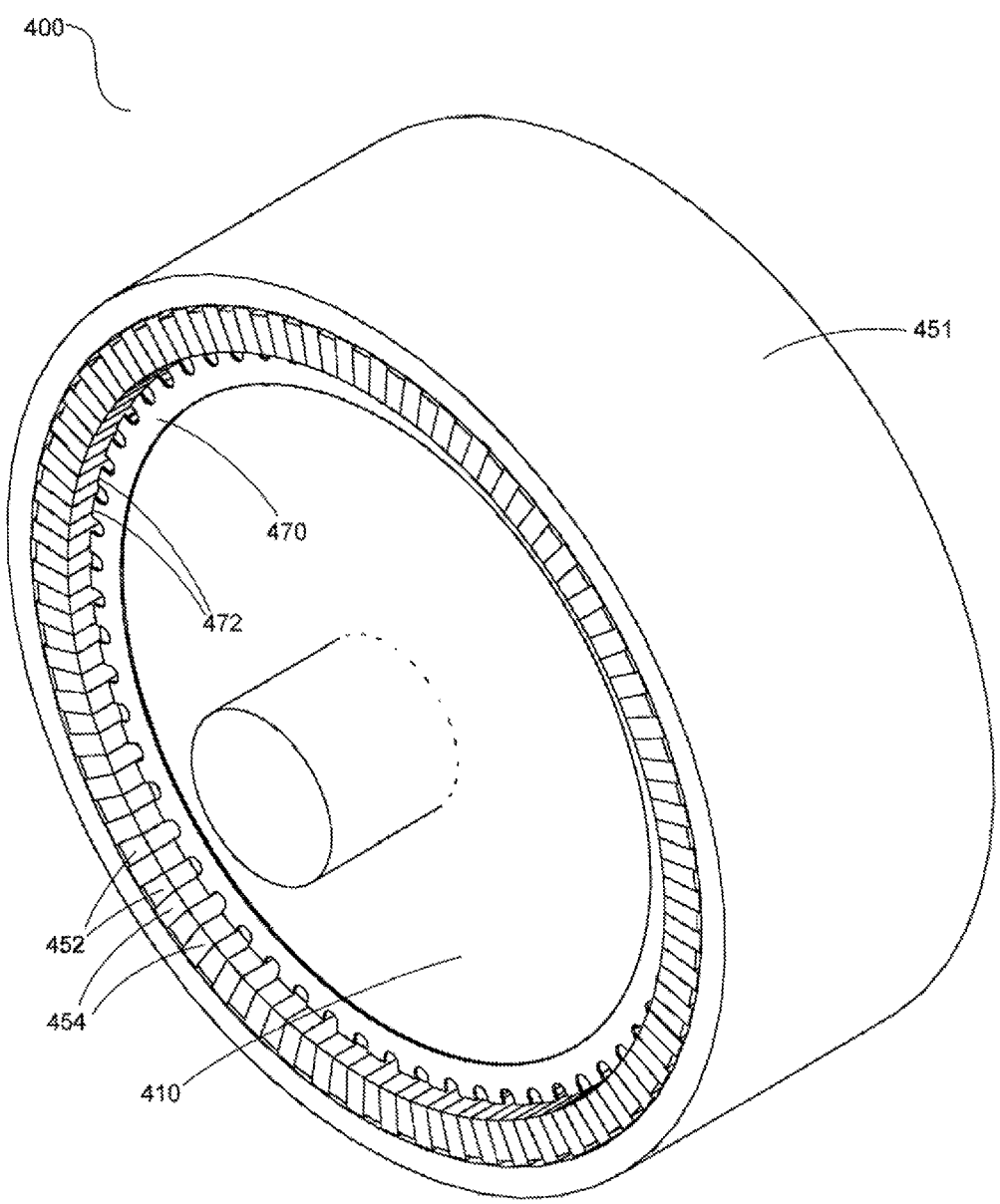
FIG. 4H illustrates an exemplary transverse flux machine configured with an exemplary cogging torque reduction device in accordance with an exemplary embodiment.

With reference now to FIGS. 4E and 4H, in an exemplary embodiment crown 470 is positioned in a suitable location in electrical machine 400, for example on one end of stator 410. Electrical machine 400 may be single-phase; alternatively, electrical machine 400 may comprise a polyphase device. In an exemplary embodiment, electrical machine 400 comprises a polyphase device having three stator portions 410-1, 410-2, and 410-3, each corresponding to a different phase. Crown 470 may be coupled to the stator via any suitable methods and/or devices, for example via gluing, welding, fasteners, and/or the like. In an exemplary embodiment, a single cogging torque reduction device may be used to counteract cogging torque arising from multiple stators and/or phases in an electrical machine. In other exemplary embodiments, multiple cogging torque reduction devices may be used to counteract togging torque arising from a single stator and/or phase in an electrical machine.

Turning to FIGS. 4F and 4G, in various exemplary embodiments crown 470 is positioned in electrical machine 400 in order to interact with a rotor, for example rotor 450. In an exemplary embodiment, rotor 450 comprises a rotor body 451 coupled to alternating and interleaved magnets 454 and flux concentrators 452. Crown 470 may be positioned to achieve a suitable air-gap between crown 470 and rotor 450, for example an air-gap of between about 0.005" and about 0.060". In various exemplary embodiments, crown 470 is configured with teeth 472 that are more closely spaced than stator teeth 412 in stator 410, so that teeth 472 may directly link adjacent north and south poles in rotor 450.

In various exemplary embodiments, crown 470 may be configured to be "thin" in an axial direction compared to a stator portion, for example stator portion 410-1. In an exemplary embodiment, crown 470 comprises a single lamination having a thickness of between about 0.4 mm and about 2 mm. Crown 470 may be formed from the same material as stator portions 410-1, 410-2, and/or 410-3; moreover, crown 470 may be formed from different material(s) than the material(s) comprising stator 410.

In certain exemplary embodiments, with particular reference to FIG. 4F, crown 470 may be configured to be thin so as to interact with rotor 450 along an "overhung" portion of rotor 450. In this manner, crown 470 may be utilized in connection with electrical machine 400 without increasing the length of electrical machine 400 along the rotational axis. Moreover, configuring crown 470 to interact with rotor 450 along an "overhung" portion of rotor 450 allows for convenient coupling of crown 470 to a side of stator 410. Additional details regarding principles for overhung rotors may be found in U.S. patent application Ser. No. 12/772,958 filed on May 3, 2010, entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety.

Figure 4I:
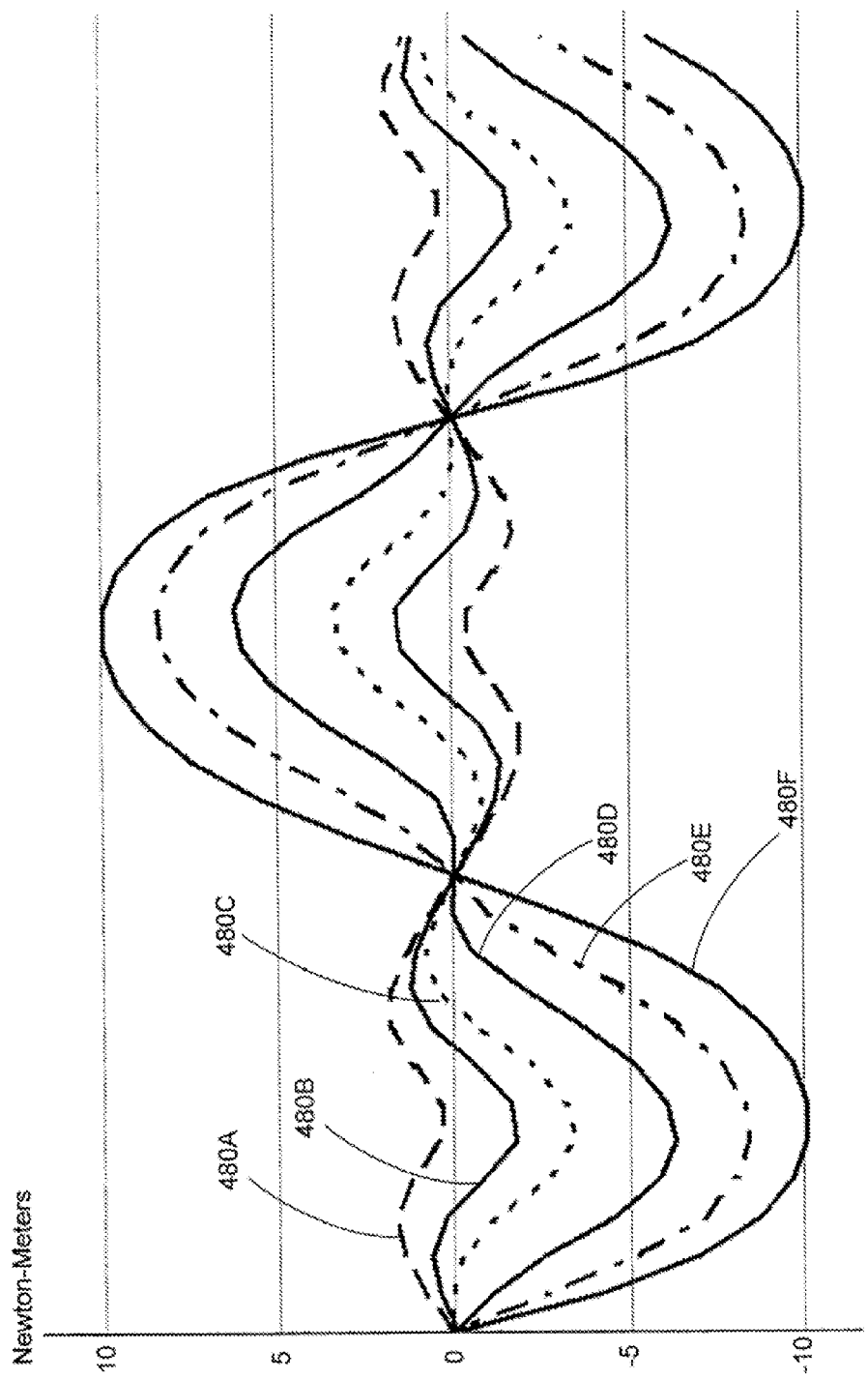
FIG. 4I illustrates various exemplary cogging torque waveforms arising from various exemplary cogging torque reduction devices in accordance with an exemplary embodiment.

Turning now to FIG. 4I, in an exemplary embodiment, by varying one or more characteristics of a cogging torque reduction device, for example the width W of a tooth 472, a cogging torque waveform 480 arising from the interaction of a cogging torque reduction device (for example, crown 470) and a portion of an electrical machine (for example, a rotor) may be modified, as desired. Certain details regarding various exemplary modeled cogging tooth waveforms 480 are presented in Table 1 below.

TABLE 1

| Width W of Teeth | Cogging Tooth Waveform | Cogging Torque Peak Magnitude (Newton-meters) |
| --- | --- | --- |
| 3 mm | 480F | 10.09 |
| 3.5 mm | 480E | 8.44 |
| 4 mm | 480D | 6.28 |
| 4.5 mm | 480C | 3.48 |
| 4.75 mm | 480B | 1.76 |
| 5 mm | 480A | 1.85 |

A cogging torque reduction device can be configured to achieve a desired shape (e.g., a desired harmonic content) and/or amplitude of a cogging tooth waveform, for example cogging torque waveforms 480A through 480F. These cogging torque waveforms, in turn, may at least partially cancel a cogging tooth waveform present in an electrical machine, for example electrical machine 400 (and/or electrical machines 500, 600, 700, 800, 900, 1000, 1200, and 1700, discussed hereinbelow). The cogging torque waveforms 480A through 480F created by the cogging torqued reduction device, described herein, may be referred to as anti-cogging waveforms.

Turning now to FIGS. 5A-5C and 5E, in various exemplary embodiments, a cogging torque reduction device, for example contiguous crown 570, is configured with one or more teeth 572 and with one or more mounting holes 574. Via mounting holes 574, crown 570 may be coupled to a stator 510, for example via one or more mechanical fasteners. Stator 510 may comprise a first stator portion 510-A and a second stator portion 510B; crown 570 may be coupled to stator 510 at any suitable location and/or via any suitable method and/or apparatus. Crown 570 may be monolithic; alternatively, crown 570 may be composed of one or more individual components, for example laminations. In an exemplary embodiment, crown 570 is comprised of the same laminated material that forms at least a portion of stator 510.

In various exemplary embodiments, crown 570 may be configured with any suitable number of teeth 572, or pole conducting portion including, but not limited to, one tooth 572, two teeth 572, three teeth 572, more than five teeth 573, more than ten teeth 572, more than 30 teeth 572, and/or additional teeth 572, as desired. In an exemplary embodiment, crown 570 is configured with five teeth 572. It will be appreciated that each tooth 572 may provide a flux path in electrical machine 500; accordingly, increasing the number of teeth 572 will increase the amount of flux switched through crown 570, other factors being equal. Consequently, increasing the number of teeth 572 may increase the amplitude of the cogging torque waveform arising from crown 570, other factors being equal. Moreover, increasing the number of teeth 572 may also modify the shape of the cogging torque waveform arising from crown 570, for example due to the spacing between teeth 572 and/or variations therein, the shape of teeth 572 and/or variations therein, and/or the like. In certain exemplary embodiments, changing the spacing between teeth 572 may be utilized in order to alter frequency and/or shape of the cogging torque waveform arising from crown 570, for example within even multiples of the frequency of electrical machine 500.

Figure 5A:
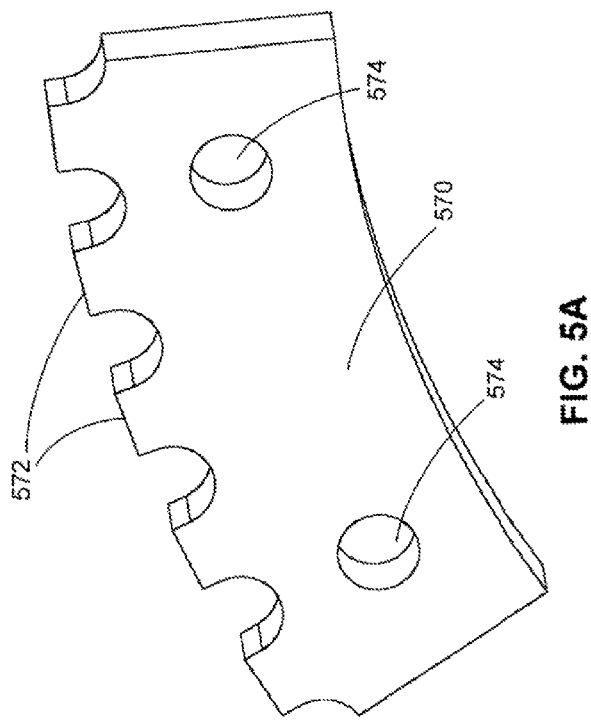
FIGS. 5A and 5B illustrate an exemplary "crown"-like cogging torque reduction device in accordance with an exemplary embodiment.
Figure 5B:
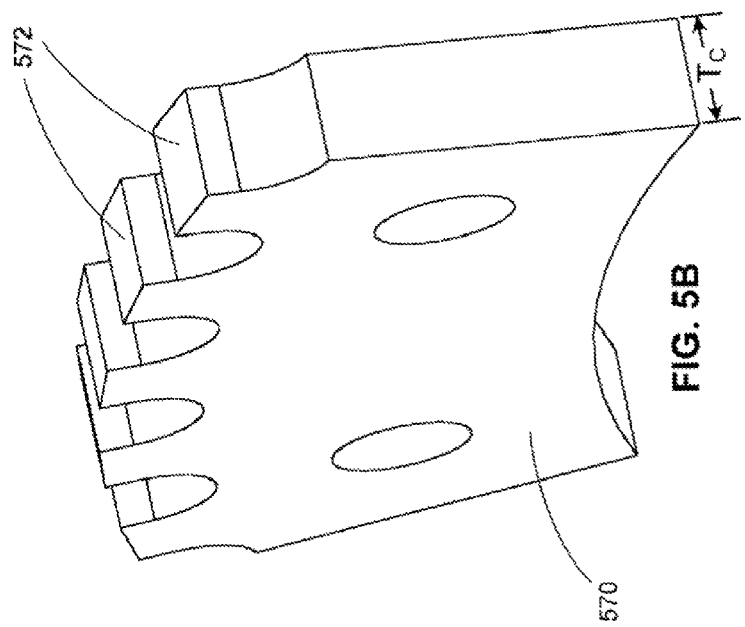

With particular reference now to FIG. 5B, in various exemplary embodiments crown 570 is configured with a thickness $T_C$. In various exemplary embodiments, thickness $T_C$ is between about 0.4 millimeters and about 20 millimeters. However, thickness $T_C$ may be any suitable thickness configured to facilitate switching a desired amount of flux through crown 570.

In various exemplary embodiments, thickness $T_C$ is configured to be large enough to cause at least a portion of crown 570 to extend beyond an overhung portion of rotor 550 in the axial direction. In other exemplary embodiments, thickness $T_C$ is configured to be small enough such that crown 570 does not extend beyond an overhung portion of rotor 550 in the axial direction. In various exemplary embodiments, thickness $T_C$ is between about 5% of the overhanging distance of the rotor to about 75% of the overhanging distance of the rotor. It will be appreciated that, generally speaking, increasing thickness $T_C$ will increase the amplitude of the cogging torque waveform arising from crown 570, other factors being equal. Moreover, increasing thickness $T_C$ may also modify the shape of the cogging torque waveform arising from crown 570, for example due to the varying interaction of crown 570 with rotor 550 as crown 570 is extended past the end of rotor 550.

Figure 5D:
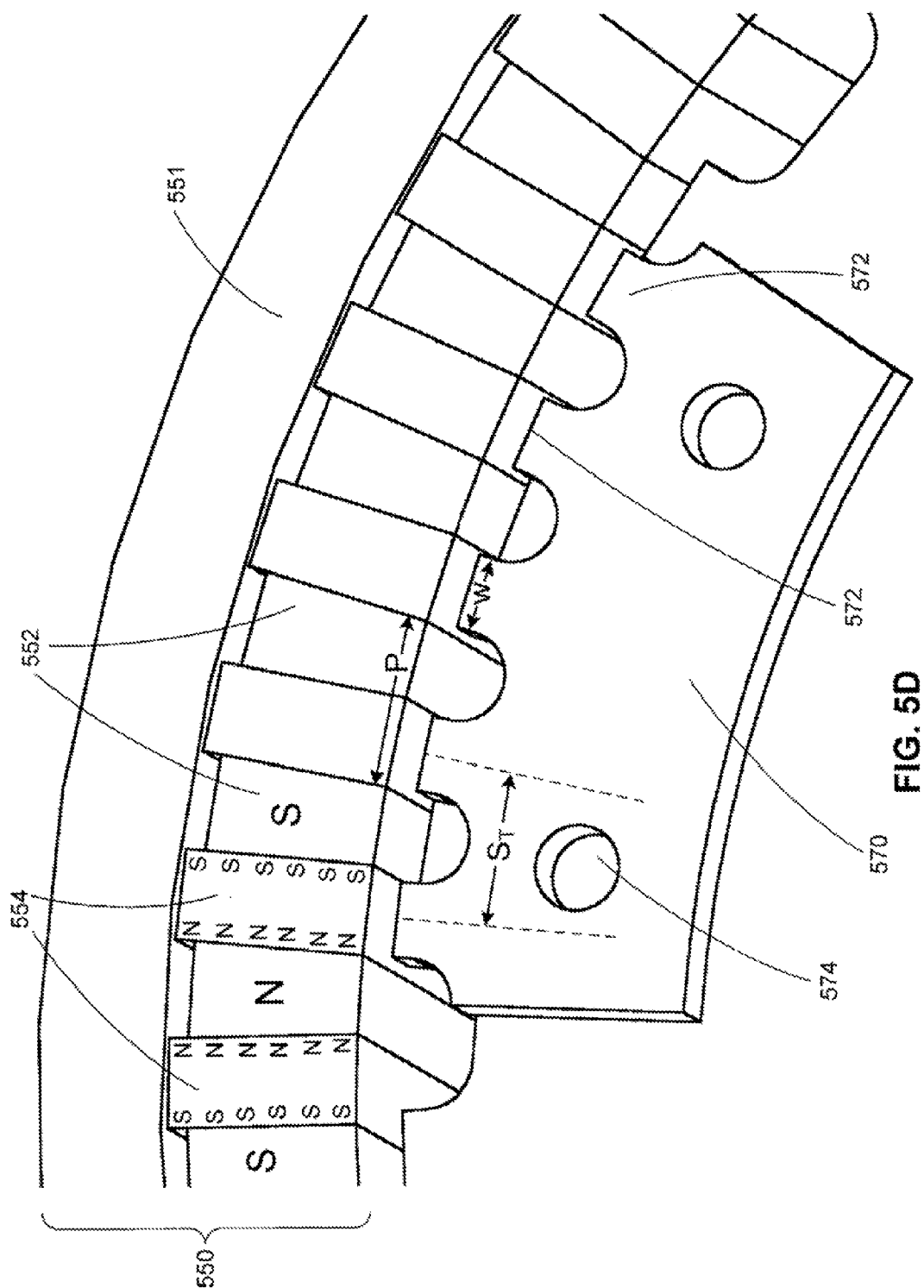
FIG. 5D illustrates a close-up view of an exemplary cogging torque reduction device coupled to an electrical machine in accordance with an exemplary embodiment.
Figure 5E:
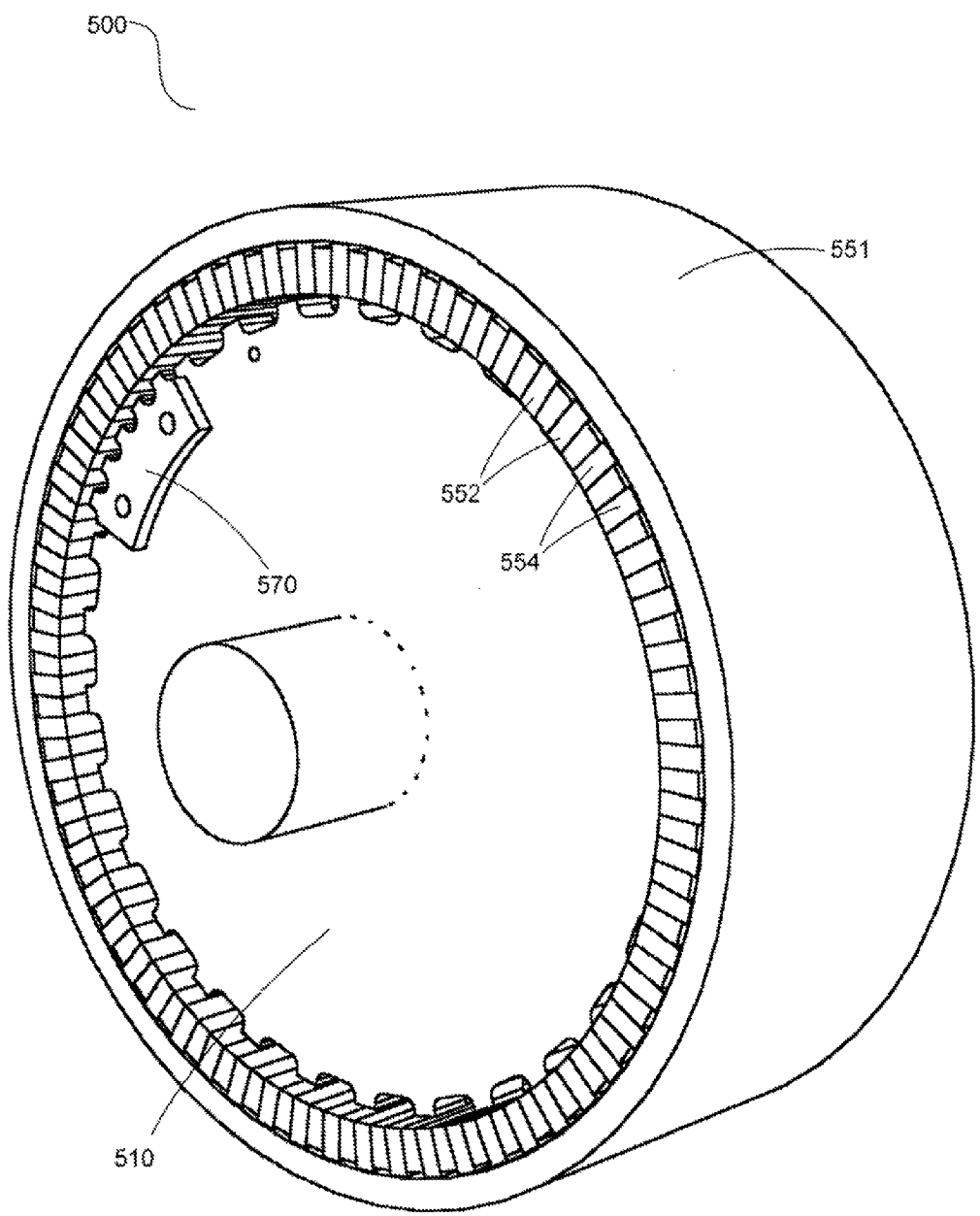
FIG. 5E illustrates an exemplary transverse flux machine configured with an exemplary crown-like cogging torque reduction device in accordance with an exemplary embodiment.

Turning now to FIGS. 5C and 5D, in various exemplary embodiments crown 570 is positioned in electrical machine 500 in order to interact with a rotor, for example rotor 550. Similar to teeth 472 of crown 470, teeth 572 of crown 570 are configured to complete a magnetic circuit from a first portion of rotor 550 (for example, a first flux concentrator 552 having a first polarity) to a second portion of rotor 550 (for example, a second flux concentrator 552 having an opposite polarity). The resulting magnetic circuit does not extend around a coil of the electrical machine. By linking adjacent north and south poles in rotor 550 of electrical machine 500, crown 570 generates a cogging torque waveform responsive to rotation of rotor 550. The cogging torque waveform arises from movement of flux through crown 570.

With particular reference now to FIG. 5D, in various exemplary embodiments crown 570 is configured with spacing $S_T$ that is related to pole pitch P in rotor 550. Rotor 550 may be configured with any suitable number of poles, for example 30 poles, 60 poles, 72 poles, 120 poles, and/or more poles, as desired. Moreover, pole pitch P in rotor 550 may be any suitable linear and/or angular distance. For example, in various exemplary, embodiments wherein rotor 550 is configured with 60 poles, pole pitch P is about 6 degrees. In these exemplary embodiments, pole pitch P is also between about 3 millimeters and about 20 millimeters. Moreover, it will be appreciated that the linear distance of pole pitch P may vary from electrical machine to electrical machine, even when the angular distance of pole pitch P remains constant, for example due to the respective electrical machines having different diameters.

In various exemplary embodiments, spacing $S_T$ in crown 570 is between about 25% of pole pitch P and about 300% of pole pitch P. In certain exemplary embodiments, spacing $S_T$ in crown 570 is between about 75% of pole pitch P and about 125% of pole pitch P. In an exemplary embodiment, spacing $S_T$ in crown 570 is approximately equal to pole pitch P.

In certain exemplary embodiments wherein crown 570 comprises two teeth 572, spacing $S_T$ may be as large as 180 angular degrees. Stated differently, crown 570 may be configured with as few as two teeth 572, equally spaced from one another around an electrical machine. Moreover, in other exemplary embodiments wherein crown 570 comprises three teeth 572, spacing $S_T$ may be as large as 120 angular degrees. Moreover, spacing $S_T$ in crown 570 may be selected to be any suitable spacing $S_T$, as desired, in order to generate a desired cogging torque waveform, and the foregoing examples are provided by way of illustration and not of limitation.

Turning now to FIGS. 6A through 6G, in various exemplary embodiments a cogging torque reduction device, for example crown 670, is configured to be adjustable with respect to an air-gap in an electrical machine 600. In an exemplary embodiment, crown 670 is configured with one or more teeth 672. Crown 670 is further configured with a mounting hole 674 and a slot 676.

Slot 676 is a position adjustment feature, and may be sized and/or shaped in order to permit crown 670 to at least partially pivot, slide, translate, and/or otherwise move with respect to rotor 650. In an exemplary embodiment, slot 676 is configured as a rounded trench extending in a generally radial direction from the rotational axis of electrical machine 600. Moreover, slot 676 may be angled, rounded, tapered, and/or otherwise sized and/or shaped in any suitable manner to allow crown 670 to move with respect to rotor 650.

Figure 6A:
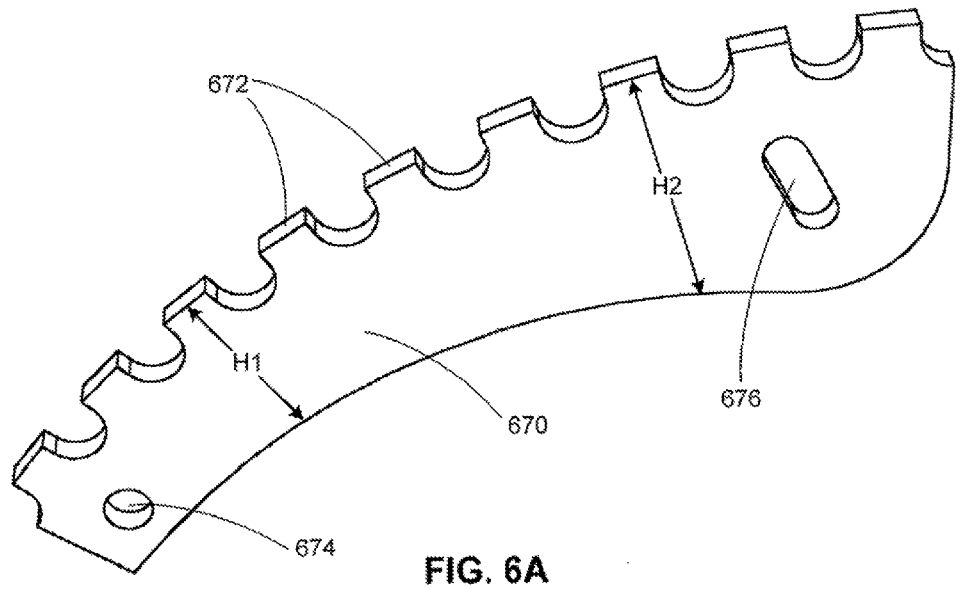
FIG. 6A illustrates an exemplary adjustable cogging torque reduction device in accordance with an exemplary embodiment.
Figure 6B:
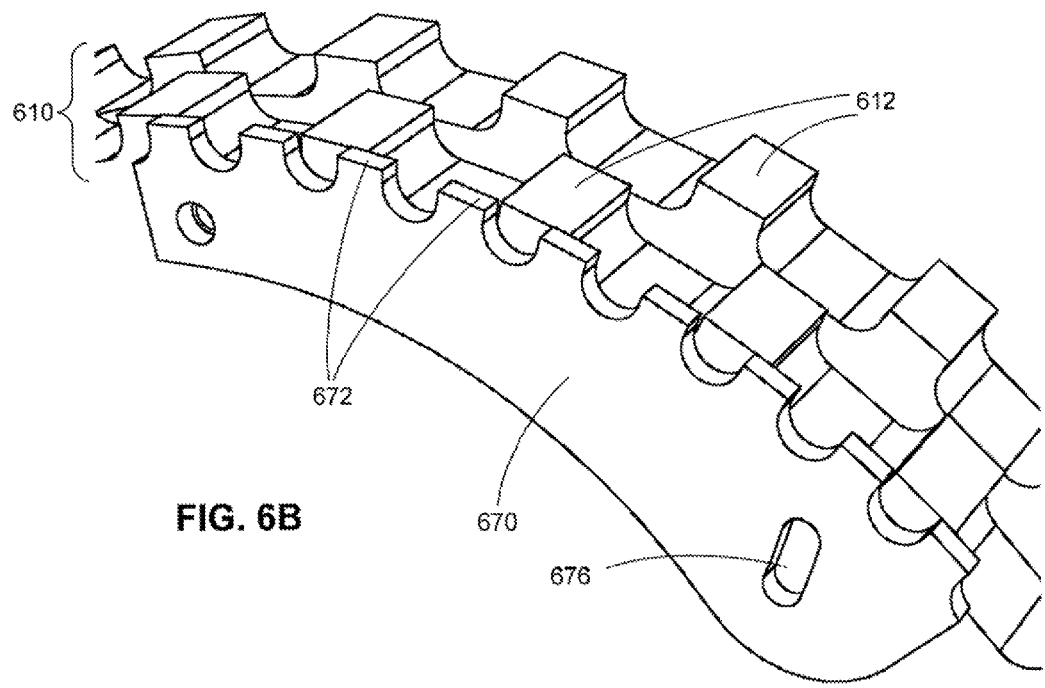
FIG. 6B illustrates an exemplary adjustable cogging torque reduction device coupled to a stator in accordance with an exemplary embodiment.

In order to accommodate a desired length of slot 676, crown 670 may be at least partially tapered, angled, rounded, and/or otherwise have a varying height in a radial direction. For example, as illustrated in FIG. 6A, in certain exemplary embodiments crown 670 is configured with a first height H1 toward a first end of crown 670 (for example, the end near mounting hole 674), and a second, larger height H2 toward a second end of crown 670 (for example, the end near slot 676).

In various exemplary embodiments, height H1 may be between about 25% and about 90% of height H2. In one exemplary embodiment, height H1 is about 45% of height H2. It will be appreciated that crown 670 may smoothly increase in height along the length of crown 670; alternatively, crown 670 may be configured with abrupt changes in height along the length of crown 670, for example in a stair-step fashion. Moreover, crown 670 may also have a consistent height along most of the length of crown 670, with only a certain portion of crown 670 extending in a flange-like manner to at least partially form, define, and/or contain slot 676. Crown 670 may desirably be utilized, for example, to accommodate manufacturing differences in a mass produced electrical machine, as modifying the cogging torque of the electrical machine may be as simple as pivoting crown 670.

In various exemplary embodiments, crown 670 is coupled to stator 610 via one or more fasteners. A releasable and/or adjustable fastener may be utilized in connection with slot 676 to enable adjustment and/or movement of crown 670. For example, a cam may be utilized in connection with slot 676 in order to at least partially pivot crown 670 about a fastener passing through mounting hole 674. In this manner, teeth 672 of crown 670 may be moved closer to and/or further away from rotor 650. Stated another way, via slot 676 the effective air-gap between crown 670 and rotor 650 may be varied. By varying the air-gap, the cogging tooth waveform arising from crown 670 may be manipulated, as desired, in order to more effectively cancel out cogging torque arising in electrical machine 600.

Figure 6C:
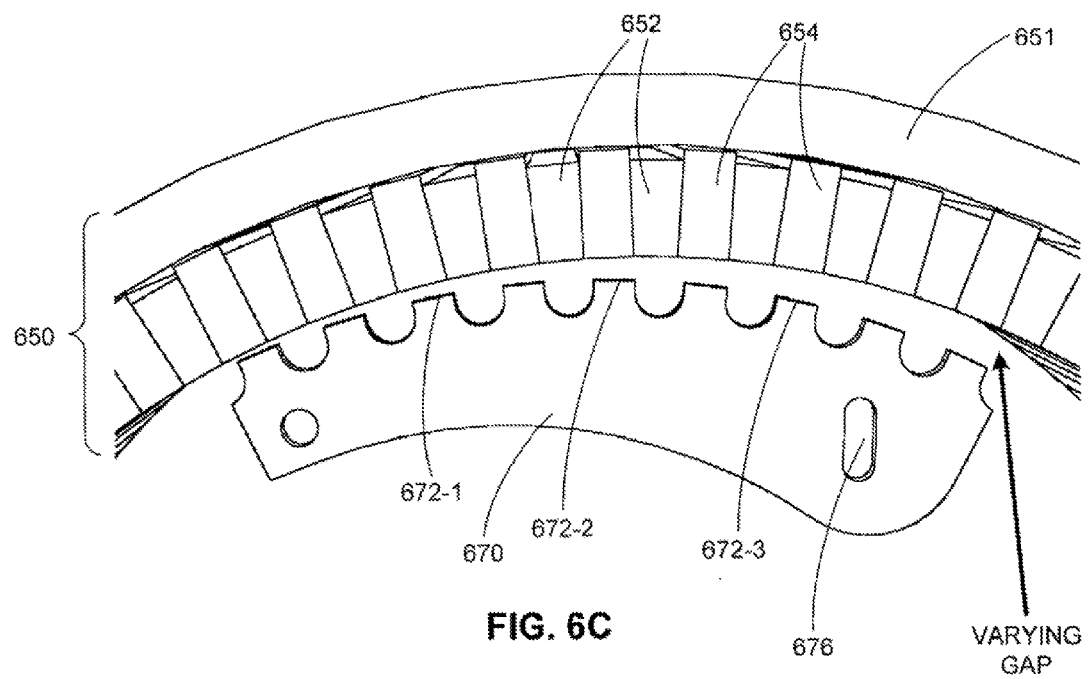
FIG. 6C illustrates an exemplary adjustable cogging torque reduction device in a first position with respect to a rotor in accordance with an exemplary embodiment.

For example, with reference now to FIGS. 6C through 6F, in various exemplary embodiments crown 670 may be adjusted into a desired position with respect to rotor 650. In various positions, for example as illustrated in FIGS. 6C and 6F, crown 670 may be "angled" with respect to rotor 650. Consequently, the air-gap between rotor 650 and the teeth 672 of crown 670 is not constant along the length of crown 670. Stated another way, in these positions tooth 672-1 is closer to (i.e., has a smaller air-gap between) rotor 650 than tooth 672-2, which in turn is closer to rotor 650 than tooth 672-3, and so forth.

Figure 6D:
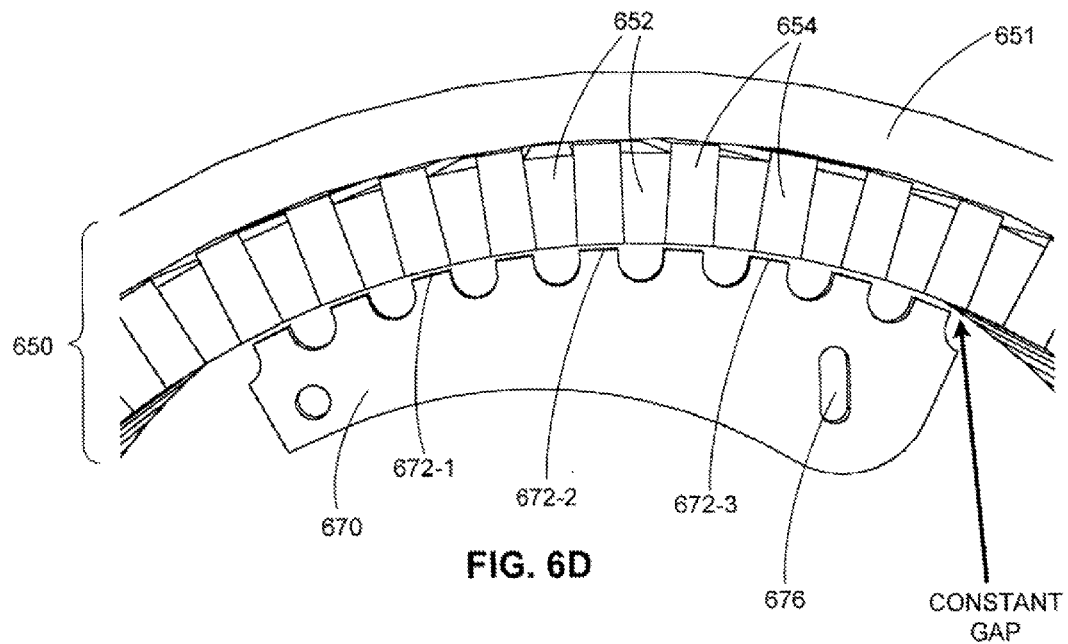
FIG. 6D illustrates an exemplary adjustable cogging torque reduction device in a second position with respect to a rotor in accordance with an exemplary embodiment.
Figure 6G:
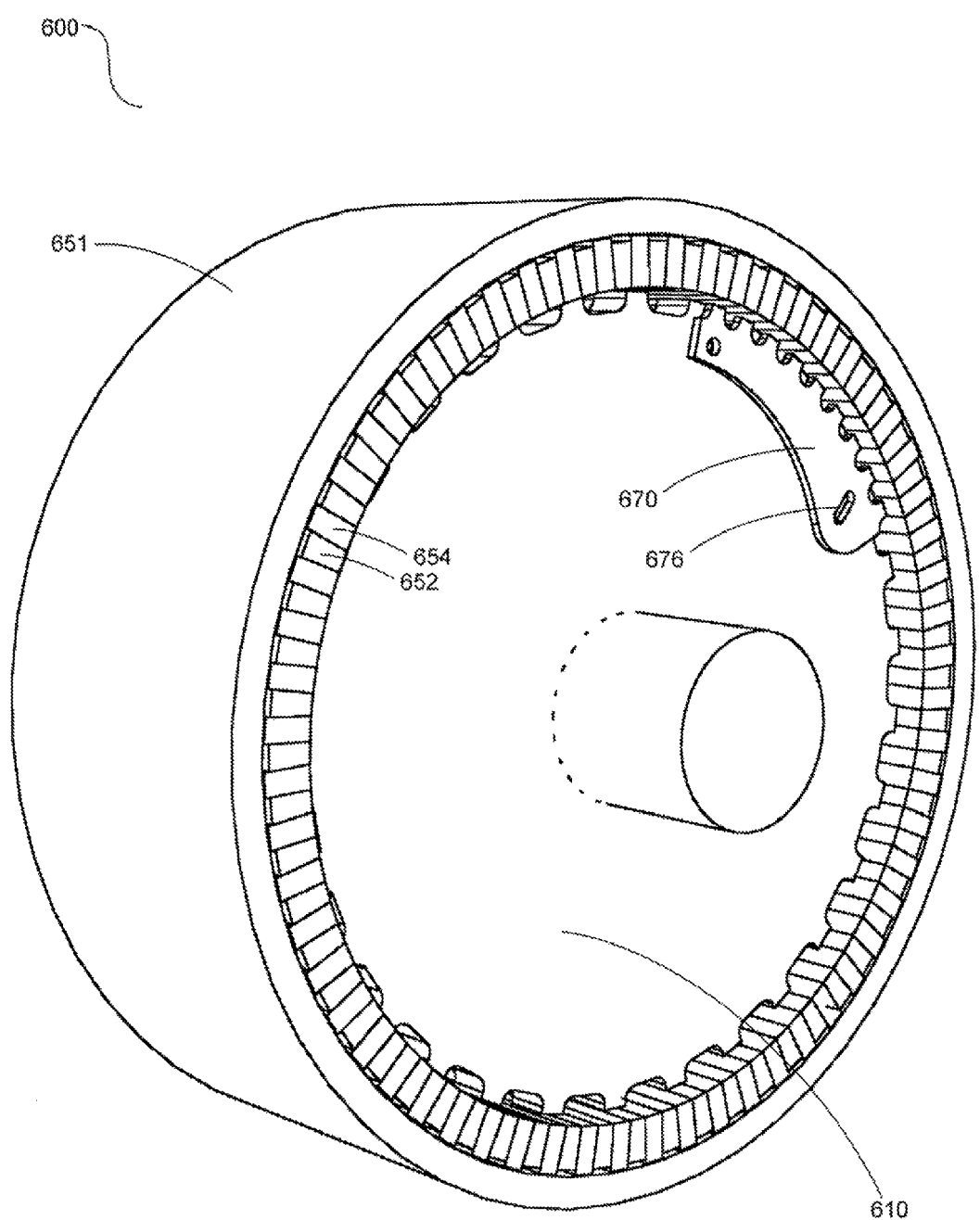
FIG. 6G illustrates an exemplary transverse flux machine configured with an exemplary adjustable cogging torque reduction device in accordance with an exemplary embodiment.

In another position, for example as illustrated in FIGS. 6D and 6G, crown 670 may be positioned with respect to rotor 650 such that the air-gap between rotor 650 and the teeth 672 of crown 670 is substantially constant along the length of crown 670. In this position, each tooth 672 in crown 670 is approximately the same distance from rotor 650 as the others.

Via slot 676, the position of crown 670 with respect to rotor 650 may be varied. It will be appreciated that, generally speaking, moving teeth 672 toward rotor 650 will increase the amplitude of the cogging torque waveform arising from crown 670, other factors being equal. Moving teeth 672 away from rotor 650 will decrease amplitude. Crown 670 may be moved as desired, for example in order to configure a cogging torque waveform arising therefrom to more effectively counteract and/or cancel a cogging torque waveform in electrical machine 600. Crown 670 may be moved when electrical machine 600 is inactive. Alternatively, crown 670 may be moved when electrical machine 600 is operational. In this manner, the overall cogging torque waveform of electrical machine 600 as combined with crown 670 may be monitored as crown 670 is adjusted. For example, electrical machine 600 may be mounted to a fixture in connection with an accelerometer. The accelerometer may be utilized to monitor and/or record vibration of electrical machine 600. Moreover, as electrical machine 600 is operated, accelerometer readings may be utilized to inform the position of crown 670 in order to reduce and/or minimize cogging torque imparted to the fixture and/or accelerometer. Moreover, any suitable monitoring, tuning, and/or feedback approaches may be employed in order to position crown 670 with respect to rotor 650, as desired.

Additional details regarding adjusting and/or tuning the position of components in an electrical machine may be found in U.S. Provisional Patent Application Ser. No. 61/453,006 filed on Mar. 15, 2011 and entitled "ADJUSTABLE HALL EFFECT SENSOR SYSTEM", the contents of which are hereby incorporated by reference in their entirety. In various exemplary embodiments, a crown 670 and/or other cogging torque reduction device(s) may be coupled to, included in, and/or otherwise be adjustable via an adjustable Hall effect sensor system as disclosed therein, for example by coupling crown 670 to a shared printed circuit board. In addition, in an exemplary embodiment, a cogging torqued reduction device comprises a cam, as described therein, and may be positioned by use of said cam. A cam is another example of a position adjustment feature.

Figure 7A:
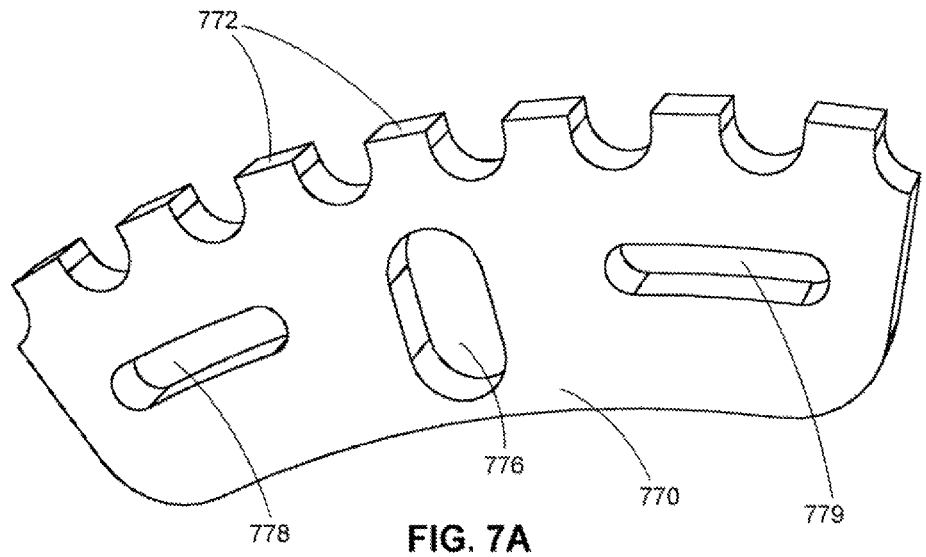
FIG. 7A illustrates another exemplary adjustable cogging torque reduction device in accordance with an exemplary embodiment.
Figure 7B:
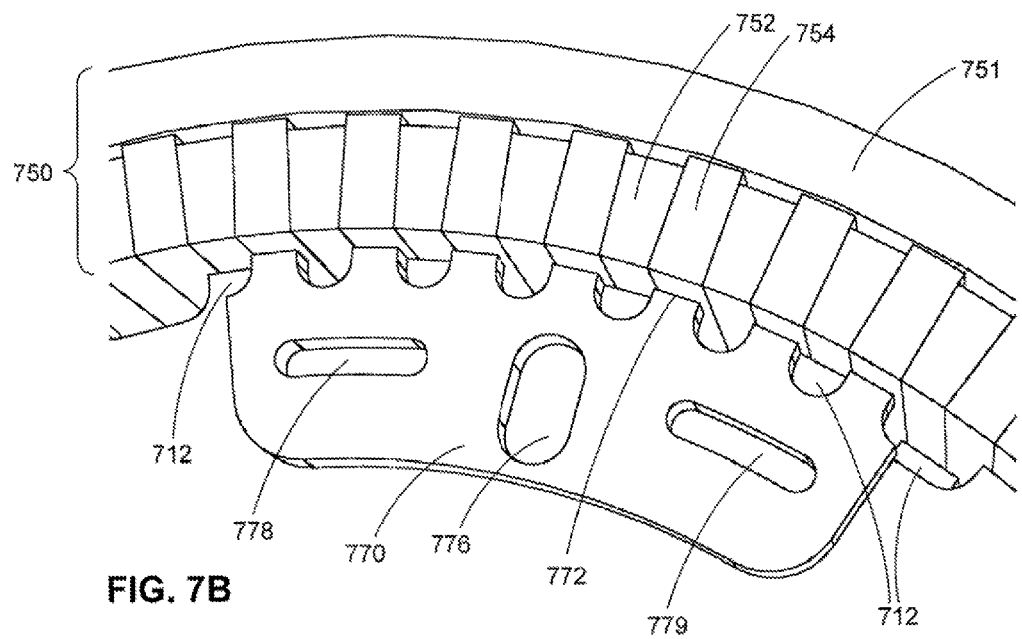
FIG. 7B illustrates a close-up view of an exemplary adjustable cogging torque reduction device as part of an electrical machine in accordance with an exemplary embodiment.
Figure 7C:
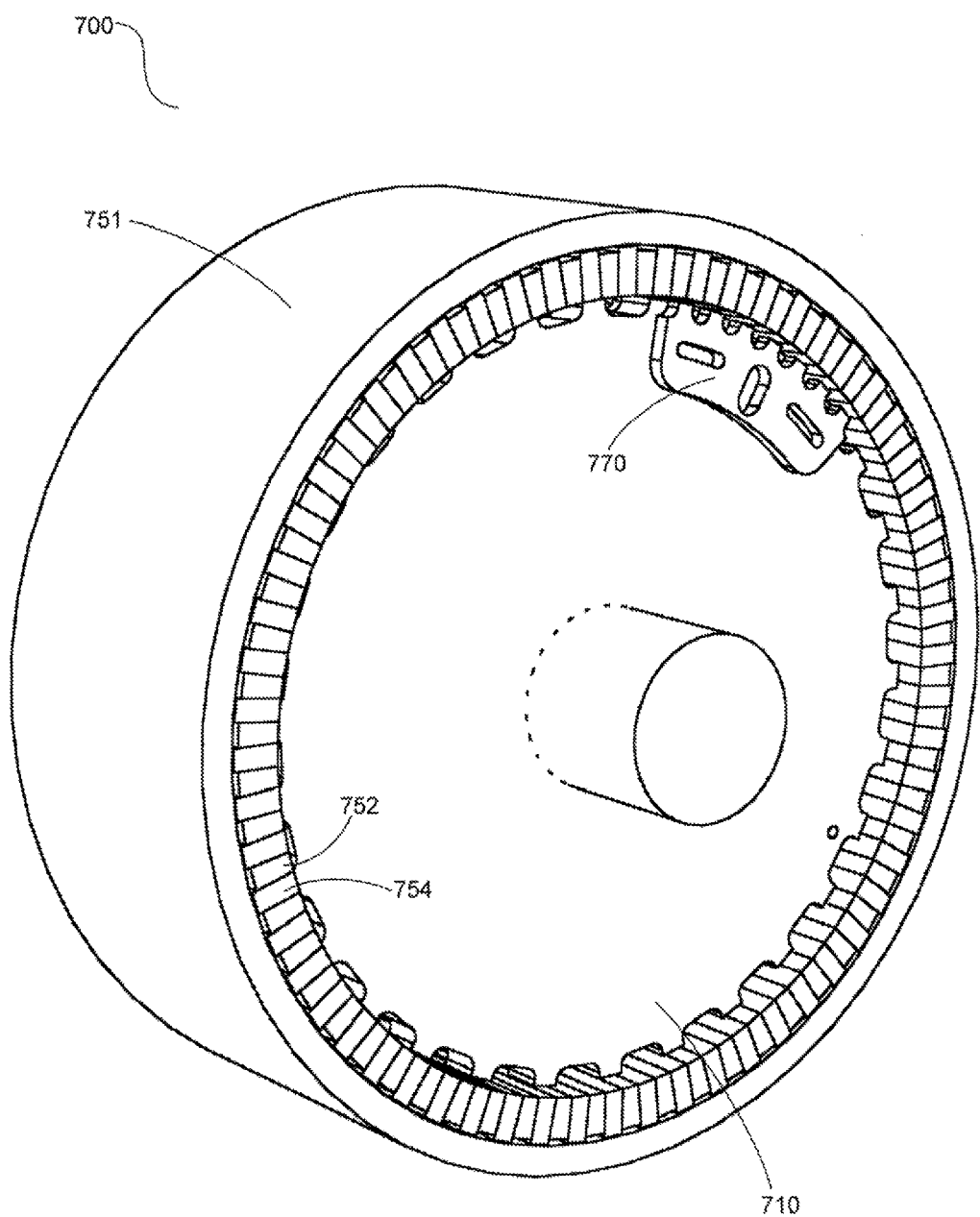
FIG. 7C illustrates another exemplary transverse flux machine configured with an exemplary adjustable cogging torque reduction device in accordance with an exemplary embodiment.

Turning now to FIGS. 7A through 7C, in various exemplary embodiments a cogging torque reduction device, for example crown 770, is configured to be adjustable with respect to a rotational position in an electrical machine 700. Crown 770 may also be adjustable with respect to an air-gap in electrical machine 700. In an exemplary embodiment, crown 770 is configured with one or more teeth 772. Crown 770 is further configured with one or more slots therethrough, for example slot 776, slot 778, and slot 779. As shown in FIG. 7B, slot 776 extending radially may be used to adjust the air-gap between a cogging torque reduction device or pole conducting portion thereof. Slots 778, and 779 shown in FIG. 7B may be used to adjust the timing of the cogging torque reduction device. Any number of air-gap slots or timing slots may be incorporated into a cogging torque reduction device described herein.

Slots 776, 778, and 779 may be sized and/or shaped in order to permit crown 770 to at least partially translate, slide, rotate, pivot and/or otherwise move with respect to rotor 750 and/or stator 710. In various exemplary embodiments, slot 776 is configured to allow crown 770 to move toward and/or away from rotor 750 in order to vary the air-gap between rotor 750 and teeth 772 of crown 770. Moreover, slots 778 and 779 are configured to allow crown 770 to move in a rotational direction with respect to rotor 750 and/or stator 710. In this manner, the relative timing of crown 770 with respect to rotor 750 and/or stator 710 may be either "advanced" and/or "retarded", as desired. By adjusting the air-gap and/or the timing, the amplitude, phase, and/or other characteristics of the cogging torque waveform arising from crown 770 may be varied with respect to the cogging torque waveform of electrical machine 700. It will be appreciated that, in certain exemplary embodiments, crown 770 may be at least partially "timed" with respect to stator 710 via one or more customized tools, jigs, frames, and/or the like. Accordingly, crown 770 may be rigidly affixed to stator 710 after generally being placed, positioned, and/or located via a jig or other apparatus external to electrical machine 700.

In various exemplary embodiments, crown 770 is coupled to stator 710 via one or more fasteners. A releasable and/or adjustable fastener may be utilized in connection with slots 776, 778, and 779 to enable adjustment and/or movement of crown 770, as disclosed hereinabove. Crown 770 may be adjusted when electrical machine 700 is inactive; alternatively, crown 770 may be adjusted when electrical machine 700 is operational as previously disclosed. It will be appreciated that, generally speaking, moving crown 770 in a rotational direction with respect to stator 710 will gradually change the phase of the cogging torque waveform of crown 770 with respect to the cogging torque waveform arising from the interaction of stator 710 and rotor 750. Stated differently, moving crown 770 in a rotational direction with respect to stator 710 moves crown 770's cogging torque waveform through repeated cycles of maximum cogging torque cancellation with respect to electrical machine 700, over to maximum cogging torque reinforcement with electrical machine 700, and then back again to maximum cogging torque cancellation with respect to electrical machine 700. Accordingly, rotational movement of crown 770 may be effected in order to achieve a desired level of cogging torque cancellation in electrical machine 700. Moreover, by moving crown 770 to vary the amplitude and/or other waveform characteristics of the cogging tooth waveform arising from the interaction of crown 770 with stator 750, crown 770 may more effectively counteract cogging torque arising in electrical machine 700.

Figure 7D:
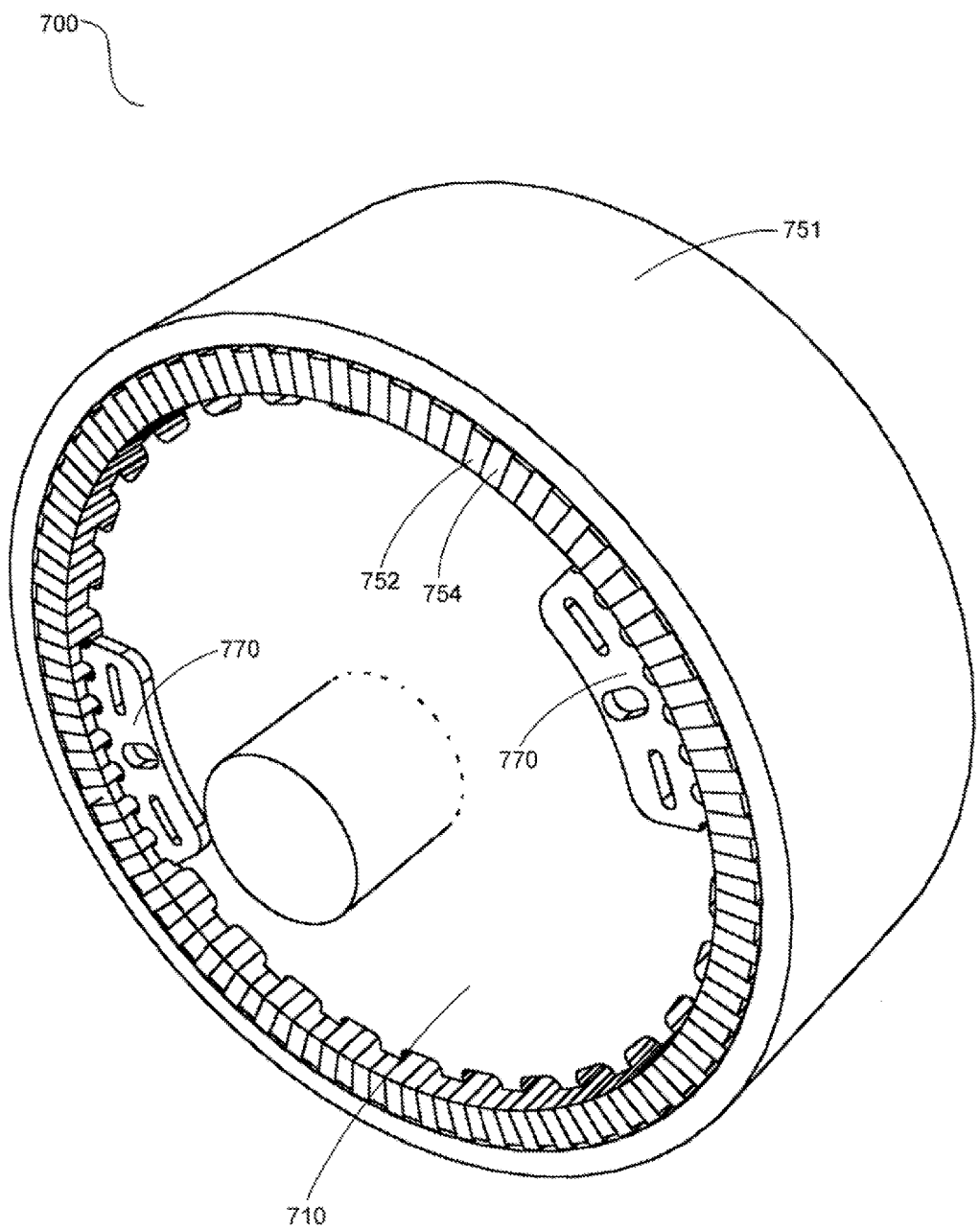
FIG. 7D illustrates an exemplary transverse flux machine configured with multiple exemplary adjustable cogging torque reduction devices in accordance with an exemplary embodiment.
Figure 8A:
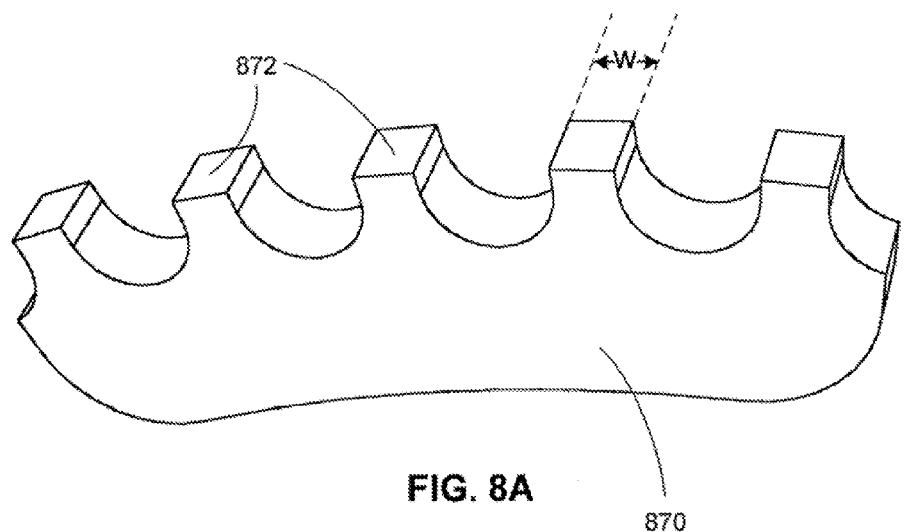
FIG. 8A illustrates yet another exemplary cogging torque reduction device in accordance with an exemplary embodiment.
Figure 8B:
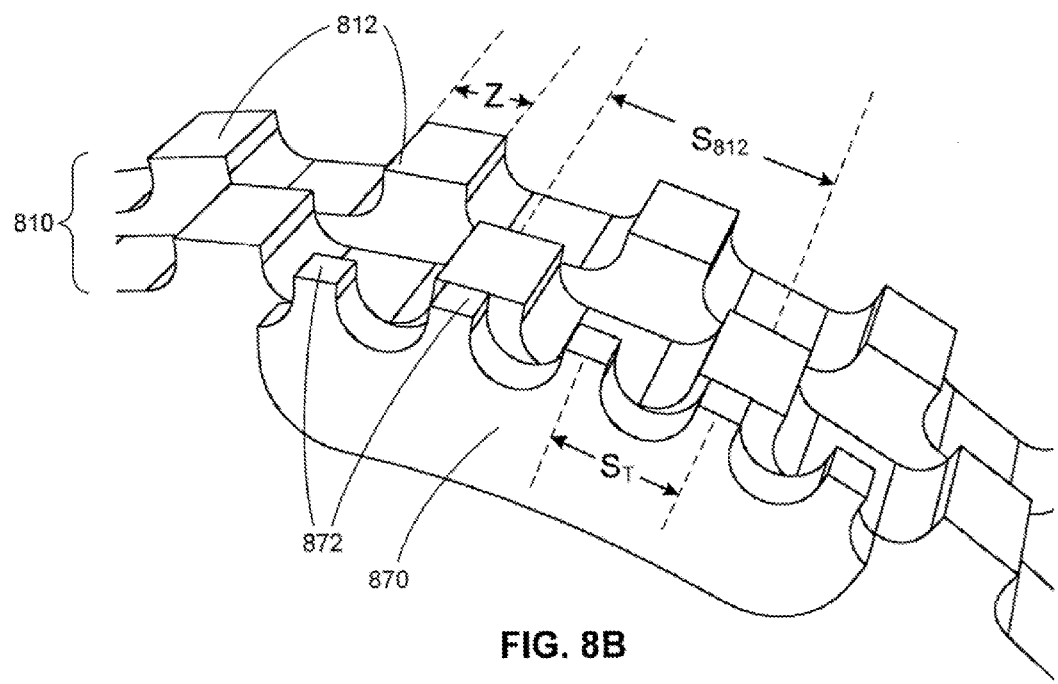
FIG. 8B illustrates an exemplary cogging torque reduction device coupled to a stator in accordance with an exemplary embodiment.
Figure 8D:
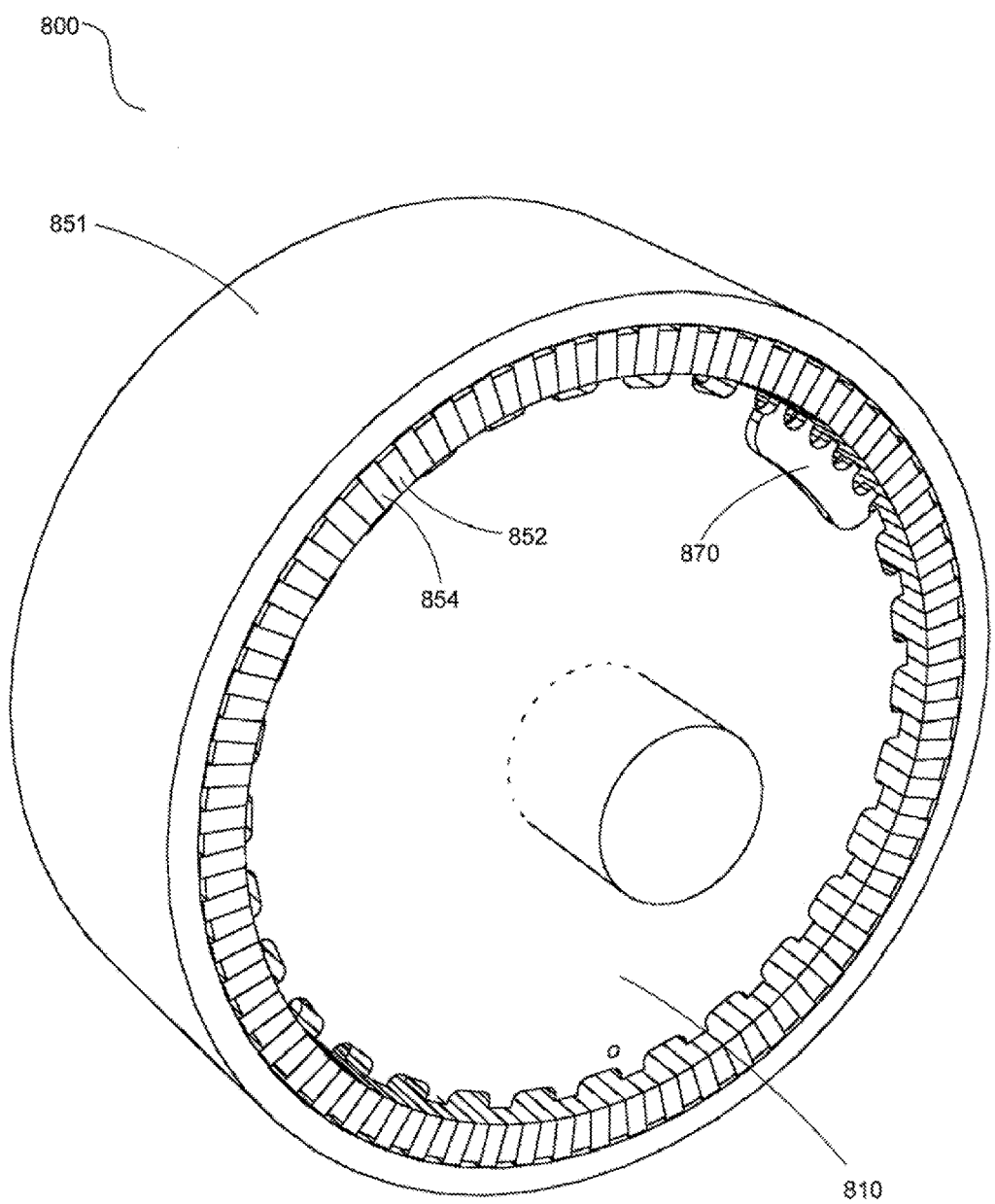
FIG. 8D illustrates an exemplary transverse flux machine configured with an exemplary cogging torque reduction device in accordance with an exemplary embodiment.

Turning now to FIG. 7D, in various exemplary embodiments multiple crowns 770 may be coupled to a single electrical machine 700. Multiple crowns 770 may be utilized for various reasons. For example, multiple crowns 770 may be utilized in order to generate a sufficiently large cogging tooth waveform to cancel cogging torque arising in electrical machine 700. Moreover, multiple crowns 770 may be utilized where a first crown 770 is coupled to electrical machine 700 in order to reduce cogging torque, and then a second crown 770 is coupled to electrical machine 700 in order to reduce the cogging torque still remaining after utilization of the first crown 770. Yet further, multiple crowns 770 may be utilized, for example on opposite sites of electrical machine 770, in order to minimize disruptions to the center of gravity and/or mechanical balance of electrical machine 700.

Figure 11:
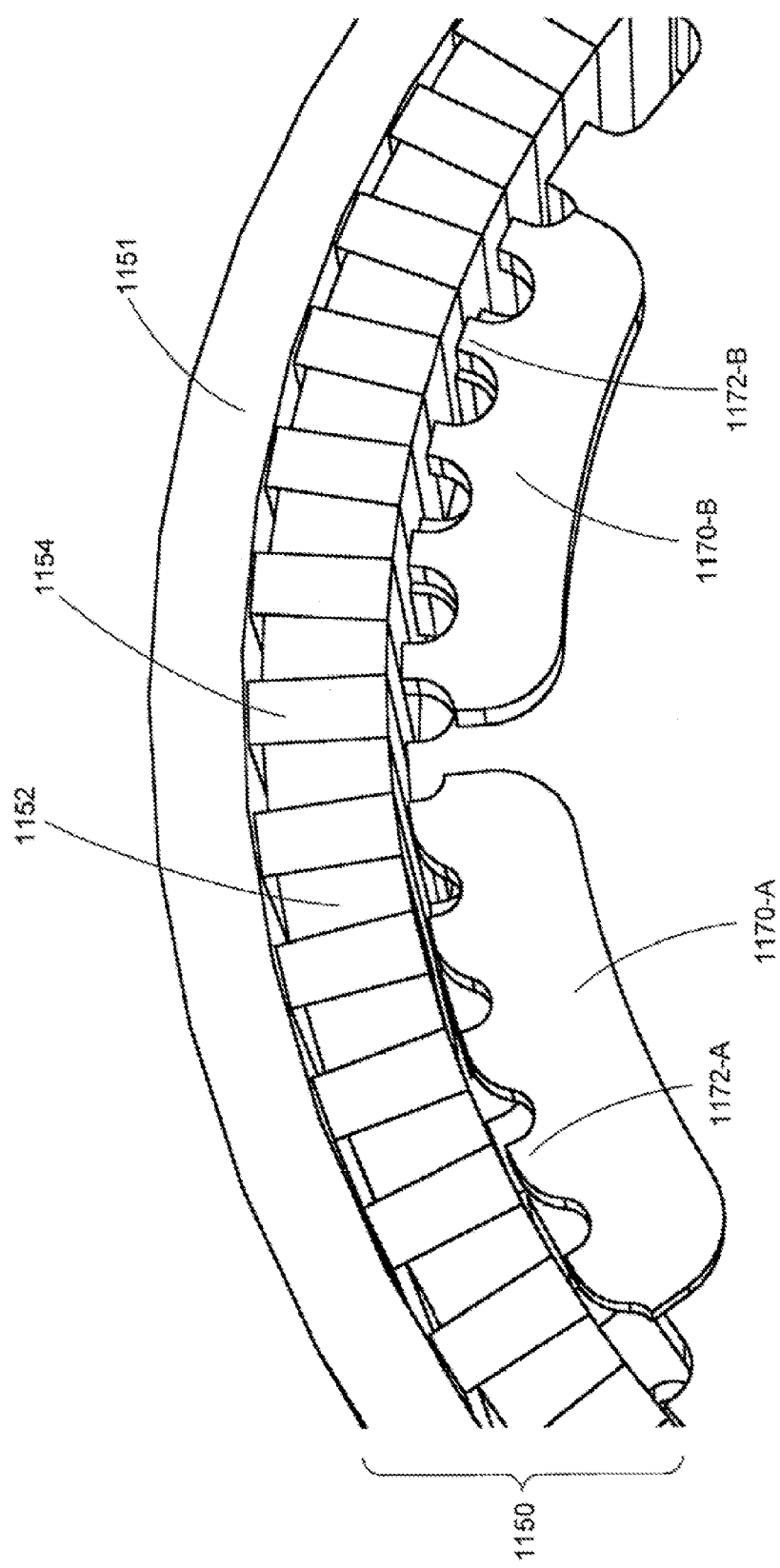
FIG. 11 illustrates a close-up view of multiple exemplary cogging torque reduction devices coupled to an electrical machine in accordance with an exemplary embodiment.

With momentary reference to FIG. 11, in various exemplary embodiments multiple dissimilar crowns, for example crown 1170-A and crown 1170-B, may be coupled to a single electrical machine 1100. Crown 1170-A may be configured with teeth 1172-A having a first shape, for example a "fin"-like shape. Crown 1170-B may be configured with teeth 1172-B having a second shape, for example a narrow tapered shape. Crown 1170-A gives rise to a first cogging torque waveform responsive to rotation of rotor 1150; crown 1170-B gives rise to a second, different cogging torque waveform responsive to rotation of rotor 1150. The sum of cogging torque waveforms from crown 1170-A and crown 1170-B may more effectively counteract, cancel, and/or otherwise "balance" an existing cogging torque waveform in electrical machine 1100 than either crown 1170-A or crown 1170-B could achieve alone. It will be appreciated that two, three, four, or even more cogging torque reduction devices may be utilized in connection with a particular electrical machine, depending on the complexity of the existing cogging torque waveform, the degree of reduction of overall cogging torque desired, and/or the like.

Yet further, utilization of multiple cogging torque reduction devices can at least partially offset amplitude variations in cogging torque arising from a rotor which is at least partially out of round. This is because when one cogging torque reduction device is at a position of minimal interaction with the rotor, another cogging torque reduction device will be at a position of greater interaction with the rotor, and vice versa. Additional cogging torque reduction devices may be utilized to further "smooth out" amplitude variations in the overall cogging torque arising from the cogging torque reduction devices, as desired.

Yet further, use of multiple cogging torque reduction devices may be employed in order to form a cogging torque waveform of essentially any complexity and/or harmonic content. Therefore, principles of the present disclosure contemplate formation of essentially any suitable cogging torque waveform via one or more cogging torque reduction devices in order to at least partially counteract, cancel, and/or otherwise "balance" a cogging torque waveform in an electrical machine.

Returning now to FIGS. 8A through 8D, in various exemplary embodiments a cogging torque reduction device, for example crown 870, is configured with "narrow" teeth (i.e., teeth that are shorter in a rotational direction than stator teeth 812 in stator 810). In an exemplary embodiment, crown 870 is configured with teeth 872 having a width W that is shorter in a rotational direction of electrical machine than the width Z of teeth 812 in stator 810. In this manner, the amount of flux switched through crown 870, as well as the timing of changes in the amount of flux switched through crown 870, may be varied, as desired. By controlling both the amount of flux switched and the timing of changes in the amount of flux switched, a cogging torque waveform arising from crown 870 may be configured, as desired. For example, a cogging torque waveform arising from crown 870 may be configured to have certain portions that are, generally "flat" and/or constant around an approximately zero value, with intermittent deviations therefrom—for example, somewhat similar to the waveform of an electrocardiogram, or of a slightly "spiky" sine wave having flat (essentially zero amplitude) sections between curved sections having higher amplitudes.

In various exemplary embodiments, teeth 872 are configured with a width W of between about 10% of width Z and about 200% of width Z. In an exemplary embodiment, teeth 872 are configured with a width of about 45% of width Z. A tooth may have any suitable width including but not limited to, greater than about 1 mm, greater than about 2 mm, greater than about 3 mm, greater than about 5 mm, grate than about 10 mm, greater than about 25 mm, and any range between and including the widths provided. Moreover, teeth 872 may be configured with any suitable width W, and the foregoing examples are provided by way of illustration and not of limitation. It will be appreciated that as width W increases, at a certain point tooth 872 begins to provide a low reluctance path with respect to both a magnet 854 and a flux concentrator 852 in rotor 850. The resultant partial overlapping of reluctance paths may reduce the overall amplitude of the cogging torque waveform arising from crown 870.

In various exemplary embodiments, center-to-center spacing $S_T$ between teeth 872 in crown 870 is between about 25% and about 75% of center-to-center spacing $S_{812}$ between adjacent stator teeth 812 on a particular side of stator 810. In an exemplary embodiment, spacing $S_T$ is about 50% of spacing $S_{812}$. Moreover, teeth 872 in crown 870 may be spaced with any suitable spacing $S_T$, as desired.

By varying the width W and/or spacing $S_T$ of teeth 872 in crown 870 to vary the amplitude and/or other waveform characteristics of the cogging tooth waveform arising from the interaction of crown 870 with stator 850, crown 870 may more effectively counteract cogging torque arising in electrical machine 800.

Turning now to FIGS. 9A through 9D, in various exemplary embodiments, a cogging torque reduction device, for example crown 970, is configured with fin shaped teeth 972 configured to achieve a "progressive" air-gap with respect to a rotor. In these exemplary embodiments, the amount of flux transferred through crown 970 varies as rotor 950 rotates. More specifically, the progressive air-gap with respect to a rotor enables both a rapid increase and/or decrease in flux transferred to crown 970 from rotor 950. The progressive air-gap with respect to a rotor also enables a tapered and/or gradual increase and/or decrease in flux transferred to crown 970 from rotor 950. By controlling the rate of change of flux through crown 970, the amplitude and/or other waveform characteristics of the cogging tooth waveform arising from the interaction of crown 970 with stator 950 may be varied, as desired. In this manner, crown 970 may more effectively counteract cogging torque arising in electrical machine 900.

Figure 9A:
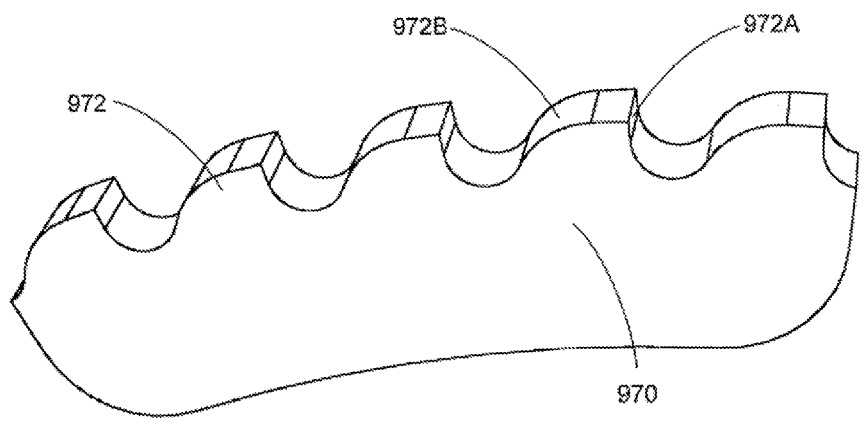
FIG. 9A illustrates an exemplary cogging torque reduction device having an asymmetrical tooth geometry in accordance with an exemplary embodiment.
Figure 9B:
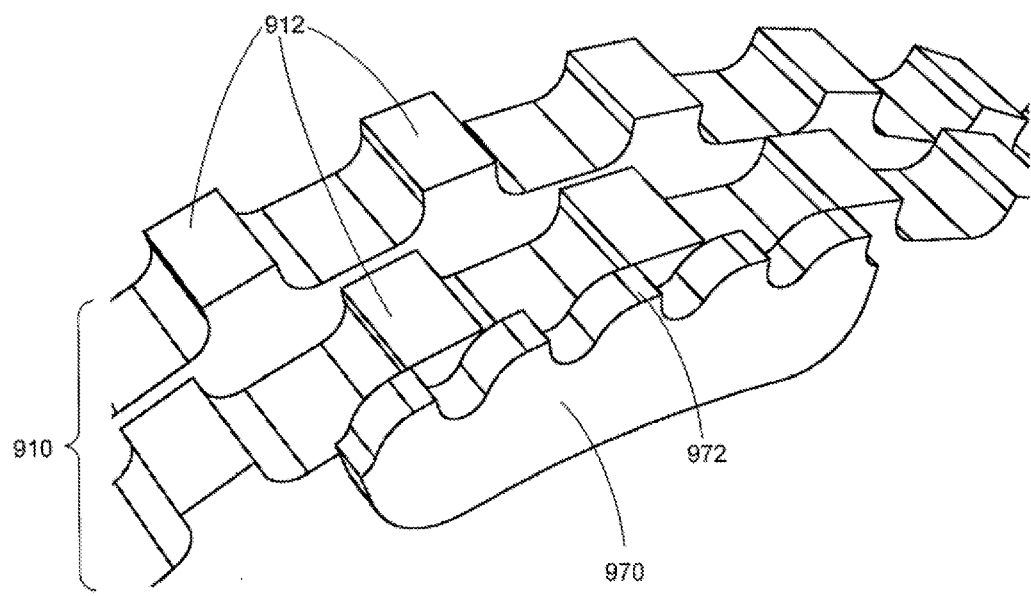
FIG. 9B illustrates an exemplary cogging torque reduction device coupled to a stator in accordance with an exemplary embodiment.

In various exemplary embodiments, with particular reference to FIG. 9A, crown 970 is configured with teeth 972 having a curved and/or otherwise "fin"-like shape. Stated another way, crown 970 may be configured with teeth 972 having a "steep" side 972A and a "gradual" side 972B. The characteristics of steep sides 972A may be the same among teeth 972 in crown 970; moreover, different teeth 972 may have steep sides 972A which vary from one another. Similarly, the characteristics of gradual sides 972B may be the same among teeth 972 in crown 970; moreover, different teeth 972 may have gradual sides 972B which vary from one another.

Crown 970 may be coupled to stator 910 such that "steep" sides 972A are on the "left" sides of teeth 972 as viewed along the axis of rotation of electrical machine 900, and "gradual" sides 972B are on the right; moreover, crown 970 may also be flipped such that "steep" sides 972A and "gradual" sides 972B are reversed, as desired.

Figure 9C:
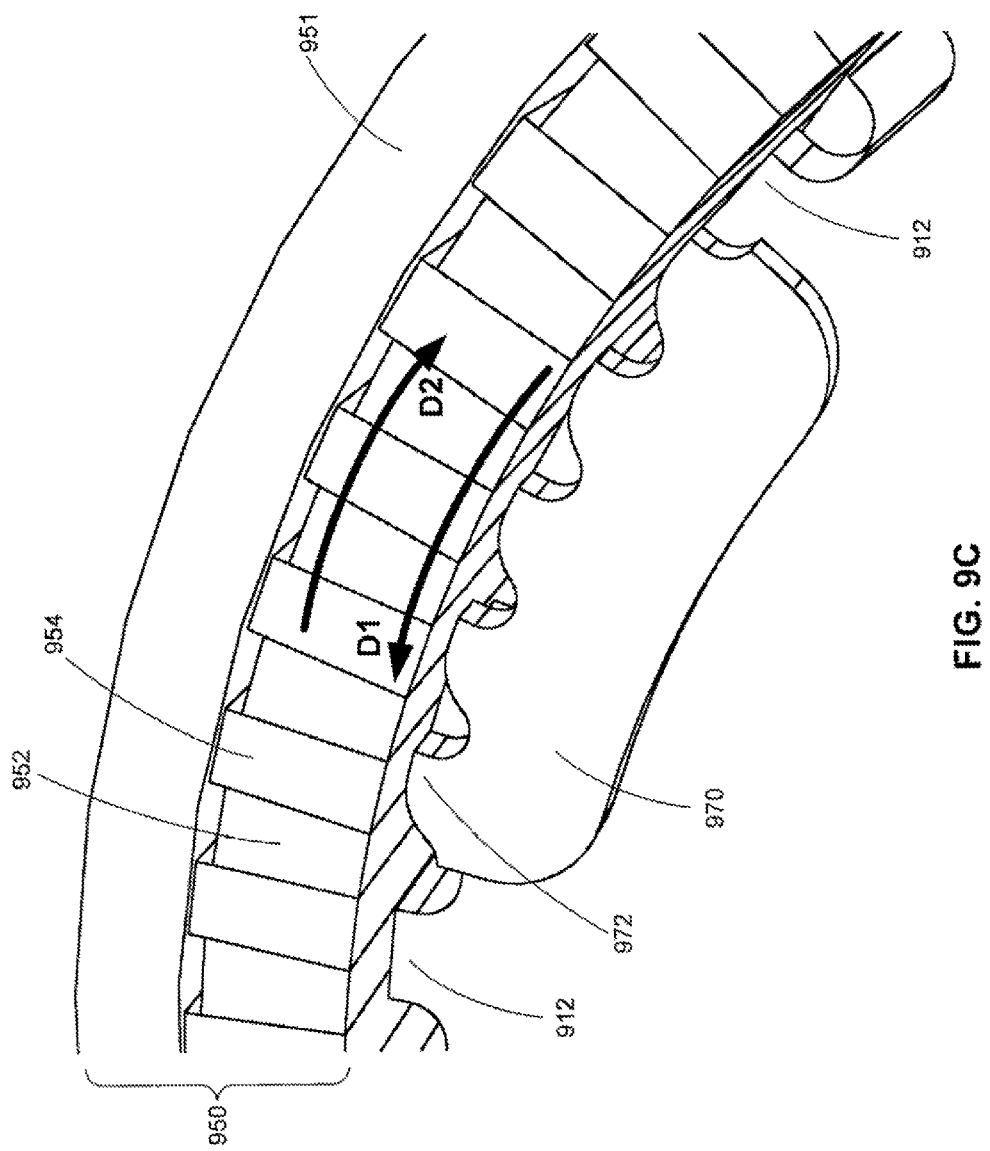
FIG. 9C illustrates a close-up view of an exemplary cogging torque reduction device coupled to an electrical machine in accordance with an exemplary embodiment.
Figure 9D:
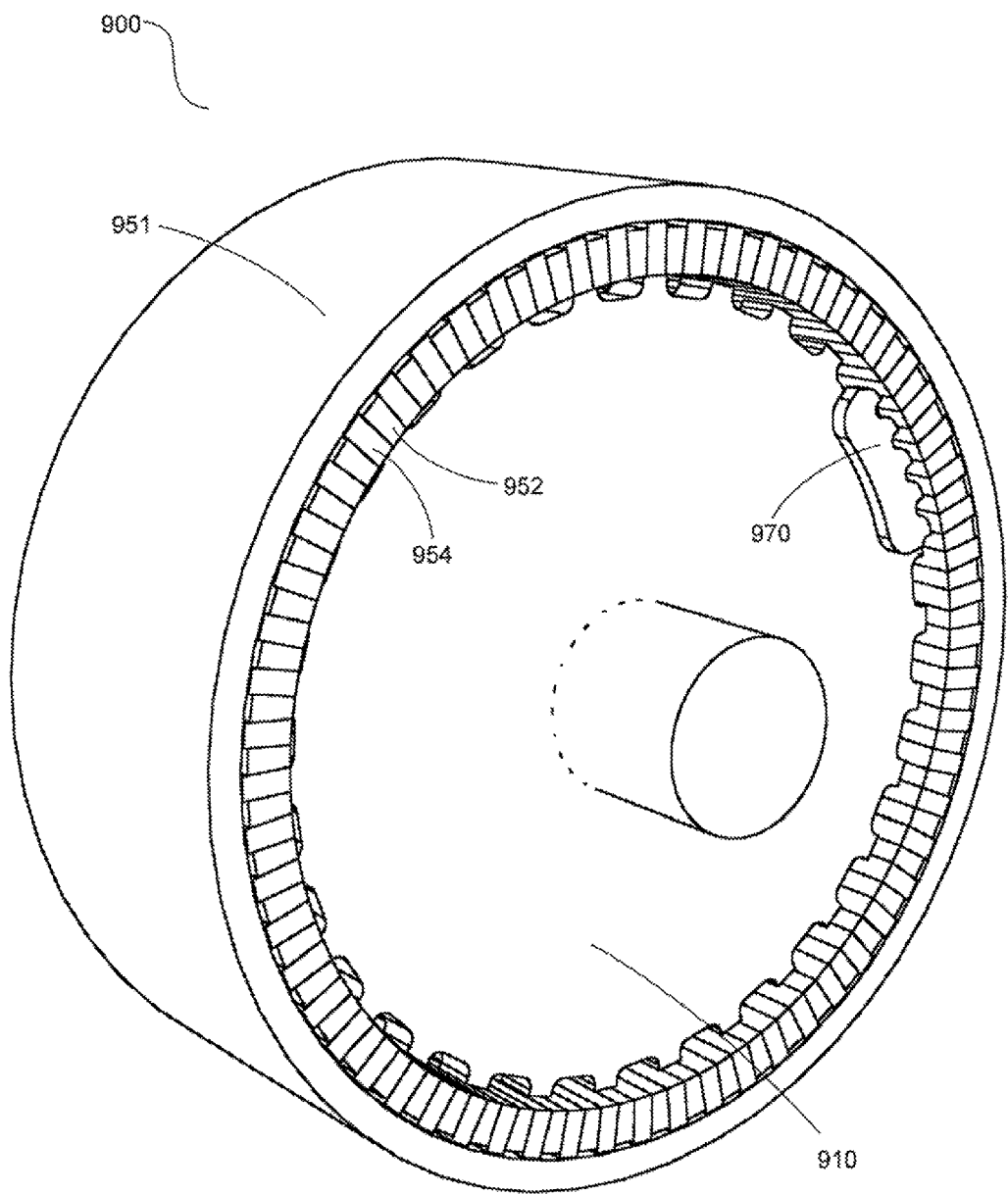
FIG. 9D illustrates an exemplary transverse flux machine configured with an exemplary cogging torque reduction device in accordance with an exemplary embodiment.

When, responsive to rotation of rotor 950 in a first direction (for example, direction D1 as illustrated in FIG. 9C), a flux concentrator 952 approaches a tooth 972 from the "steep" side, the rate of flux transfer between flux concentrator 952 and tooth 972 increases rapidly. In contrast, if rotor 950 is rotated in the opposite direction (for example, direction D2), as a flux concentrator 952 approaches a tooth 972 from the "gradual" side, the rate of flux transfer between flux concentrator 952 and tooth 972 increases more slowly, as the effective air-gap between tooth 972 and flux concentrator 952 gradually narrows as flux concentrator 952 passes along tooth 972.

Moreover, as a flux concentrator 952 moves beyond a tooth 972, and separation occurs on steep side 972A, the rate of flux transfer between flux concentrator 952 and tooth 972 decreases rapidly. In contrast, if a flux concentrator 952 moves beyond a tooth 972, and separation occurs on gradual side 972B, the rate of flux transfer between flux concentrator 952 and tooth 972 decreases more slowly, as the effective air-gap between tooth 972 and flux concentrator 952 gradually expands as flux concentrator 952 passes along tooth 972.

By varying the angles, slopes, lengths, curves, and/or other characteristics of the "steep" side 972A and/or the "gradual" side 972B, the amplitude, phase, harmonic content, and/or other waveform characteristics of the cogging tooth waveform arising from the interaction of crown 970 with stator 950 may be varied. For example, a triangle wave, a saw-tooth wave, a trapezoidal wave, and/or other non-sinusoidal waveforms may be created.

Turning now to FIGS. 10A through 10D, in various exemplary embodiments a cogging torque reduction device, for example crown 1070, is configured with multiple teeth 1072. Certain of teeth 1072 are grouped into similarly-spaced groups G1, G2, and G3. Teeth 1072 in group G1 may be configured to at least partially counteract, cancel, and/or otherwise "balance" a cogging torque waveform arising from a first phase in an electrical machine, for example electrical machine 1000. Similarly, teeth 1072 in group G2 may be configured to balance a cogging torque waveform arising from a second phase, and teeth 1072 in group G3 may be configured to balance a cogging torque waveform arising from a third phase. Moreover, fewer groups and/or more groups of teeth 1072 may be utilized, as desired, in order to more effectively counteract, cancel, and/or otherwise "balance" a cogging torque waveform in an electrical machine.

Figure 10A:
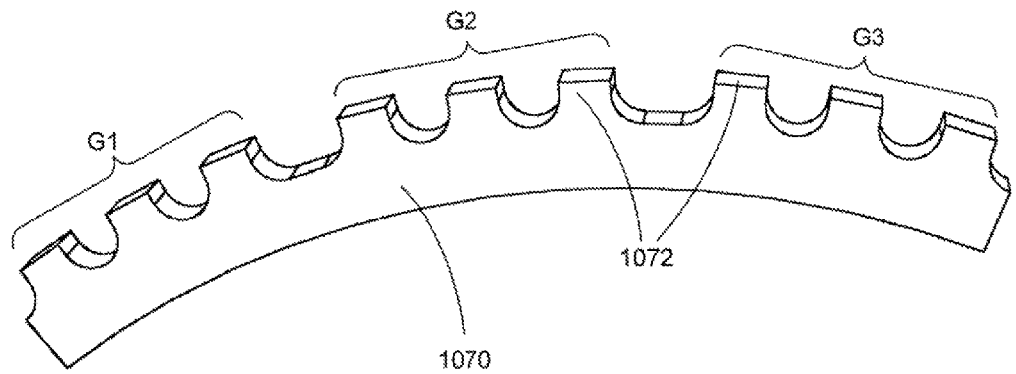
FIG. 10A illustrates an exemplary polyphase cogging torque reduction device in accordance with an exemplary embodiment.
Figure 10B:
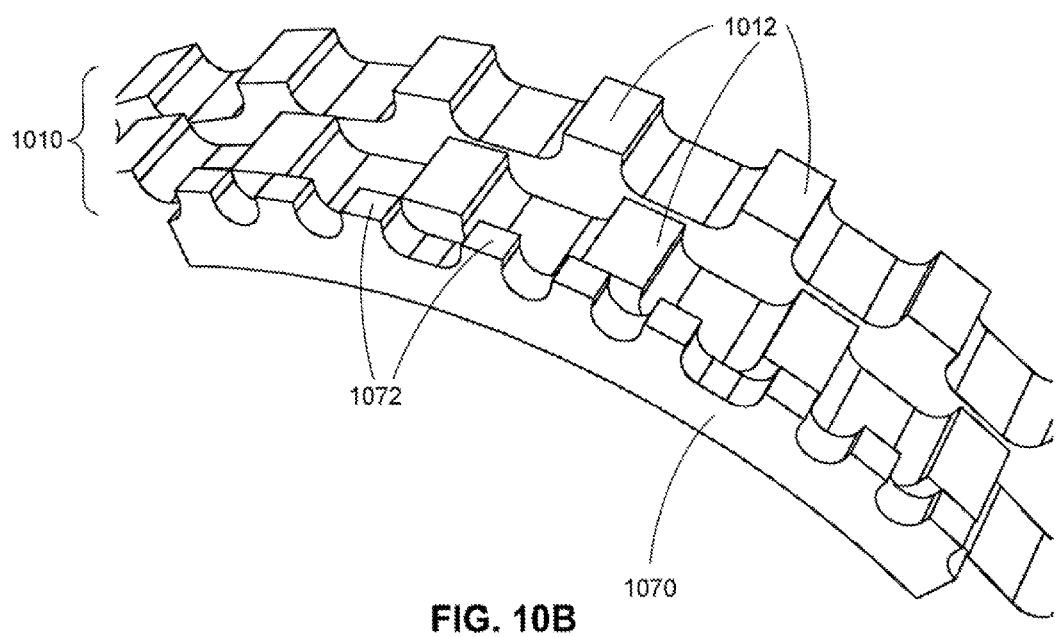
FIG. 10B illustrates an exemplary cogging torque reduction device coupled to a stator in accordance with an exemplary embodiment.
Figure 10C:
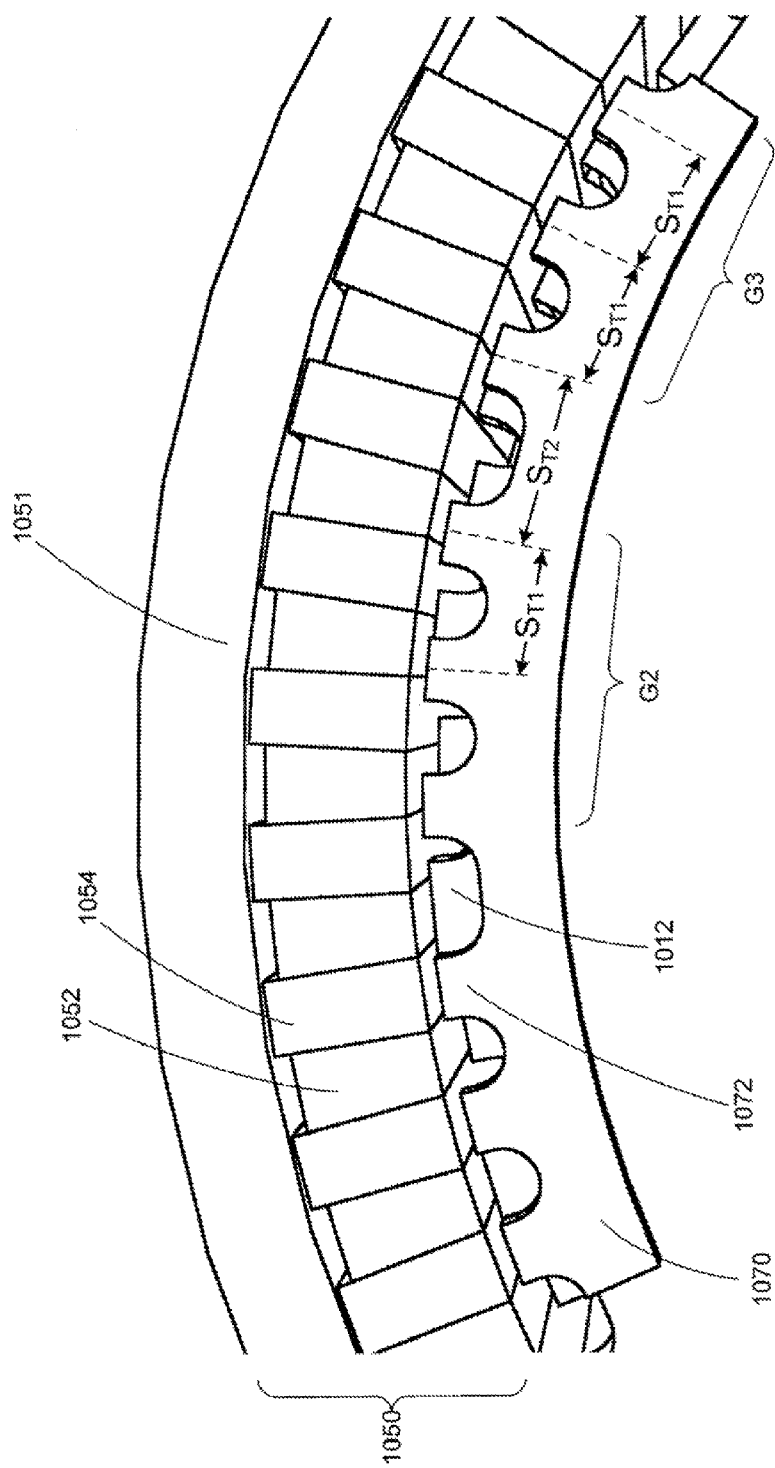
FIG. 10C illustrates a close-up view of an exemplary cogging torque reduction device coupled to an electrical machine in accordance with an exemplary embodiment.
Figure 10D:
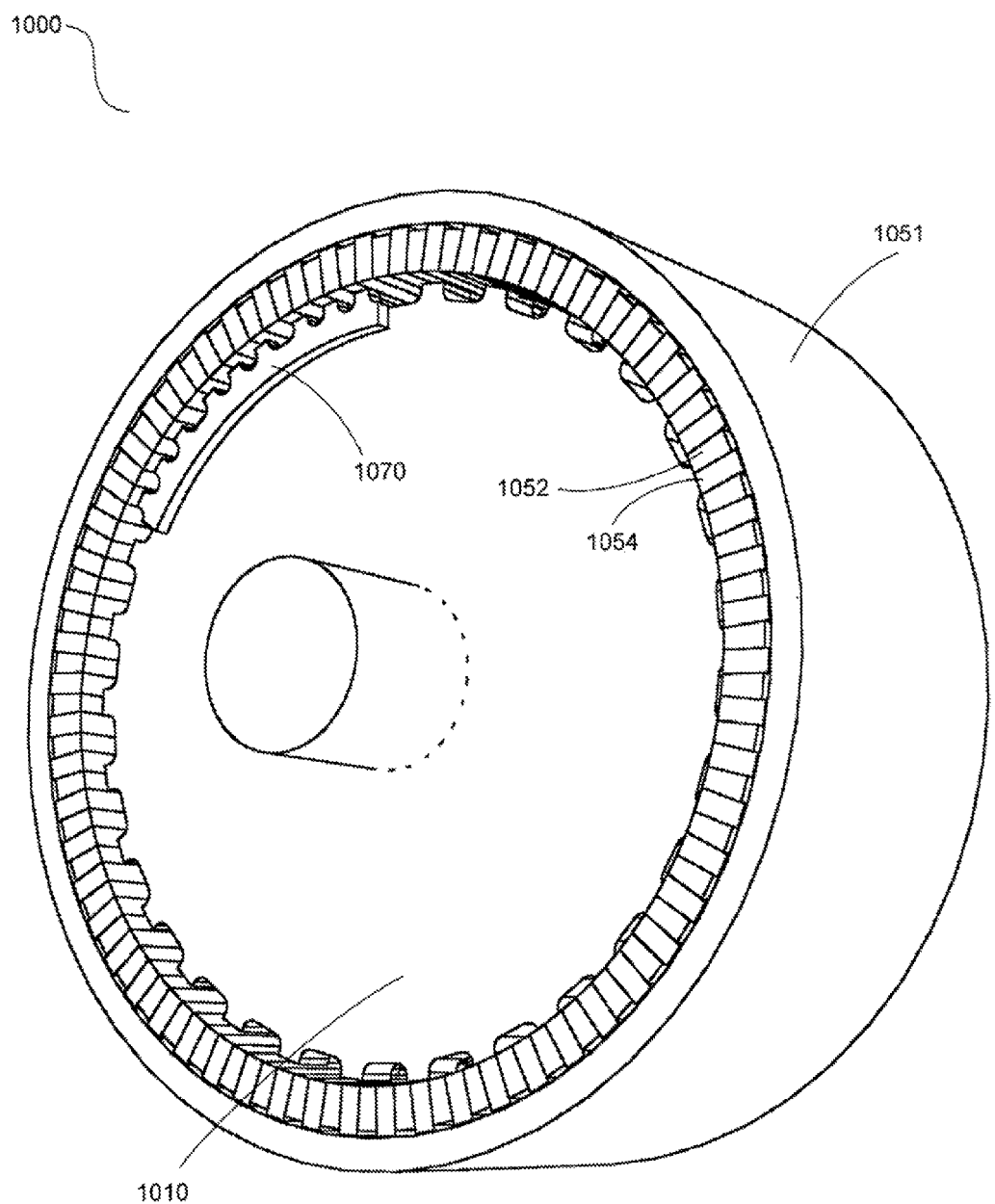
FIG. 10D illustrates an exemplary transverse flux machine configured with an exemplary cogging torque reduction device in accordance with an exemplary embodiment.

Turning now to FIGS. 10C and 10D, in various exemplary embodiments crown 1070 is positioned in electrical machine 1000 in order to interact with a rotor, for example rotor 1050. Teeth 1072 of crown 1070 are configured to complete a magnetic circuit from a first portion of rotor 1050 (for example, a first flux concentrator 1052 having a first polarity) to a second portion of rotor 1050 (for example, a second flux concentrator 1052 having an opposite polarity). The resulting magnetic circuit does not extend around a coil of the electrical machine. By linking adjacent north and south poles in rotor 1050 of electrical machine 1000, crown 1070 generates a cogging torque waveform responsive to rotation of rotor 1050. The cogging torque waveform arises from movement of flux through crown 1070. It will be appreciated that tooth spacing $S_{T1}$ may be generally consistent between teeth 1072 in a particular group G1, G2, and/or G3. Moreover, tooth spacing $S_{T2}$ between adjacent teeth 1072 on the neighboring edges of adjacent groups G1 and G2 (or G2 and G3) may vary significantly from tooth spacing $S_{T1}$. In this manner, crown 1070 may be configured to individually address cogging torque arising from multiple phases in an electrical machine.

It will be appreciated that, in crown 1070, depending at least in part on tooth spacing $S_{T1}$ and tooth spacing $S_{T2}$, cogging torque arising from group G1 may at least partially cancel out cogging torque arising from groups G2 and/or G3, and vice versa. Accordingly, crown 1070 may be scaled to be larger and/or otherwise switch more flux in order to address this self cancellation behavior. Moreover, utilization of crown 1070 will result in a 3× increase in the frequency of the cogging torque waveform of electrical machine 1000. Modifying the frequency of the cogging torque waveform of an electrical machine may be desirably utilized in connection with and/or as an alternative to reducing the amplitude of the cogging torque waveform of an electrical machine.

Cogging torque in an electrical machine is often more noticeable and/or more of concern when the frequency of the cogging torque waveform approaches a resonant frequency of a structure and/or device coupled to the electrical machine (for example, a load, a mechanical device driving the electrical machine, and/or the like). For example, when the cogging torque frequency of an electric motor approaches the resonant frequency of the frame of an electric bicycle to which the electric motor is coupled, increased vibration and/or noise may be readily apparent. Accordingly, in addition to reducing cogging torque in an electrical machine, principles of the present disclosure contemplate modifying the frequency of the cogging torque waveform of an electrical machine via use of one of more cogging torque reduction devices.

For example, in various exemplary embodiments, the frame of a particular electric bicycle tends to resonate with the cogging torque of a coupled electric motor when the bicycle is operated at speeds of between about 11 miles per hour (mph) and about 13 mph. Because the electric bicycle is commonly operated at or near these speeds, noise and/or vibration at these speeds is highly undesirable. Accordingly, a cogging torque reduction device, for example crown 1070, may be coupled to the electric motor to reduce the cogging torque of the electric motor. Additionally, due to the effects of crown 1070, the frequency of the cogging torque waveform in the electric motor is increased by a factor of 3. The new cogging torque waveform of the electric motor no longer tends to resonate with the frame of the electric bicycle when the bicycle is operated over a typical speed range, for example from about 0 mph to about 20 mph. In this manner, both the actual degree of cogging torque of an electrical machine, and the perceived degree of cogging torque of the electrical machine can be reduced.

Stated generally, when the resonant frequency of a structure and/or device coupled to an electrical machine is known, a cogging torque reduction device configured in accordance with principles of the present disclosure may be utilized to move the frequency of the cogging torque waveform in an electrical machine away from the resonant frequency of the structure and/or device.

Figure 12A:
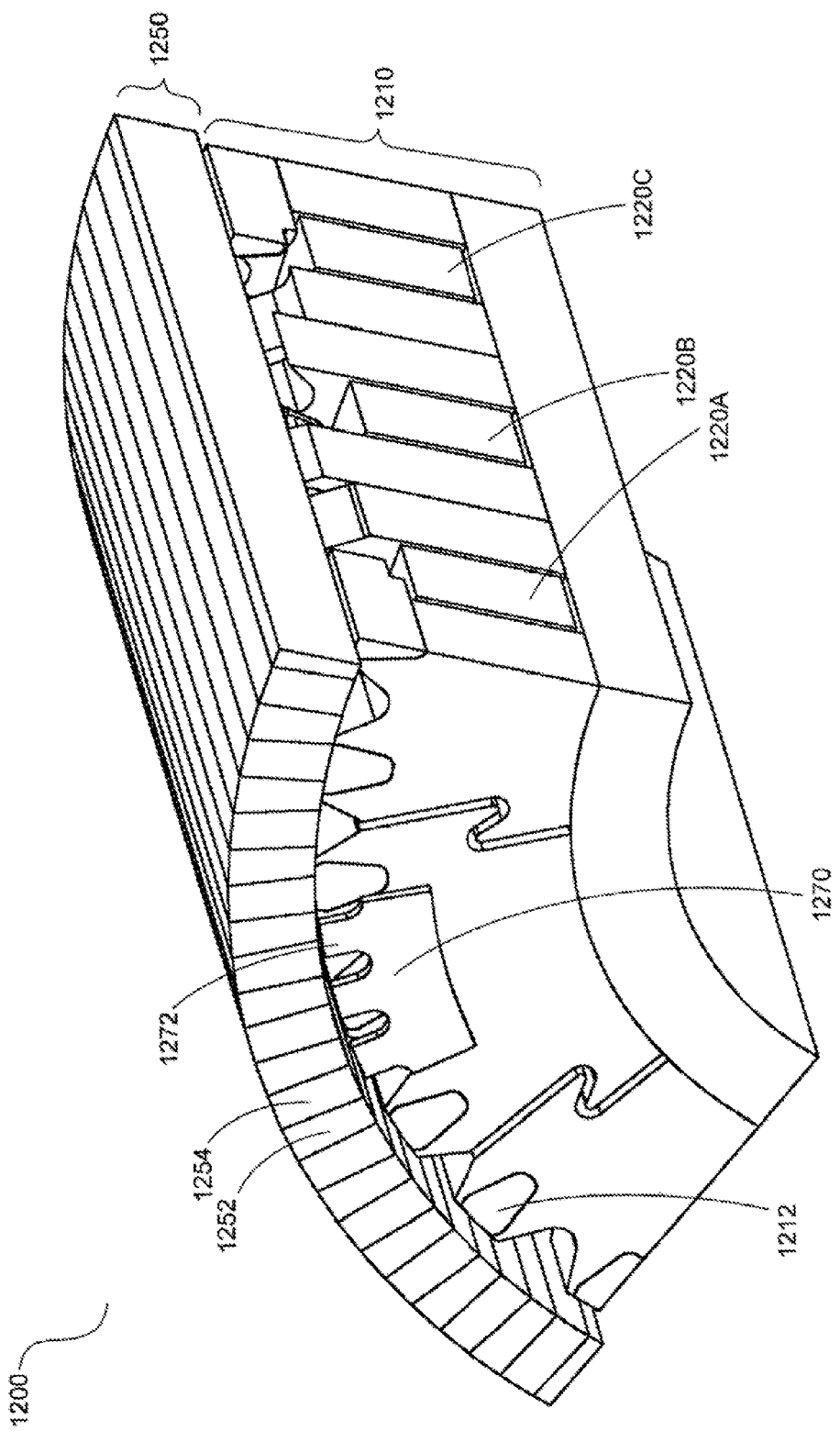
FIG. 12A illustrates a cutaway view of an exemplary cogging torque reduction device coupled to a transverse flux machine in accordance with an exemplary embodiment.
Figure 12B:
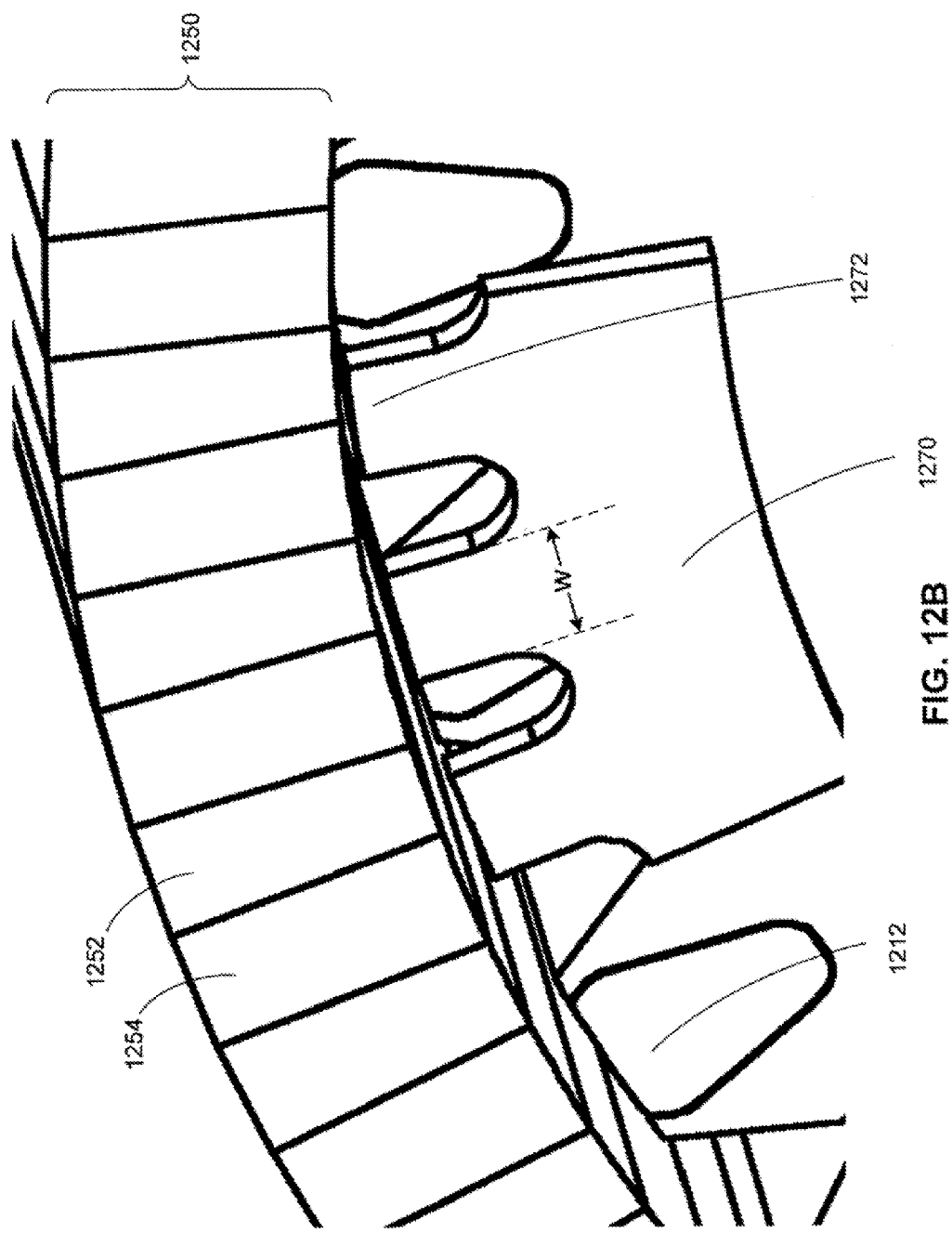
FIG. 12B illustrates a close-up view of an exemplary cogging torque reduction device coupled to a transverse flux machine in accordance with an exemplary embodiment.

With reference now to FIGS. 12A through 12C, in various exemplary embodiments, one or more cogging torque reduction devices, for example crown 1270, may be utilized in connection with an electrical machine configured as a transverse flux machine. Examples of transverse flux machines and/or commutated flux machines which may be utilized in connection with cogging torque reduction devices in accordance with principles of the present disclosure may be found in U.S. patent application Ser. No. 12/772,958 filed on May 3, 2010 and entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", in U.S. patent application Ser. No. 12/772,959 filed on May 3, 2010 and entitled "TRANSVERSE AND/OR COMMUTATED FLUX SYSTEMS FOR ELECTRIC BICYCLES", in U.S. patent application Ser. No. 12/772,962 filed on May 3, 2010 and entitled "TRANSVERSE AND/OR COMMUTATED FLUX SYSTEM PHASE OFFSET", in U.S. Provisional Patent Application Ser. No. 61/414,769 filed on Nov. 17, 2010 and entitled "TRANSVERSE AND/OR COMMUTATED FLUX SYSTEMS HAVING SEGMENTED STATOR LAMINATIONS", in U.S. Provisional Patent Application Ser. No. 61/414,781 filed on Nov. 17, 2010 and entitled "TRANSVERSE AND/OR COMMUTATED FLUX SYSTEMS HAVING LAMINATED AND POWDERED METAL PORTIONS", and in U.S. Provisional Patent Application Ser. No. 61/453,075 filed on Mar. 15, 2011 and entitled "TRANSVERSE AND/OR COMMUTATED FLUX SYSTEMS HAVING LAMINATED AND POWDERED METAL PORTIONS", the contents of each of which are hereby incorporated by reference in their entirety.

With reference now to FIGS. 12A and 12B, in an exemplary embodiment transverse flux machine 1200 comprises a rotor 1250 having interleaved magnets 1254 and flux concentrators 1252. Transverse flux machine 1200 further comprises stator 1210 having three conductive coils 1220A, 1220B, and 1220C. Flux is transferred around coils 1220A, 1220B, and 1220C via the interaction of rotor 1250 with one or more stator teeth 1212. A crown 1270 having at least one tooth 1272 is coupled to stator 1210 in a suitable location for interaction with rotor 1250. Responsive to rotation of rotor 1250, crown 1270 gives rise to a cogging torque waveform which at least partially counteracts, cancels, and/or otherwise "balances" an existing cogging torque waveform in transverse flux machine 1200.

It will be appreciated that, in order to achieve a desired cogging torque waveform arising from one or more cogging torque reduction devices, a particular cogging torque reduction device may be configured with teeth having varied shapes and/or sizes. For example, a particular cogging torque reduction device may have a first tooth having a first width, a second tooth having a second width, a third tooth having a "fin"-like shape, and so forth. Additional teeth and/or separate additional cogging torque reduction devices may be utilized, as desired, in order to at least partially cancel out a cogging torque waveform in an electrical machine, regardless of the shape of such cogging torque waveform. Stated differently, principles of the present disclosure contemplate creation of custom cogging torque waveforms via cogging torque reduction devices, and the custom cogging torque waveforms can be made to nearly exactly counteract, cancel, and/or otherwise "balance" cogging torque waveforms in an electrical machine. The end result is an electrical machine that has been "balanced" to achieve a very low level of instantaneous cogging torque while in operation. Such balanced electrical machines operate with reduced noise and/or vibration, prolonging component life and improving user satisfaction.

Of particular note is that, in accordance with principles of the present disclosure, one or more cogging torque reduction devices may be utilized in connection with an electrical machine without substantially adversely affecting the performance of the electrical machine. For example, a cogging torque reduction device may be utilized in connection with a transverse flux machine while affecting the output torque of the transverse flux machine by less than 0.5%. Moreover, a cogging torque reduction device may be utilized in connection with a transverse flux machine while increasing the hysteresis losses in the transverse flux machine by less than 2%, and while increasing no other losses in the transverse flux machine. As hysteresis losses make up a small overall portion of total losses in the transverse flux machine, it will be appreciated that principles of the present disclosure may thus advantageously be employed in various electrical machines with often negligible trade-offs in performance, efficiency, and/or the like.

Yet further, principles of the present disclosure allow for certain prior performance-robbing approaches for reducing cogging torque to be discarded. For example, when constructing typical brushless DC motors, a "skew" as well known in the art is often implemented in order to reduce cogging torque. As the skew is increased, the area available for windings decreases, the length of the windings generally increases, and the ability to perform automated winding can be entirely lost. Moreover, the skew makes assembly difficult, and can impose a performance penalty of 5%, 10%, 15% or even higher.

In contrast, in various exemplary embodiments a brushless DC motor is constructed absent any skew. Cogging torque in the unskewed brushless DC motor is reduced and/or minimized via a cogging torque reduction device configured in accordance with principles of the present disclosure. The resulting "balanced" brushless DC motor benefits from reduced cogging torque, as well as from the improved performance and increased ease of production arising from the reduction and/or elimination of skew.

By reducing and/or eliminating the impetus to implement skewing in traditional brushless DC motors, cogging torque reduction devices as disclosed herein can also simplify the design, construction, and/or assembly of traditional brushless DC electric motors. The precise alignments inherent to skewing are often difficult to engineer and/or implement, leading to brushless DC motors which are overly complex and/or "over-engineered" in order to ensure the skewing reduces cogging torque as intended. In contrast, via utilization of a cogging torque reduction device instead of skewing, a brushless DC motor can be simplified, as the precision engineering and assembly associated with skewing is now of reduced importance. Stated another way, a cogging torque reduction device can effectively reduce cogging torque in a conventional brushless DC motor, irrespective of manufacturing variations, tolerance stackup, magnetic strength variations, thermal variations, and/or the like.

Figure 13A:
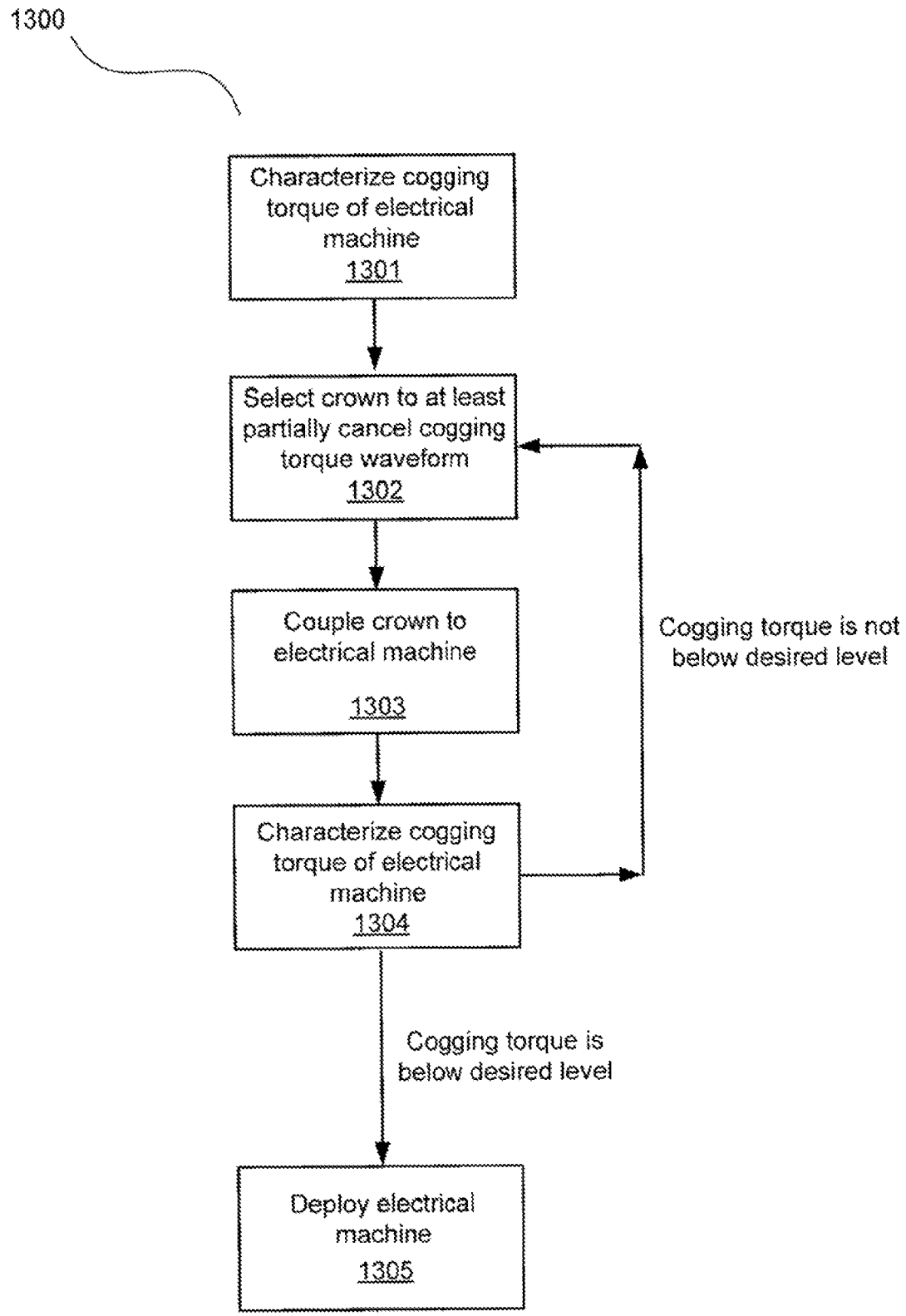
FIG. 13A illustrates an exemplary method for reducing cogging torque in an electrical machine in accordance with an exemplary embodiment.

Cogging torque reduction devices configured in accordance with principles of the present disclosure may be utilized to reduce cogging torque in electrical machines in a variety of ways. With reference now to FIG. 13A, in an exemplary embodiment a method 1300 for reducing cogging torque in an electrical machine comprises measuring, modeling, assessing, and/or otherwise characterizing and/or determining information regarding a cogging torque waveform in an electrical machine (step 1301). The information may be obtained from measurement of the electrical machine while in operation, from a computerized model of the electrical machine, and/or from any other suitable source. Once information is available about the cogging torque waveform intended for cancellation, a cogging torque reduction device, for example a "crown" may be configured to at least partially cancel the existing cogging torque waveform (step 1302). The cogging torque reduction device is coupled to the electrical machine (step 1303), and the new net cogging torque waveform of the combined electrical machine and cogging torque reduction device is measured, modeled, assessed, and/or otherwise characterized and/or determined (step 1304). If the new net cogging torque waveform is below a desired level, the electrical machine may be deployed (step 1305), for example via inclusion in an electric vehicle, electric bicycle, piece of industrial machinery, generator, and/or the like. If, however, the new net cogging torque waveform is not below a desired level, steps 1302 through 1304 may be repeated to add one or more additional cogging torque reduction devices to the electrical machine until the cogging torque of the electrical machine reaches an acceptable level.

Figure 13B:
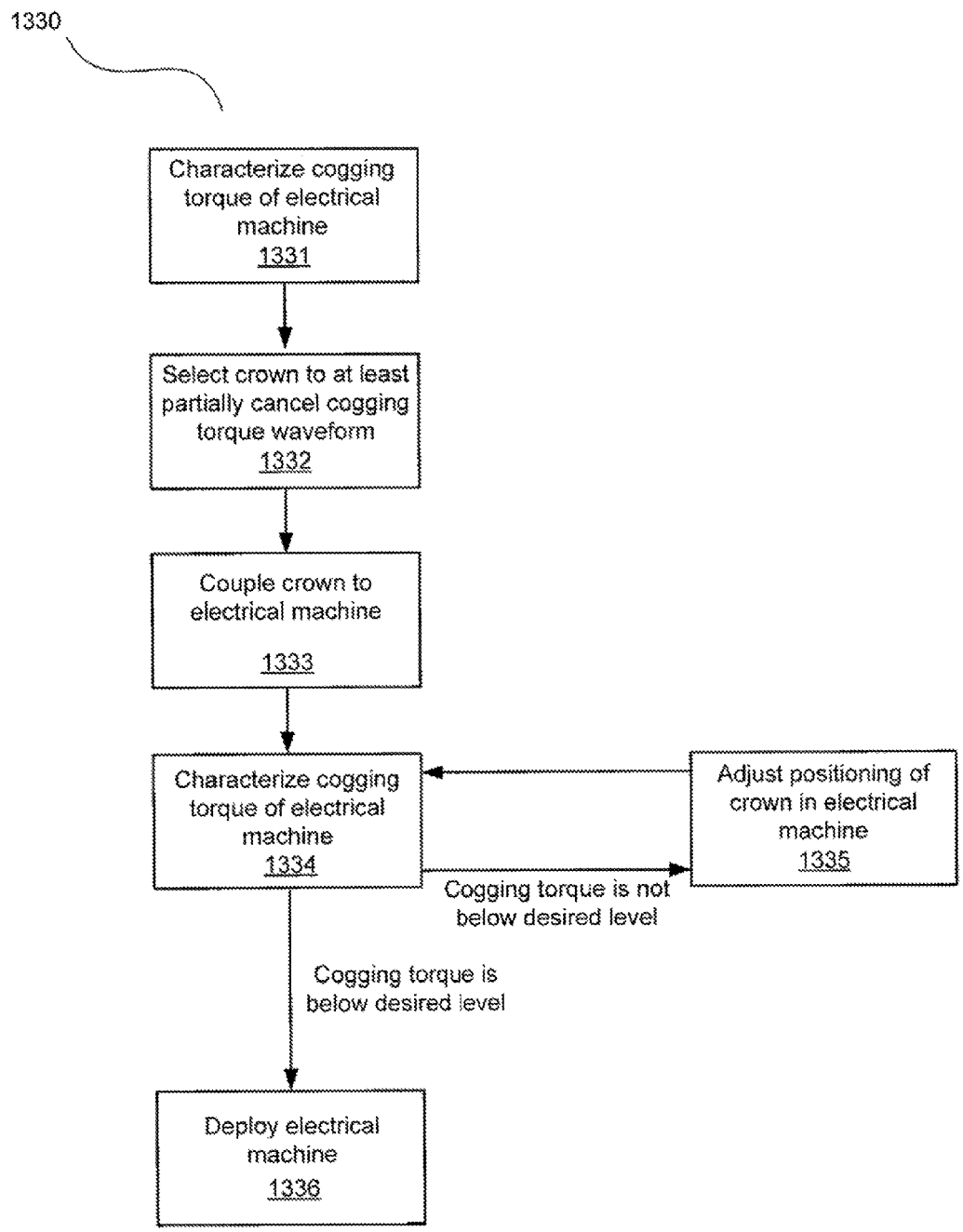
FIG. 13B illustrates another exemplary method for reducing cogging torque in an electrical machine in accordance with an exemplary embodiment.

Turning now to FIG. 13B, in another exemplary embodiment a method 1330 for reducing cogging torque in an electrical machine comprises measuring, modeling, assessing, and/or otherwise characterizing and/or determining information regarding a cogging torque waveform in an electrical machine (step 1331). The information may be obtained from measurement of the electrical machine while in operation, from a computerized model of the electrical machine, and/or from any other suitable source. Once information is available about the cogging torque waveform intended for cancellation, a cogging torque reduction device, for example a "crown" may be configured to at least partially cancel the existing cogging torque waveform (step 1332). The cogging torque reduction device is coupled to the electrical machine (step 1333), and the new net cogging torque waveform of the combined electrical machine and cogging torque reduction device is measured, modeled, assessed, and/or otherwise characterized and/or determined (step 1334). If the new net cogging torque waveform is below a desired level, the electrical machine may be deployed (step 1336), for example via inclusion in an electric vehicle, electric bicycle, piece of industrial machinery, generator, and/or the like. If, however, the new net cogging torque waveform is not below a desired level, the positioning of the crown in the electrical machine may be adjusted (for example, by varying the air-gap between the crown and a rotor, varying the angular positioning of the crown with respect to a stator, and so forth) (step 1335). The new net cogging torque waveform of the combined electrical machine and cogging torque reduction device is then again measured, modeled, assessed, and/or otherwise characterized and/or determined (step 1334). Moreover, steps 1334 and 1335 can be repeated until the cogging torque of the electrical machine reaches an acceptable level.

It will be appreciated that in various exemplary embodiments, elements of method 1300 and elements of method 1330 may be at least partially combined and/or integrated. For example, in an exemplary embodiment, cogging torque in a particular electrical machine is reduced both by the addition of multiple cogging torque reduction devices as well as by adjusting the positioning of the cogging torque reduction devices. All such combinations are considered to fall within the scope of the present disclosure.

Figure 14A:
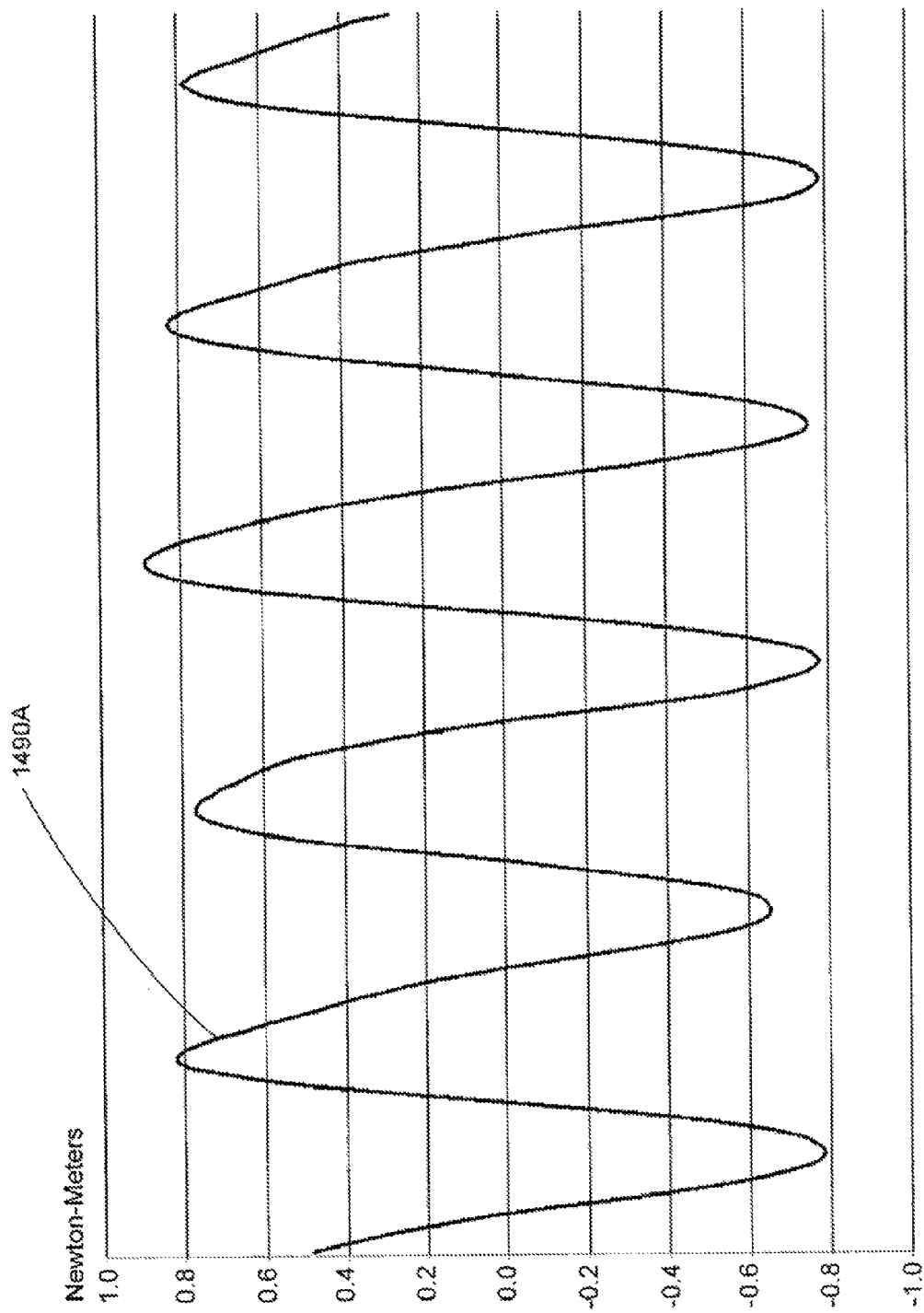
FIG. 14A illustrates a measured cogging torque waveform in an electrical machine prior to utilization of an exemplary cogging torque reduction device in accordance with an exemplary embodiment.
Figure 14B:
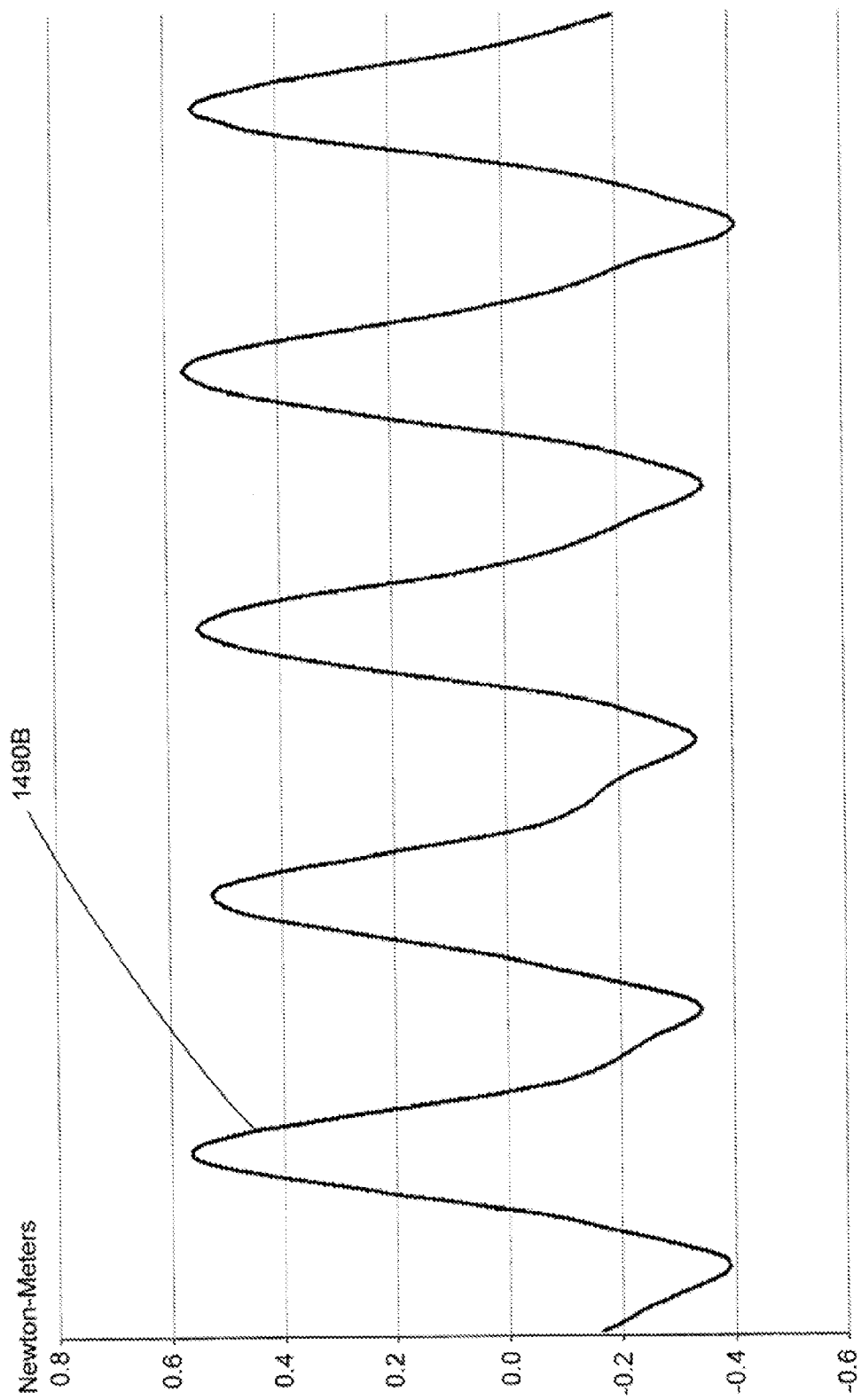
FIG. 14B illustrates a measured cogging torque waveform in the electrical machine of FIG. 14A after utilization of an exemplary cogging torque reduction device in accordance with an exemplary embodiment.

Turning now to FIGS. 14A through 16B, in various exemplary embodiments, reduction in cogging torque in various constructed electrical machines is achieved and illustrated. Waveform 1490A illustrated in FIG. 14A is a measured cogging torque waveform of a transverse flux machine 1400 (not shown in the figures) configured absent a cogging torque reduction device as disclosed herein. Waveform 1490B illustrated in FIG. 14B is a measured cogging torque waveform of transverse flux machine 1400 after utilization of a cogging torque reduction device as disclosed herein. As can be seen, both the peak-to-peak cogging torque amplitude and the RMS cogging torque value have been reduced by application of a single cogging torque component.

Figure 15A:
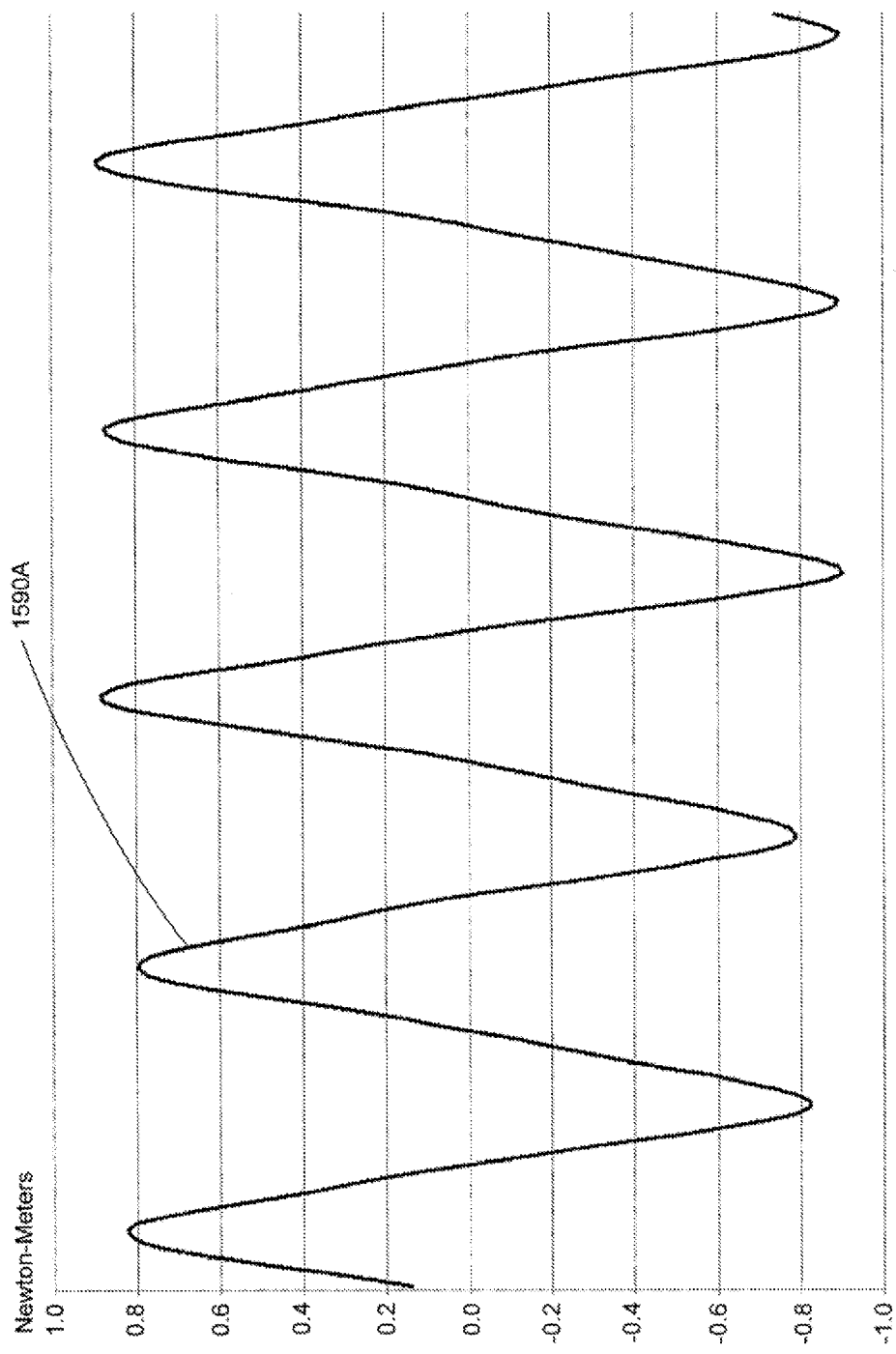
FIG. 15A illustrates a measured cogging torque waveform in an electrical machine prior to utilization of an exemplary cogging torque reduction device in accordance with an exemplary embodiment.
Figure 15B:
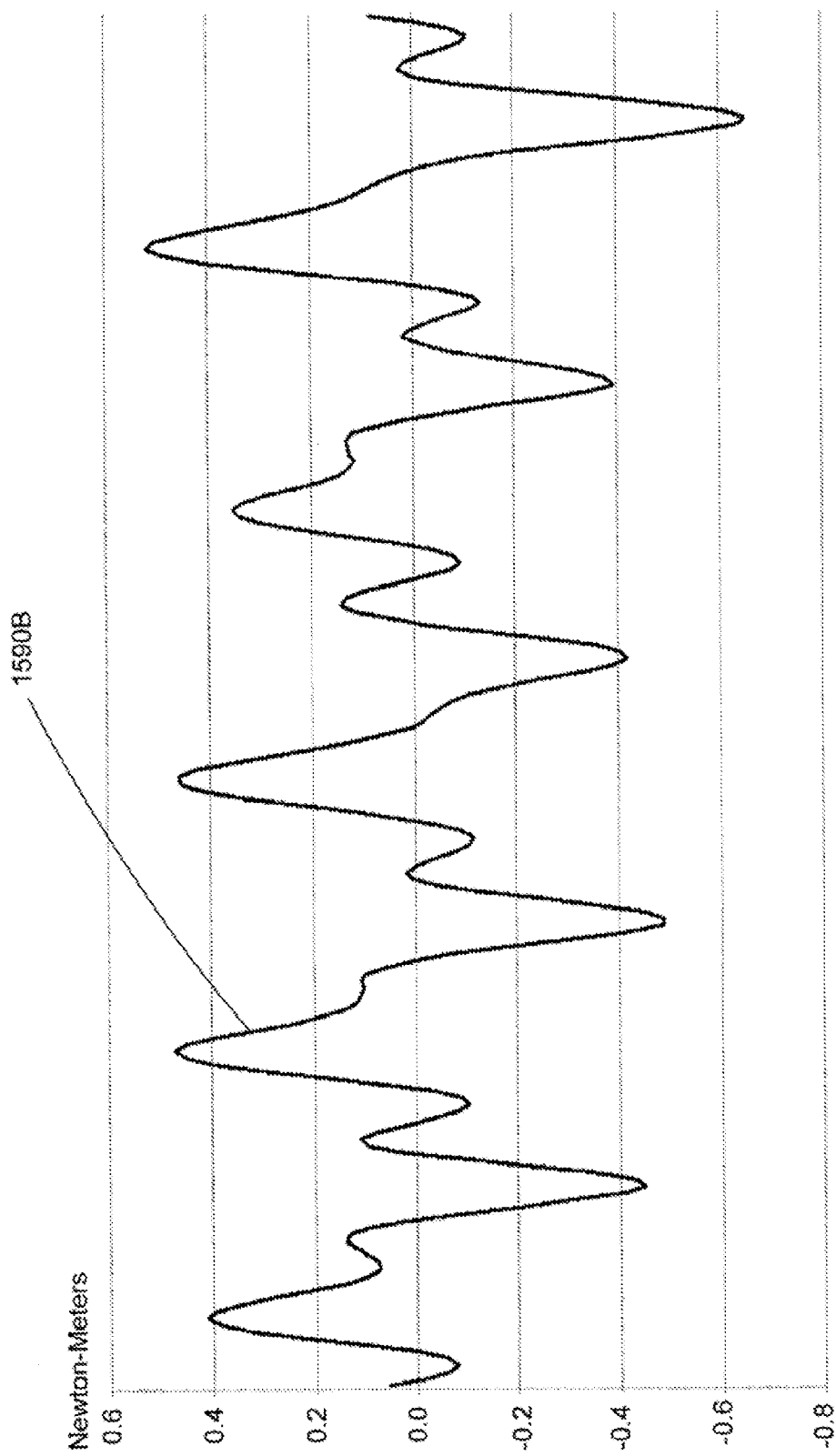
FIG. 15B illustrates a measured cogging torque waveform in the electrical machine of FIG. 15A after utilization of an exemplary cogging torque reduction device in accordance with an exemplary embodiment.

Similarly, waveform 1590A illustrated in FIG. 15A is a measured cogging torque waveform of a transverse flux machine 1500 (not shown in the figures) configured absent a cogging torque reduction device as disclosed herein. Waveform 1590B illustrated in FIG. 15B is a measured cogging torque waveform of transverse flux machine 1500 after utilization of a cogging torque reduction device as disclosed herein. As can be seen, both the peak-to-peak cogging torque amplitude and the RMS cogging torque value have been reduced by application of a single cogging torque component.

Figure 16A:
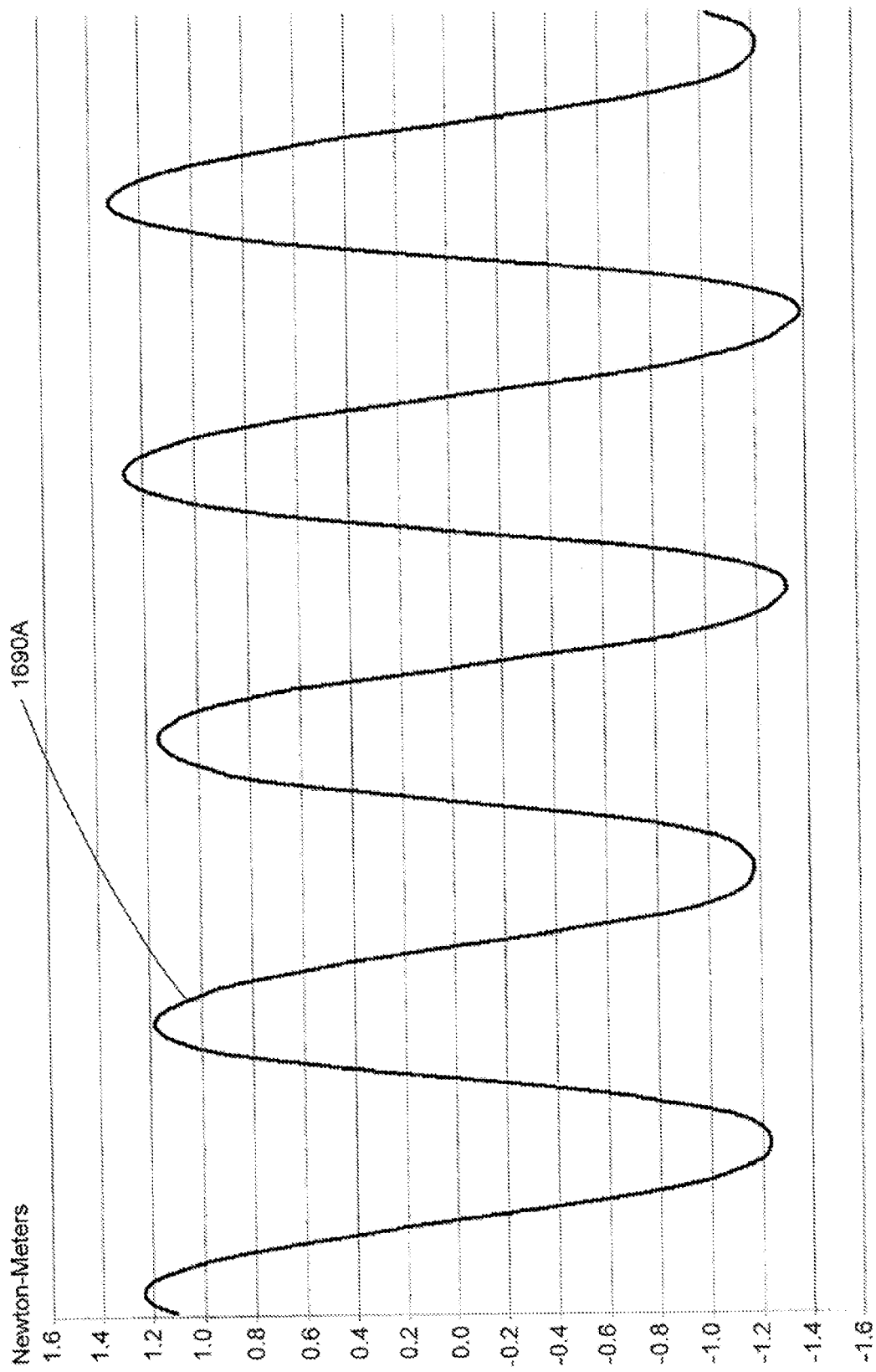
FIG. 16A illustrates a measured cogging torque waveform in an electrical machine prior to utilization of an exemplary cogging torque reduction device in accordance with an exemplary embodiment.
Figure 16B:
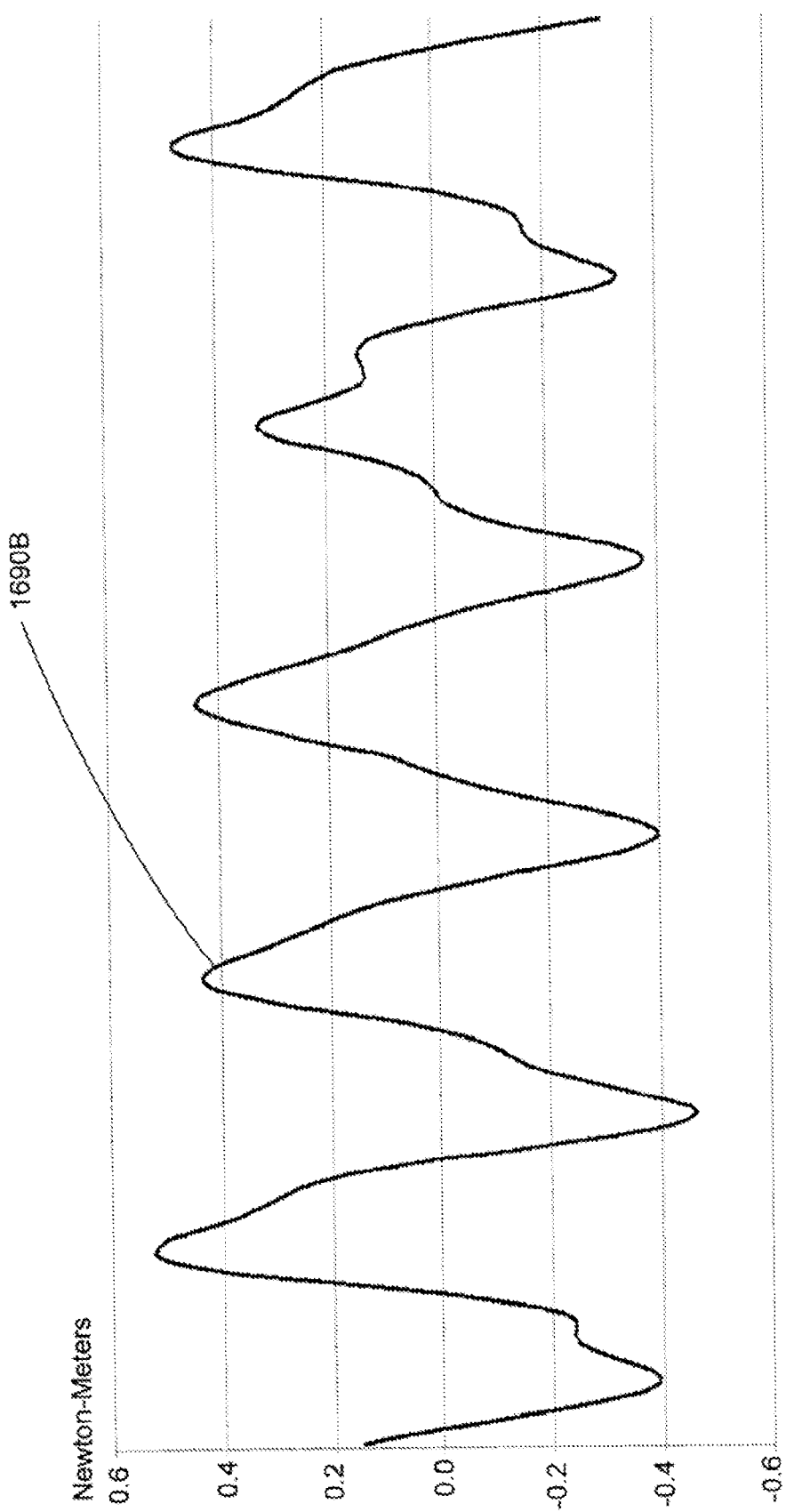
FIG. 16B illustrates a measured cogging torque waveform in the electrical machine of FIG. 16A after utilization of an exemplary cogging torque reduction device in accordance with an exemplary embodiment.

Yet further, waveform 1690A illustrated in FIG. 16A is a measured cogging torque waveform of a transverse flux machine 1600 (not shown in the figures) configured absent a cogging torque reduction device as disclosed herein. Waveform 1690B illustrated in FIG. 16B is a measured cogging torque waveform of transverse flux machine 1600 after utilization of a cogging torque reduction device as disclosed herein. As can be seen, both the peak-to-peak cogging torque amplitude and the RMS cogging torque value have been reduced by application of a single cogging torque component.

As clearly illustrated in FIGS. 14A through 16B, utilization of even a single cogging torque reduction device in accordance with principles of the present disclosure can reduce substantially reduce cogging torque arising from operation of an electrical machine. In many instances, utilization of a single cogging torque reduction device is sufficient to reduce operational cogging torque to acceptable levels, for example by reducing vibration and/or noise below the perception threshold of a user.

In an exemplary embodiment, utilization of a single cogging torque reduction device reduced cogging torque in an exemplary transverse flux machine by about 46%. In another exemplary embodiment, utilization of a single cogging torque reduction device reduced cogging torque in an exemplary transverse flux machine by about 66.8%. In yet another exemplary embodiment, utilization of a single cogging torque reduction device reduced cogging torque in an exemplary transverse flux machine by about 84.3%. Moreover, in various exemplary embodiments, utilization of multiple cogging torque reduction devices can reduce cogging torque in an electrical machine by 95% or more.

Figure 17:
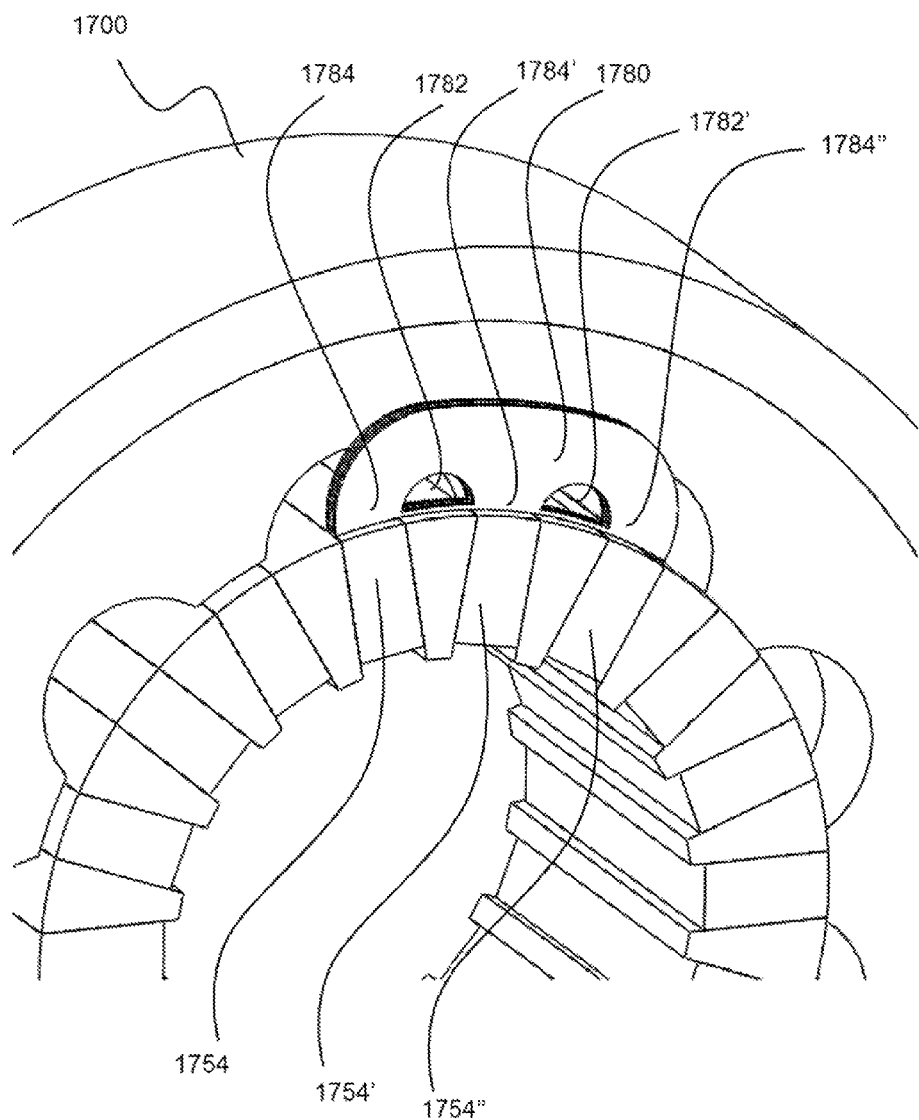
FIG. 17 illustrates an exemplary inner rotating transverse flux machine configured with an exemplary cogging torque reduction device in accordance with an exemplary embodiment.
Figure 18:
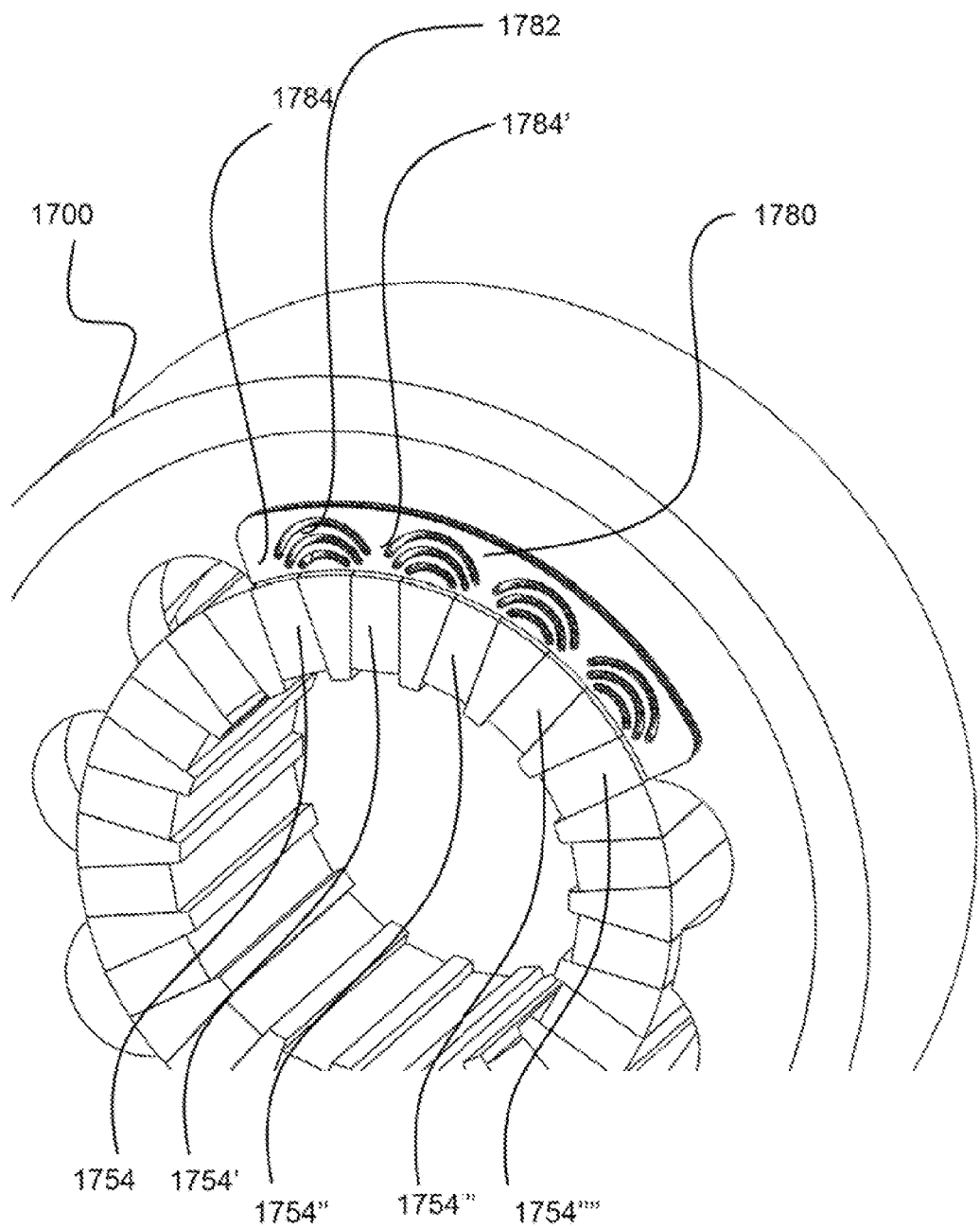
FIG. 18 illustrates an exemplary inner rotating transverse flux machine configured with an exemplary cogging torque reduction device in accordance with an exemplary embodiment.

As shown in FIG. 17 and FIG. 18, an inner rotating transverse flux machine is configured with an exemplary cogging torque reduction devices. The cogging torque reduction device 1780 shown in FIG. 17 comprises three pole conducting portions 1784-1784" that extend inward toward poles 1754-1754". Flux concentrating features 1782-1782' between the pole conducting portions are incorporated to further direct and concentrate the magnetic flux from one pole to another pole through the cogging torque reduction device 1780. The flux concentrating features 1782-1782' shown in FIG. 17 are arc shaped features between pole conducting features. Any suitable shape, number and configuration of flux concentrating features may be used in a cogging torque reduction device and may comprise cut-outs, gaps, space, apertures and the like. As shown in FIG. 18, a cogging torque reduction device 1780 comprises five pole conducting portions 1784 that extend inward toward poles 1754-1754"". The flux concentrating feature 1782 between pole conducting portions 1784 and 1784' comprises three arc shaped aperture cut-outs in the cogging torque reduction device 1780.

Figure 19:
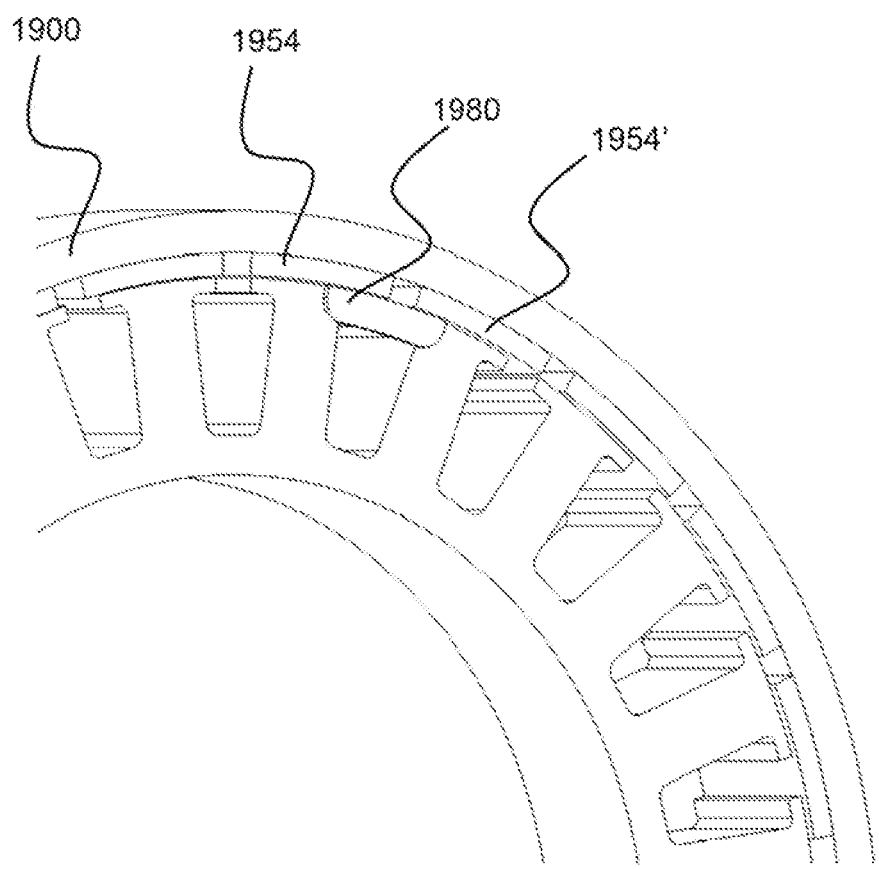
FIG. 19 illustrates an exemplary cogging torque reduction device utilized in connection with a conventional brushless DC motor in connection with an exemplary embodiment.

FIG. 19 illustrates an exemplary cogging torque reduction device utilized in connection with a conventional brushless DC motor 1900 in connection with an exemplary embodiment. As shown in FIG. 19, a cogging torque reduction device 1980, may be utilized in connection with a conventional radial flux electric motor, for example a brushless DC motor 1900, as illustrated in simplified form in FIG. 19. In an exemplary embodiment, a cogging torque reduction device 1980 is configured on a brushless DC motor 1900 so as to at least partially "short" adjacent magnets 1954 1954' and conduct flux therebetween. As flux is switched through the cogging torque reduction device 1980, a cogging torque waveform is produced. As disclosed hereinabove, the cogging torque waveform arising from cogging torque reduction device 1980 may be configured to at least partially counteract, cancel, and/or otherwise "balance" the cogging torque waveform existing in the brushless DC motor 1900 prior to coupling of the cogging torque reduction device 1980 to the motor. It will be appreciated that the cogging torque reduction principles contained in the present disclosure may suitably be applied to a wide range of electrical machines, and the example contained herein are all by way of illustration and not of limitation.

Cogging torque reduction devices configured in accordance with principles of the present disclosure offer numerous advantages over prior cogging torque reduction approaches. For example, in various exemplary embodiments, a cogging torque reduction device does not create any axial thrust load in an electrical machine to which it is coupled. Stated another way, in these exemplary embodiments, a cogging torque reduction device results in forces that are already aligned with bearings in the electrical machine, resulting in minimal additional bearing load. In contrast, various prior approaches for reducing cogging torque resulted in significant axial thrust load on an electrical machine. Moreover, certain prior approaches for reducing cogging torque created vibration in new directions beyond the direction of the initial cogging torque.

Additionally, in various exemplary embodiments, multiple cogging torque reduction devices can be utilized to progressively and/or incrementally cancel cogging torque in an electrical machine. In contrast, various prior approaches for reducing cogging torque are limited to a single, "one and done" implementation, wherein any cogging torque remaining after the initial cancellation attempt cannot be further reduced.

Moreover, in various exemplary embodiments, a cogging torque reduction device can be repositioned, "timed", and/or otherwise adjusted in order to more effectively cancel cogging torque in an electrical machine. In contrast, various prior approaches for reducing cogging torque lack the ability to adjust the amplitude and/or phase of a cogging torque waveform arising therefrom, resulting in significant cogging torque remaining in the electrical machine.

Yet further, in various exemplary embodiments, a cogging torque reduction device utilizes and/or takes advantage of one or more permanent magnets already present in an electrical machine. This simplifies construction and reduces cost. In contrast, various prior approaches for reducing cogging torque required the use of additional magnets, coils, bearings, casings, and/or the like, significantly increasing the complexity and/or cost of the resulting electrical machine.

It will be appreciated that principles of cogging torque reduction as disclosed hereinabove may suitably be combined with various other principles related to electrical machines, for example transverse flux machines and/or commutated flux machines. For example, principles of the present disclosure may suitably be combined with principles for stators in transverse flux machines and commutated flux machines, for example principles for partial stators and/or gapped stators, as disclosed in U.S. patent application Ser. No. 12/611,728 filed on Nov. 3, 2009, now U.S. Pat. No. 7,851,965 entitled "TRANSVERSE AND/OR COMMUTATED FLUX SYSTEM STATOR CONCEPTS", the contents of which are hereby incorporated by reference in their entirety.

Principles of the present disclosure may also suitably be combined with principles for rotors in transverse flux machines and/or commutated flux machines, for example tape wound rotors and/or multipath rotors, as disclosed in U.S. patent application Ser. No. 12/611,733 filed on Nov. 3, 2009, now U.S. Pat. No. 7,923,886 entitled "TRANSVERSE AND/OR COMMUTATED FLUX SYSTEM ROTOR CONCEPTS", the contents of which are hereby incorporated by reference in their entirety.

Principles of the present disclosure may also suitably be combined with principles of polyphase transverse flux machines and/or polyphase commutated flux machines as disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", the contents of which are hereby incorporated by reference in their entirety.

Principles of the present disclosure may also suitably be combined with principles of extended magnets, overhung rotors, and/or stator tooth overlap in transverse flux machines and/or commutated flux machines as disclosed in U.S. patent application Ser. No. 12/772,958 filed on May 3, 2010, now U.S. Pat. No. 8,053,944, entitled and entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety.

Principles of the present disclosure may also suitably be combined with principles of utilization of transverse flux machines and/or commutated flux machines in electric bicycles as disclosed in U.S. patent application Ser. No. 12/772,959 filed on May 3, 2010 and entitled "TRANSVERSE AND/OR COMMUTATED FLUX SYSTEMS FOR ELECTRIC BICYCLES", the contents of which are hereby incorporated by reference in their entirety.

Principles of the present disclosure may also suitably be combined with principles of phase offset in transverse flux machines and/or commutated flux machines as disclosed in U.S. patent application Ser. No. 12/772,962 filed on May 3, 2010 and entitled "TRANSVERSE AND/OR COMMUTATED FLUX SYSTEM PHASE OFFSET", the contents of which are hereby incorporated by reference in their entirety.

Principles of the present disclosure may also suitably be combined with principles of segmented stator laminations and/or rainbow laminations in transverse flux machines and/or commutated flux machines as disclosed in U.S. Provisional Patent Application Ser. No. 61/414,769 filed on Nov. 17, 2010 and entitled "TRANSVERSE AND/OR COMMUTATED FLUX SYSTEMS HAVING SEGMENTED STATOR LAMINATIONS", the contents of which are hereby incorporated by reference in their entirety.

Principles of the present disclosure may also suitably be combined with principles of coils, including dual wound coils in transverse flux machines and/or commutated flux machines as disclosed in U.S. Provisional Patent Application Ser. No. 61/414,774 filed on Nov. 17, 2010 and entitled "TRANSVERSE AND/OR COMMUTATED FLUX SYSTEM COIL CONCEPTS", the contents of which are hereby incorporated by reference in their entirety.

Principles of the present disclosure may also suitably be combined with principles of laminations combined with powdered metal portions in transverse flux machines and/or commutated flux machines as disclosed in U.S. Provisional Patent Application Ser. No. 61/414,781 filed on Nov. 17, 2010 and entitled "TRANSVERSE AND/OR COMMUTATED FLUX SYSTEMS HAVING LAMINATED AND POWDERED METAL PORTIONS", the contents of which are hereby incorporated by reference in their entirety.

Principles of the present disclosure may also suitably be combined with principles of isolated torque sensing systems as disclosed in U.S. Provisional Patent Application Ser. No. 61/453,000 filed on Mar. 15, 2011 and entitled "ISOLATED TORQUE SENSOR", the contents of which are hereby incorporated by reference in their entirety.

Principles of the present disclosure may also suitably be combined with principles of adjustable Hall effect sensor systems as disclosed in U.S. Provisional Patent Application Ser. No. 61/453,006 filed on Mar. 15, 2011 and entitled "ADJUSTABLE HALL EFFECT SENSOR SYSTEM", the contents of which are hereby incorporated by reference in their entirety.

Principles of the present disclosure may also suitably be combined with principles of laminations combined with powdered metal portions in transverse flux machines and/or commutated flux machines as disclosed in U.S. Provisional Patent Application Ser. No. 61/453,075 filed on Mar. 15, 2011 and entitled "TRANSVERSE AND/OR COMMUTATED FLUX SYSTEMS HAVING LAMINATED AND POWDERED METAL PORTIONS", the contents of which are hereby incorporated by reference in their entirety.

Moreover, principles of the present disclosure may suitably be combined with any number of principles disclosed in any one of and/or all of the U.S. patents and/or U.S. patent applications incorporated by reference herein. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A stator for a transverse flux machine comprising:
   a cogging torque reduction device coupled to said stator and comprising:
   a flux conducting device that extends no more than half way around the stator comprising:
      a first pole conducting portion;
      a second pole conducting portion; and
      a position adjustment feature,
   whereby the flux conducting device conducts flux from a first pole on a rotor to a second pole on said rotor creating a flux path, wherein the flux path does not link flux around a coil of the transverse flux machine,
   wherein the first pole conducting portion comprises a first tooth and the second pole conducting portion comprises a second tooth,
   wherein the cogging torque reduction device is position adjustable and configured to reduce inherent cogging torque in the transverse flux machine by producing anti-cogging torque when the transverse flux machine is in operation.

2. The stator for a transverse flux machine of claim 1, comprising a first and a second independently positional adjustable flux conducting devices that produce a first and a second anti-cogging waveform.

3. The stator for a transverse flux machine of claim 2, wherein each of the flux conducting devices extends no more than about one quarter around the stator.

4. The stator for a transverse flux machine of claim 1, wherein the transverse flux machine is an electric motor.

5. The stator for a transverse flux machine of claim 1, wherein the flux conducting device comprises no more than 30 teeth.

6. The stator for a transverse flux machine of claim 1, wherein the first and second tooth are a tapered shape.

7. The stator for a transverse flux machine claim 1, wherein the first and second tooth are fin shaped and a progressive air nap is formed between said teeth and the rotor.

8. The stator for a transverse flux machine of claim 1, wherein the first pole conducting portion and second pole conducting portion are contiguous.

9. The stator for a transverse flux machine of claim 1, wherein the flux conducting device is arc shaped.

10. The stator for a transverse flux machine of claim 9, wherein the arc shaped flux conducting device comprise a plurality of flux conducting portions extend outwardly from said are shaped conducting device.

11. The stator for a transverse flux machine of claim 1, wherein the flux conducting device is a crown.

12. The stator for a transverse flux machine of claim 11, wherein the crown comprises an air gap.

13. The stator for a transverse flux machine of claim 1, wherein the flux conducting device comprises:
   a third pole conducting portion;
   a forth pole conducting portion; and
   wherein the first, second, third and fourth, pole conducing portions are teeth;
   wherein the first and second pole conducting portions are adjacent each other and have a first width therebetween and the third and fourth pole conducting portions are adjacent each other and have a second width therebetween, and
   wherein the first width is different from the second width.

14. The stator for a transverse flux machine of claim 1, wherein the flux conducting device is configured relative to the rotor with a varying air gap,
   wherein a first air gap between the first pole conducting portion and the rotor is different from a second air gap between the second pole conducting portion and the rotor.

15. The stator for a transverse flux machine of claim 14, wherein a space between the first pole conducting portion and the second pole conducting portion is uniform with a space between said second pole conducting portion and a third pole conducting portion.

16. The stator for a transverse flux machine of claim 1, wherein, responsive to rotation of a rotor, flux switching in the flux conducting device produces a waveform that at least partially cancels a second cogging torque waveform arising from the interaction of the rotor and the stator.

17. The stator for a transverse flux machine of claim 1, wherein the position adjustment feature comprises a slot.

18. The stator for a transverse flux machine of claim 1, wherein the position adjustment feature comprises a ear hole and a slot, whereby the flux conducting device is mounted to said stator by a fastener configured through said hole and position adjusted by the fastener configured through the slot.

19. A stator for a transverse flux machine comprising a cogging torque reduction device comprising a first and a second independently adjustable arc shaped flux conducting devices coupled to the stator and configured to produce a first and second anti-cogging waveform;
   wherein each arc shaped flux conducting devices comprises:
   a. a first toothed shaped pole conducting portion; and
   b. a second toothed shaped pole conducting portion; and
   c. a flux conducting coupling portion,
   wherein the first pole conducting, portion, second pole conducting portion and flux conducting coupling portion are contiguous and whereby the cogging, torque reduction device conducts flux front a first pole on a rotor to a second pole on said rotor creating a flux path, wherein the flux path does not link flux around a coil of the transverse flux machine.

* * * * *